US006116820A

United States Patent [19]

Suzuki et al.

[11] Patent Number: 6,116,820

[45] Date of Patent: Sep. 12, 2000

[54] MECHANISM FOR AND METHOD OF FEEDING RESIN COMPONENTS

[75] Inventors: Chiaki Suzuki, Minamiashigara; Yoshinobu Misumi, Odawara; Hideyuki Karaki; Takayuki Kambara, both of Minamiashigara; Susumu Sato, Odawara, all of Japan

[73] Assignee: Fuji Photo Film Co., Ltd., Kanagawa-ken, Japan

[21] Appl. No.: 09/442,240

[22] Filed: Nov. 17, 1999

Related U.S. Application Data

[62] Division of application No. 08/997,369, Dec. 23, 1997, Pat. No. 6,018,929.

[30] Foreign Application Priority Data

| | | | |
|---|---|---|---|
| Dec. 27, 1996 | [JP] | Japan | 8-351407 |
| Jan. 27, 1997 | [JP] | Japan | 9-12942 |
| Jan. 27, 1997 | [JP] | Japan | 9-12959 |

[51] Int. Cl.$^{7}$ .......................... B65G 51/36; B65G 53/66

[52] U.S. Cl. .............................. 406/31; 406/108; 406/77

[58] Field of Search ........................... 406/31, 108, 146, 406/197, 75, 79, 77; 198/444, 524, 751

[56] References Cited

U.S. PATENT DOCUMENTS

| | | | |
|---|---|---|---|
| 2,776,094 | 1/1957 | Edwards et al. . | |
| 2,940,232 | 6/1960 | Wallace et al. . | |
| 3,103,054 | 9/1963 | Ingham et al. | 198/444 |
| 3,364,551 | 1/1968 | Napor et al. . | |
| 3,364,552 | 1/1968 | Napor et al. . | |
| 3,457,627 | 7/1969 | Napor et al. . | |
| 3,714,761 | 2/1973 | Herford et al. . | |
| 3,748,715 | 7/1973 | Hoover et al. . | |
| 3,910,407 | 10/1975 | Sterling | 198/444 |
| 4,080,711 | 3/1978 | Kawada et al. . | |
| 4,115,913 | 9/1978 | Moriya et al. . | |
| 4,561,235 | 12/1985 | Yanagisawa et al. . | |
| 4,574,563 | 3/1986 | Shimizu . | |
| 4,614,019 | 9/1986 | Shimizu et al. . | |
| 4,965,931 | 10/1990 | Suzuki et al. . | |
| 5,038,464 | 8/1991 | Suzuki et al. . | |
| 5,044,144 | 9/1991 | Foote et al. . | |
| 5,372,237 | 12/1994 | Yagi | 198/751 |
| 5,479,691 | 1/1996 | Shimizu et al. . | |
| 5,606,842 | 3/1997 | Sakamoto et al. . | |
| 5,647,113 | 7/1997 | Hase et al. . | |
| 5,656,325 | 8/1997 | Wallace | 198/751 |
| 5,669,205 | 9/1997 | Rice et al. . | |
| 5,669,741 | 9/1997 | Ono et al. | 406/108 |

FOREIGN PATENT DOCUMENTS

| | | |
|---|---|---|
| 4217511 | 8/1992 | Japan . |
| 6266059 | 9/1994 | Japan . |

*Primary Examiner*—Christopher P. Ellis
*Assistant Examiner*—Joe Dillon, Jr.
*Attorney, Agent, or Firm*—Sughrue, Mion, Zinn, Macpeak & Seas, PLLC

[57] ABSTRACT

An apparatus for processing and packaging a photographic film has a film supply unit for unreeling and cutting off a film roll of an elongate photographic film, and supplying a sized film, a film winding unit for winding the sized film around a spool thereby to produce a roll, a cartridge production unit for crimping a cap on an end of a rounded barrel plate thereby to produce a one-end-open cartridge, an assembling unit for inserting the roll into the one-end-open cartridge and thereafter crimping a cap on an opposite open end of the one-end-open cartridge thereby to produce a film-contained cartridge, and an encasing unit for placing the film-contained cartridge into a case and attaching a case cap to an open end of the case thereby to produce a packaged product. The film supply unit, the film winding unit, and the assembling unit are accommodated altogether in a dark chamber. The apparatus is relatively simple in overall arrangement, and allow various types of operation to be carried out easily and efficiently.

7 Claims, 45 Drawing Sheets

10

10

MECHANISM FOR AND METHOD OF FEEDING RESIN COMPONENTS

This is a divisional of application Ser. No. 08/997,369 filed Dec. 23, 1997, which issued Feb. 1, 2000 as U.S. Pat. No. 6,018,929 the disclosure of which is incorporated herein by reference.

BACKGROUND OF THE INVENTION

1. Field of the Invention

The present invention relates to an apparatus for processing and packaging a photographic film by winding the photographic film, cut to a predetermined length, around a spool, inserting the wound photographic film into a cartridge, and loading the cartridge into a case thereby to produce a packaged product, and a mechanism for and a method of feeding resin components.

2. Description of the Related Art

For processing and packaging photographic films, photographic films are processed, the processed photographic films of given dimensions are wound up, the wound photographic films are inserted into cartridges, and the cartridges are loaded into cases by respective independent apparatuses. The photographic films need to be accumulated in each step and carried to the next step. Consequently, the entire procedure for processing and packaging photographic films is tedious and time-consuming.

Japanese laid-open patent publication No. 6-266059 discloses a packaged product manufacturing apparatus having a film splicing unit placed in a dark environment for taking a blank film coil from a blank film coil container and unwinding the blank film coil into a next step, a component supply unit for supplying components to be combined with photographic films, a film processing and assembling unit placed in a dark environment for processing photographic films fed from the film splicing unit and assembling the photographic films with the components supplied from the component supply unit thereby to produce packaged articles, and an encasing unit for placing the packaged articles into cases.

The film splicing unit is covered with a light-tight cover which accommodates an automatic switching machine for taking a blank film coil from the blank film coil container, and a feeder for delivering the blank film coil set in a delivery position in the automatic switching machine to the film processing and assembling unit.

The film processing and assembling unit is also covered with a light-tight cover which accommodates a punching machine for forming perforations in a photographic film, a feeder for delivering the perforated photographic film, a latent image forming unit for forming frame numbers on the photographic film, a cutting machine for cutting the photographic film to a predetermined length, a spool winding unit for winding the cut photographic film on a spool, a cartridge insertion unit for inserting the photographic film wound on the spool into a one-end-open cartridge with only one end closed by a cap, and a crimping machine for crimping a cap on an open end of the cartridge.

Since the film splicing unit and the film processing and assembling unit are covered with the respective light-tight covers, the disclosed packaged product manufacturing apparatus can operate in a bright room. The packaged product manufacturing apparatus is complicated in its entirety and expensive because all the steps performed by the apparatus are automated.

If the film splicing unit or the film processing and assembling unit suffer some trouble therein, e.g., an operation failure or a jam of a photographic film, the operator is required to remove the light-tight cover and service the unit for recovery from the trouble. Therefore, any photographic films remaining in the troubled unit are exposed to light and spoiled. Furthermore, the process of servicing the troubled unit is tedious and time-consuming.

Particularly, in the event of any mechanical or sequence trouble, the troubled unit cannot automatically be recovered, and it takes the operator a long time to repair the unit for recovery. Although photographic films should preferably be stored in light-tight conditions while servicing the facility for recovery from trouble, such a solution cannot be relied upon by the conventional apparatus. Consequently, when the film splicing unit or the film processing and assembling unit suffers trouble, a large number of exposed photographic films are produced, resulting in a highly uneconomical situation.

According to the above procedure of processing and packaging photographic films, packaged products which comprise film-contained cartridges encased in respective cases are finally produced. However, it is desirable in some film applications to deliver film-contained cartridges which house photographic films wound on respective spools to another process. For example, a one-time-use camera known as “QuickSnap” manufactured by Fuji Photo Film Co. employs a film-contained cartridge directly installed in the camera body.

When film-contained cartridges with photographic films wound on respective spools are to be removed from the procedure of processing and packaging photographic films, it is necessary to temporarily stop the operation of the encasing unit. However, controlling the procedure to shut off the encasing unit while film-contained cartridges are being removed from the procedure of processing and packaging photographic films is considerably complex, making it inefficient to manufacture final packaged products. Automatic removal of film-contained cartridges from the procedure of processing and packaging photographic films is also highly complex because the encasing unit needs to be shut off and at the same time the removed film-contained cartridges need to start being delivered to a desired accumulating position.

For making the entire processing and packaging procedure efficient, it is necessary to feed required components efficiently to the units or stations. Japanese laid-open patent publication No. 4-217511 discloses a system for smoothly supplying bottomed cylindrical cases to a case storage unit. According to the disclosed system, a case molding machine and an open housing of the case storage unit are interconnected by an elongate feed pipe, and bottomed cylindrical cases are fed by way of suction through the delivery pipe.

Since cylindrical cases are fed under an air pressure through the feed pipe which is substantially long, the cylindrical cases being fed tend to be brought into frictional contact with the inner wall surface of the feed pipe. Usually, the feed pipe is made of stainless steel, vinyl chloride, acrylic resin, or the like, and the cylindrical cases are made of high-density polyethylene or polyethylene which is softer than the feed pipe.

Therefore, when cylindrical cases are brought into frictional contact with the inner wall surface of the feed pipe, the cylindrical cases are liable to produce worn debris, which will be deposited in bent and end portions of the feed pipe while the system is in operation for a long period of time. The deposited worn debris often finds its way into cylindrical cases being fed and is attached thereto. If a one-end-open cartridge with only one end closed by a cap is inserted into such a cylindrical case, then the worn debris in the cylindrical case is likely to be attached to an exposed tongue-like end of the photographic film which sticks out of the cartridge.

When the cartridge is loaded into a camera and used, the worn debris is transferred from the tongue-like end of the photographic film onto an exposed frame of the film, adversely affecting the picture that has been captured on the film. Damage caused to captured pictures by the worn debris on the cartridge itself poses a highly serious problem on photographic films.

SUMMARY OF THE INVENTION

It is a general object of the present invention to provide an apparatus for processing and packaging a photographic film with a simplified arrangement through steps that can easily and efficiently be carried out.

A major object of the present invention is to provide an apparatus for processing and packaging a photographic film by automatically switching, with a simple arrangement and control procedure, between a process of accumulating film-contained cartridges and a process of accumulating packaged products comprising film-contained cartridges housed in respective cases, so that the apparatus can perform an entire processing and packaging procedure efficiently.

Another object of the present invention is to provide a mechanism for and a method of feeding resin components smoothly along a feed path having a bend to effectively prevent the resin components from being worn or damaged.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
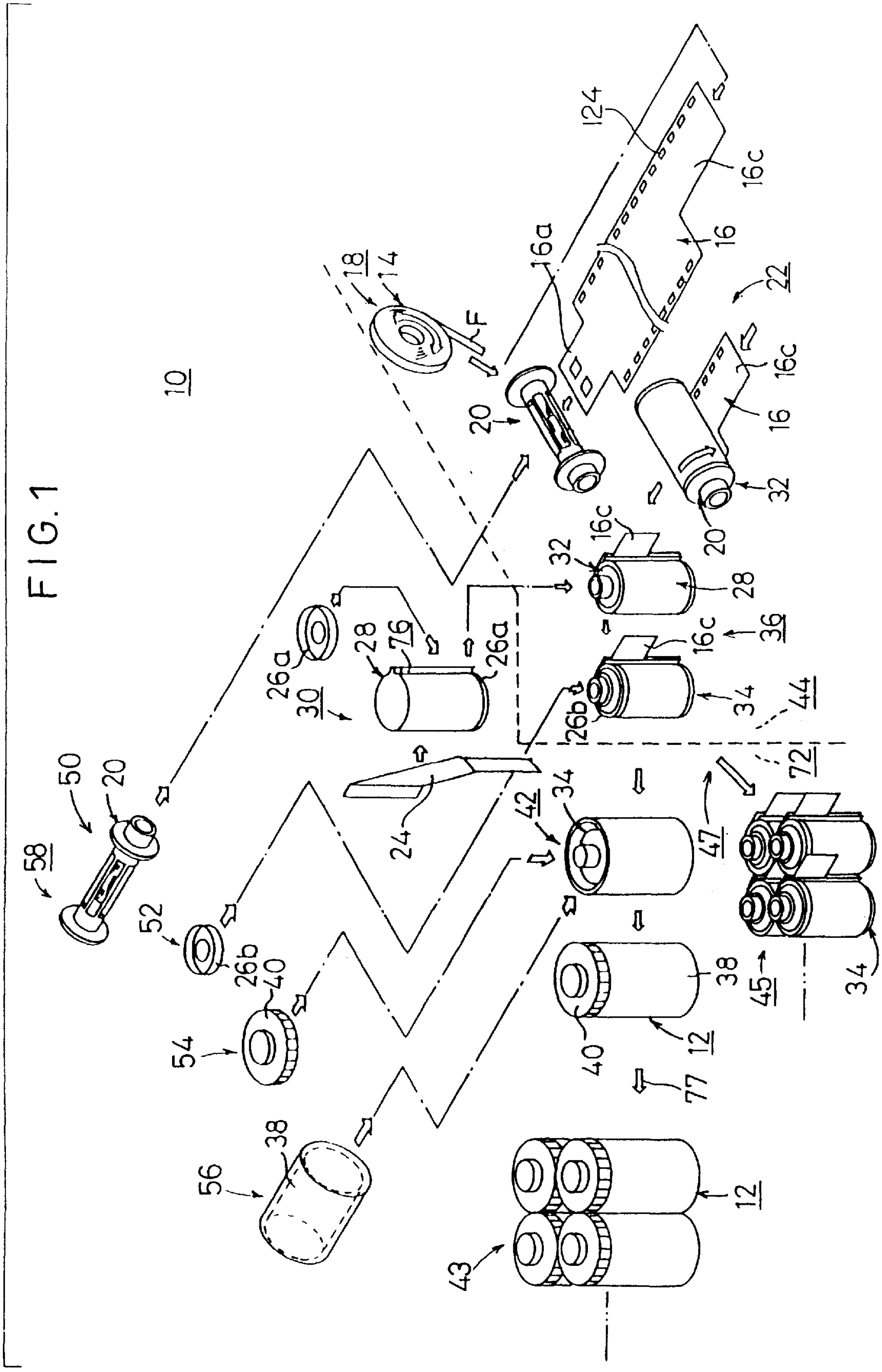
FIG. 1 is a schematic perspective view of a procedure of manufacturing packaged products with a processing and packaging apparatus according to the present invention.
Figure 2:
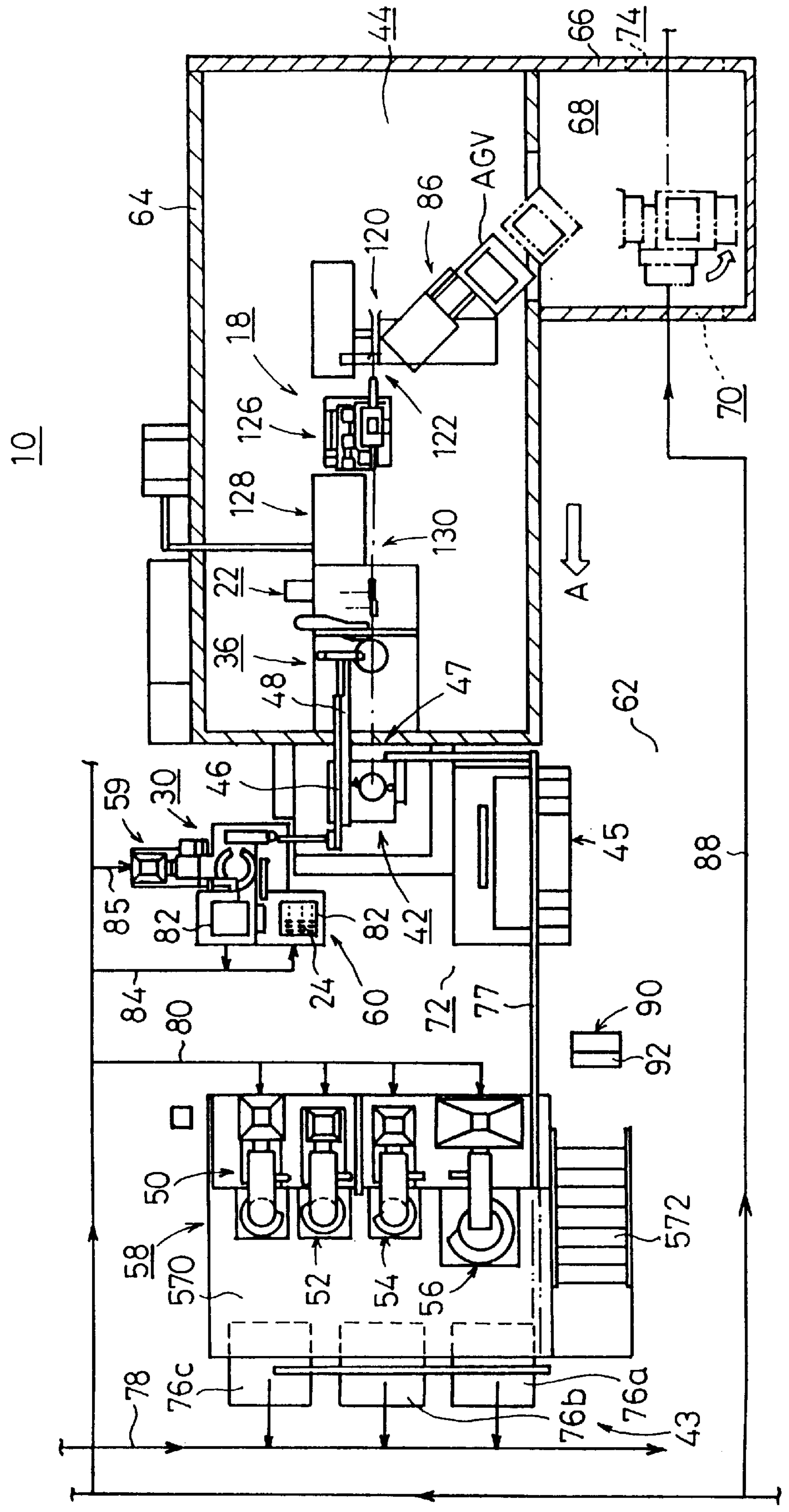
FIG. 2 is a plan view of the processing and packaging apparatus.
Figure 3:
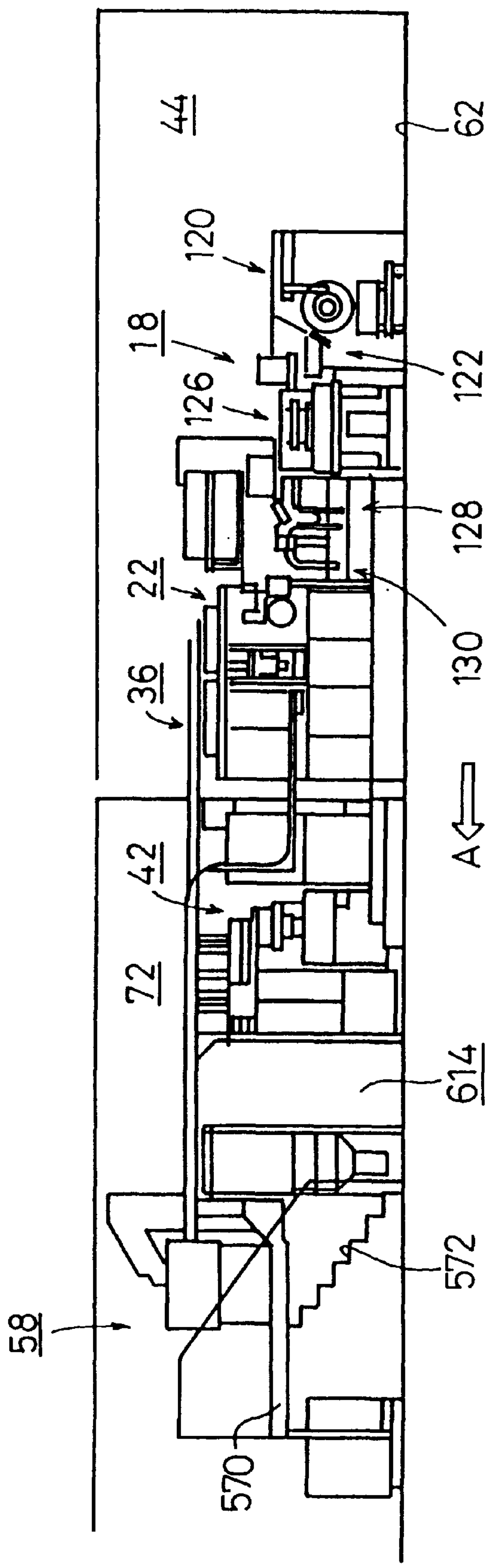
FIG. 3 is a side elevational view of the processing and packaging apparatus.

As shown in FIGS. 1 through 3, a processing and packaging apparatus 10 according to the present invention comprises a film supply unit 18 for unreeling a film roll 14 of an elongate photographic film F (hereinafter also referred to as an "elongate film F"), cutting the photographic film F into a sized film 16 of a given length, and supplying the sized film 16, a film winding unit 22 for positioning a spool 20 and the sized film 16 relatively to each other and winding the sized film 16 on the spool 20 thereby to produce a roll 32, a cartridge production unit 30 for rounding a barrel sheet 24 into a one-end-open cartridge 28 whose one end is closed by a crimped cap 26*a*, an assembling unit 36 for inserting the roll 32 into the one-end-open cartridge 28 and thereafter crimping a cap 26*b* on the other open end of the one-end-open cartridge 28 thereby producing a film-contained cartridge 34, an encasing unit 42 for housing the film-contained cartridge 34 in a case 38 and installing a case cap 40 on an open end of the case 38 thereby to produce a packaged product 12, a packaged product accumulating unit 43 for accumulating a given number of packaged products 12, a film-contained cartridge accumulating unit 45 for accumulating film-contained cartridges 34 produced by the assembling unit 36 separately from the packaged products 12, and a switching feed mechanism 47 for selectively switching a film-contained cartridge 34 from the assembling unit 36 between the encasing unit 42 and the film-contained cartridge accumulating unit 45. The film supply unit 18, the film winding unit 22, and the assembling unit 36 are housed together in a dark chamber 44.

As shown in FIG. 2, the film supply unit 18, the film winding unit 22, the assembling unit 36, and the encasing unit 42 are linearly arranged along a film processing and packaging line as indicated by the arrow A. The processing and packaging apparatus 10 has a first straight feed path (conveyor) 46 for feeding one-end-open cartridges 28 from the cartridge production unit 30 to the assembling unit 36 and a second straight feed path (conveyor) 48 for feeding film-contained cartridges 34 from the assembling unit 36 to the encasing unit 36.

Downstream of the film processing and packaging line, there is positioned a component supply assembly 58 which comprises a spool supply unit 50 for supplying spools 20 to the film winding unit 22, a cap supply unit 52 for supplying caps 26*b* to the assembling unit 36, a case cap supply unit 54 for supplying case caps 40 to the encasing unit 42, and a case supply unit 56 for supplying cases 38 to the encasing unit 42.

A cap supply unit 59 for supplying caps 26*a* and a barrel plate supply unit 60 for supplying barrel plates 24 are disposed adjacent to the cartridge production unit 30.

The film supply unit 18, the film winding unit 22, the cartridge production unit 30, the assembling unit 36, the encasing unit 42, the spool supply unit 50, the cap supply units 52, 59, the case cap supply unit 54, the case supply unit 56, and the barrel plate supply unit 60, each as a unitized device, are interconnected by feed mechanisms including rollers, conveyors, feed paths, pipes, etc. The film supply unit 18 comprises a plurality of unitized facilities, as described later on.

The processing and packaging apparatus 10 is installed on a floor 62 (see FIG. 3) on which partition walls 64 are mounted in covering relationship to the film supply unit 18, the film winding unit 22, and the assembling unit 36. The dark chamber 44 is defined as a desired working space surrounded by the partition walls 64. An antechamber 68 defined by partition walls 66 can be open into the dark chamber 44, and also can be open into a bright chamber 72 through an opening 70 defined in one of the partition walls 66. The antechamber 68 may be open into the bright chamber 72 through an opening 74 defined in another one of the partition walls 66 and opposing the opening 70.

The packaged product accumulating unit 43, which serves as a packaged product stock area, comprises an array of silos 76, 76*a*, 76*b*, 76*c*; positioned adjacent to the component supply assembly 58. The packaged product accumulating unit 43 and the encasing unit 42 are interconnected by a feed conveyor (product feed path) 77, and the film-contained cartridge accumulating unit 45 is positioned on the feed conveyor 77.

A product discharge delivery line 78 is mounted on the floor 62 along the array of silos 76*a*, 76*b*, 76*c*. Another delivery line 80 for supplying components including spools 20, caps 26*b*, case caps 40, and cases 38 is mounted on the floor 62 along the spool supply unit 50, the cap supply unit 52, the case cap supply unit 54, and the case supply unit 56. The delivery line 80 is paralleled by a delivery line 84 for supplying a plurality of barrel plates 24 through a container 82 to the barrel plate supply unit 60, and a delivery line 85 for supplying caps 26*a* to the cap supply unit 59. Another delivery line 88 is mounted on the floor 62 for automatically feeding a plurality of film rolls 14 to a film roll storage unit 86 disposed closely to the film supply unit 18. A control console 90 and a display monitor 92 which is disposed closely to the control console 90 are mounted on the floor 62 near the film-contained cartridge accumulating unit 45.

Figure 4:
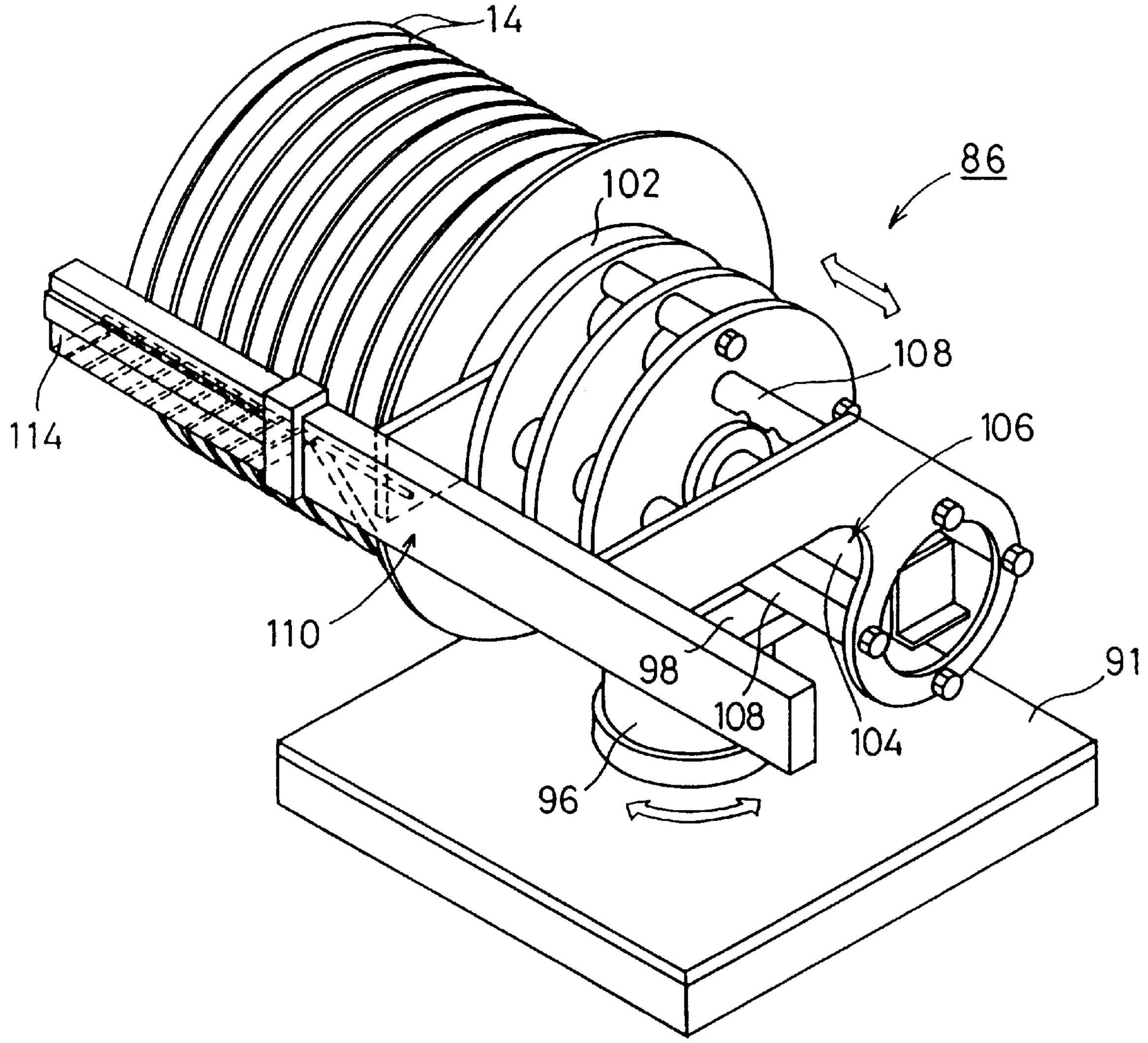
FIG. 4 is a perspective view of a film roll storage unit of the processing and packaging apparatus.
Figure 5:
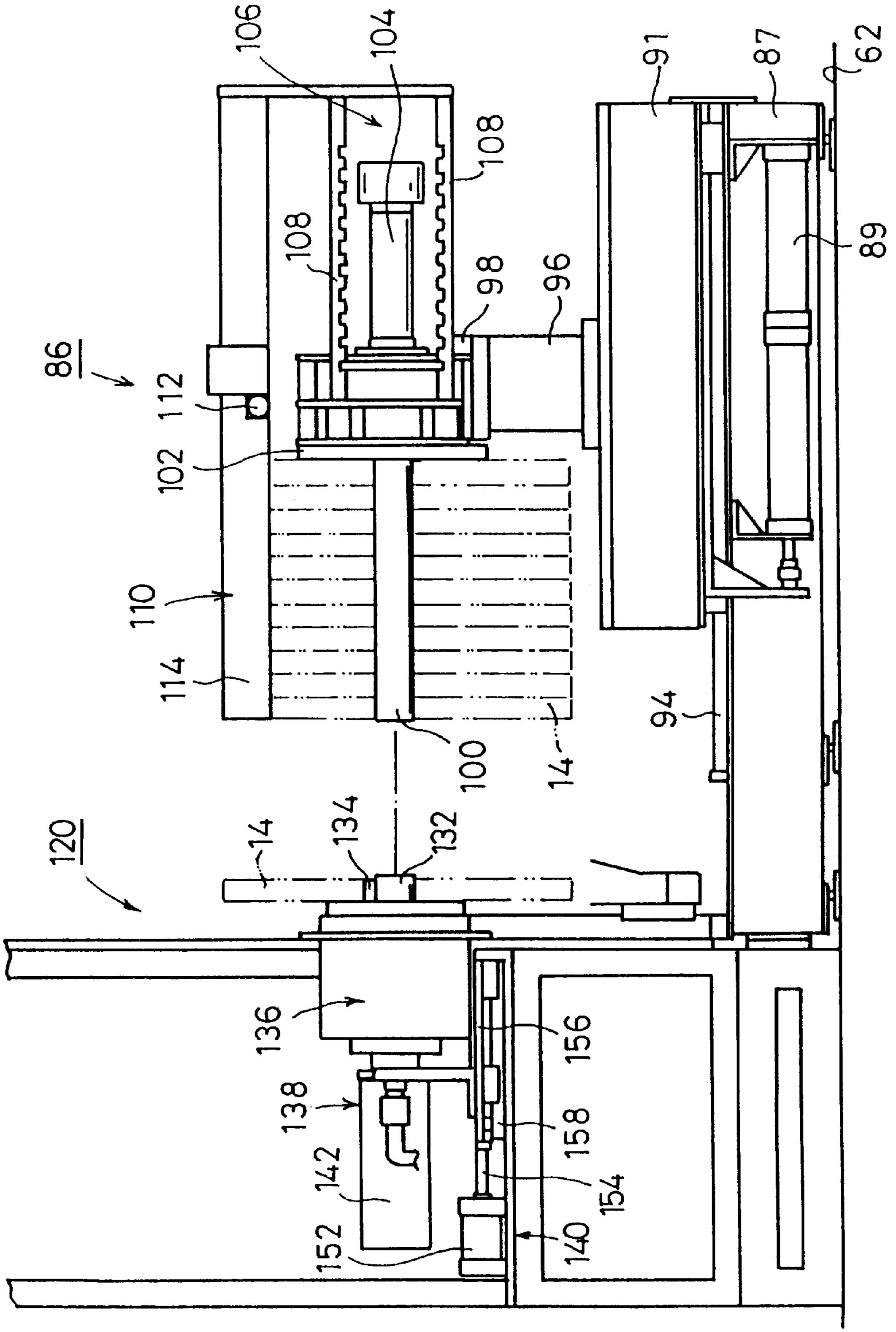
FIG. 5 is a side elevational view of the film roll storage unit.

As shown in FIGS. 4 and 5, the film roll storage unit 86 has a base table 87 mounted on the floor 62 on which there is disposed a slide base 91 that is movable along rails 94 by a cylinder 89. A turn base 98 is angularly movably mounted on the slide base 91 by a rotatable shaft 96, and a horizontal shaft 100 capable of holding a plurality of film rolls 14 is mounted on the turn base 98. On the shaft 100, there is movably supported a disk-shaped pusher 102 for delivering film rolls 14 held by the shaft 100, one by one, to the film supply unit 18. The pusher 102 is connected at its rear end to a drive mechanism 106 including a cylinder 104, and a plurality of angularly spaced guide bars 108 are connected to the rear end of the pusher 102.

A pretreatment base 110 is mounted on the turn base 98 parallel to the shaft 100. The pretreatment base 110 has a cutter 112 for cutting ends of film rolls 14 held by the shaft 100 and a suction box 114 for attracting and holding the ends of the film rolls 14.

Figure 6:
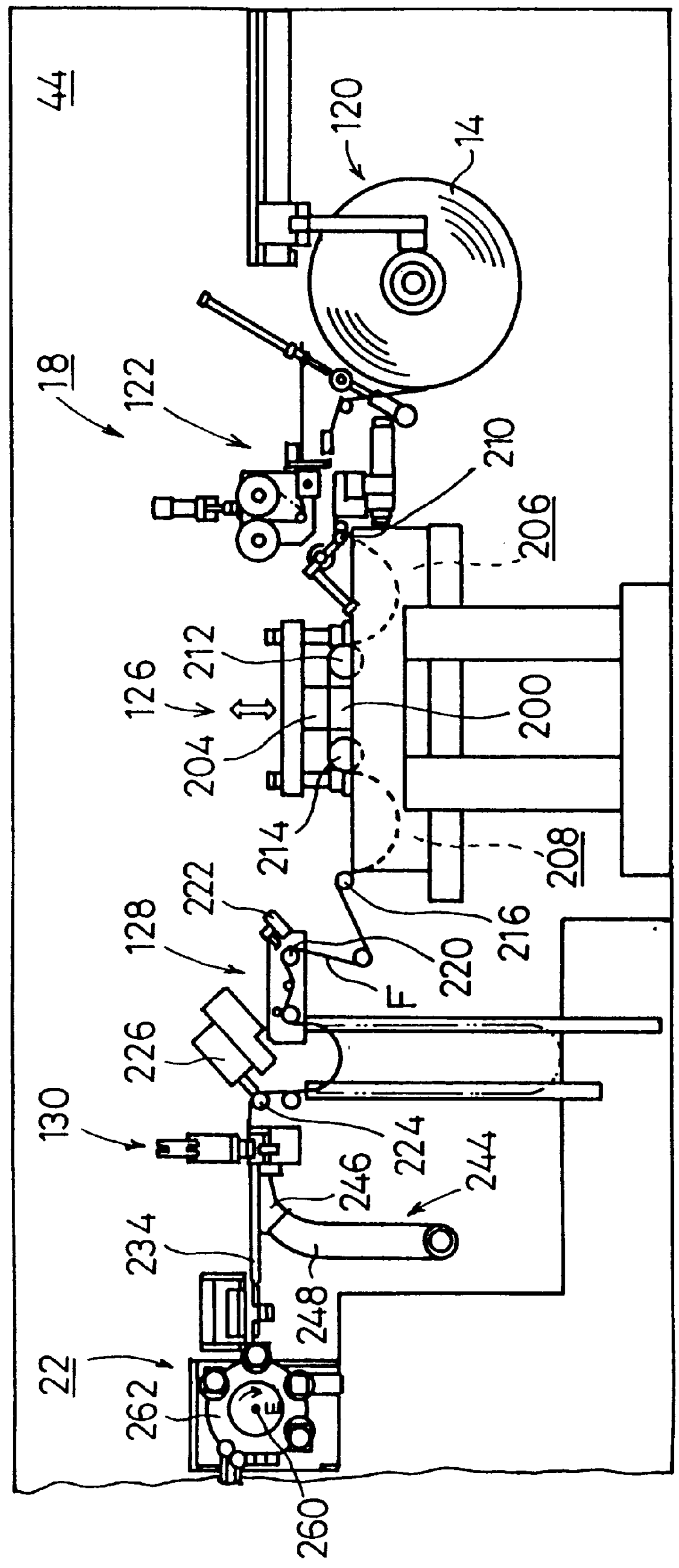
FIG. 6 is a side elevational view of a film supply unit of the processing and packaging apparatus.
Figure 7:
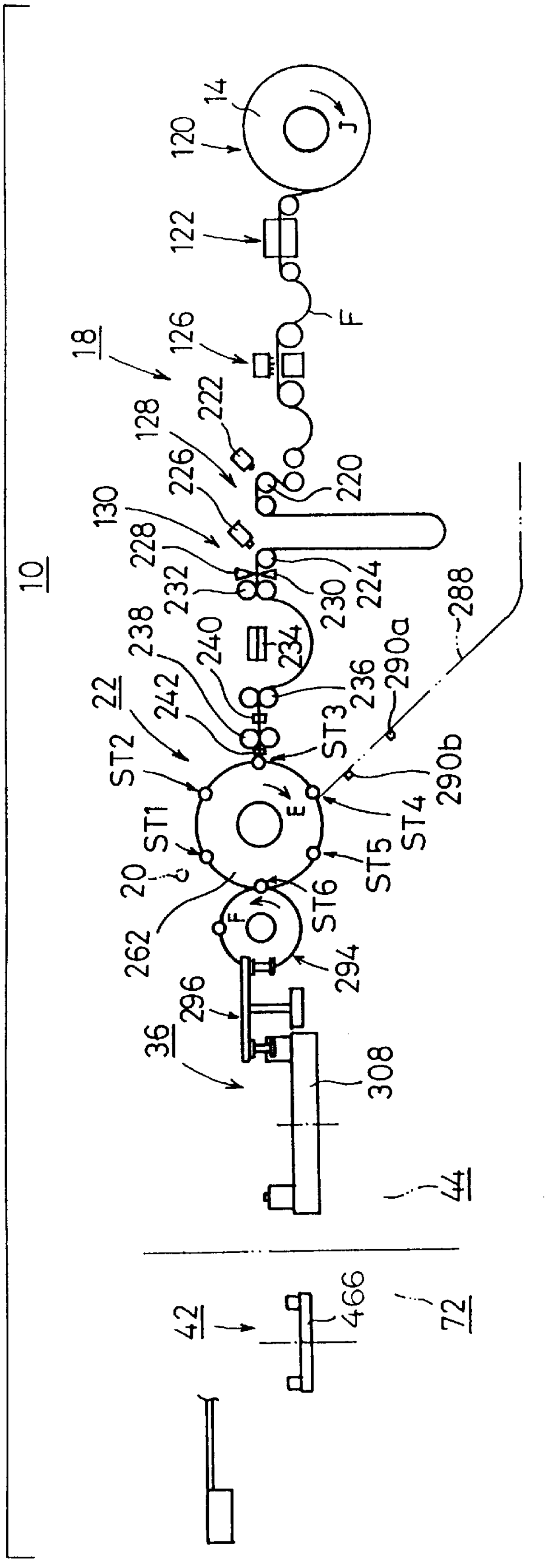
FIG. 7 is a schematic view of a production line extending from the film supply unit to an assembling unit of the processing and packaging apparatus.

As shown in FIGS. 6 and 7, the film supply unit 18 has a feeder 120 for holding a film roll 14 and unreeling the film roll 14, a splicer 122 for splicing the trailing end of the film roll 14 to the leading end of a new film roll 14, a perforator 126 for forming perforations 124 (see FIG. 1) in both sides of an elongate film F unreeled from the film roll 14, a side printer 128 for recording latent images of prints on one or both sides of the elongate film F, and a cutter 130 for cutting the elongate film F to a predetermined length as a sized film 16.

Figure 8:
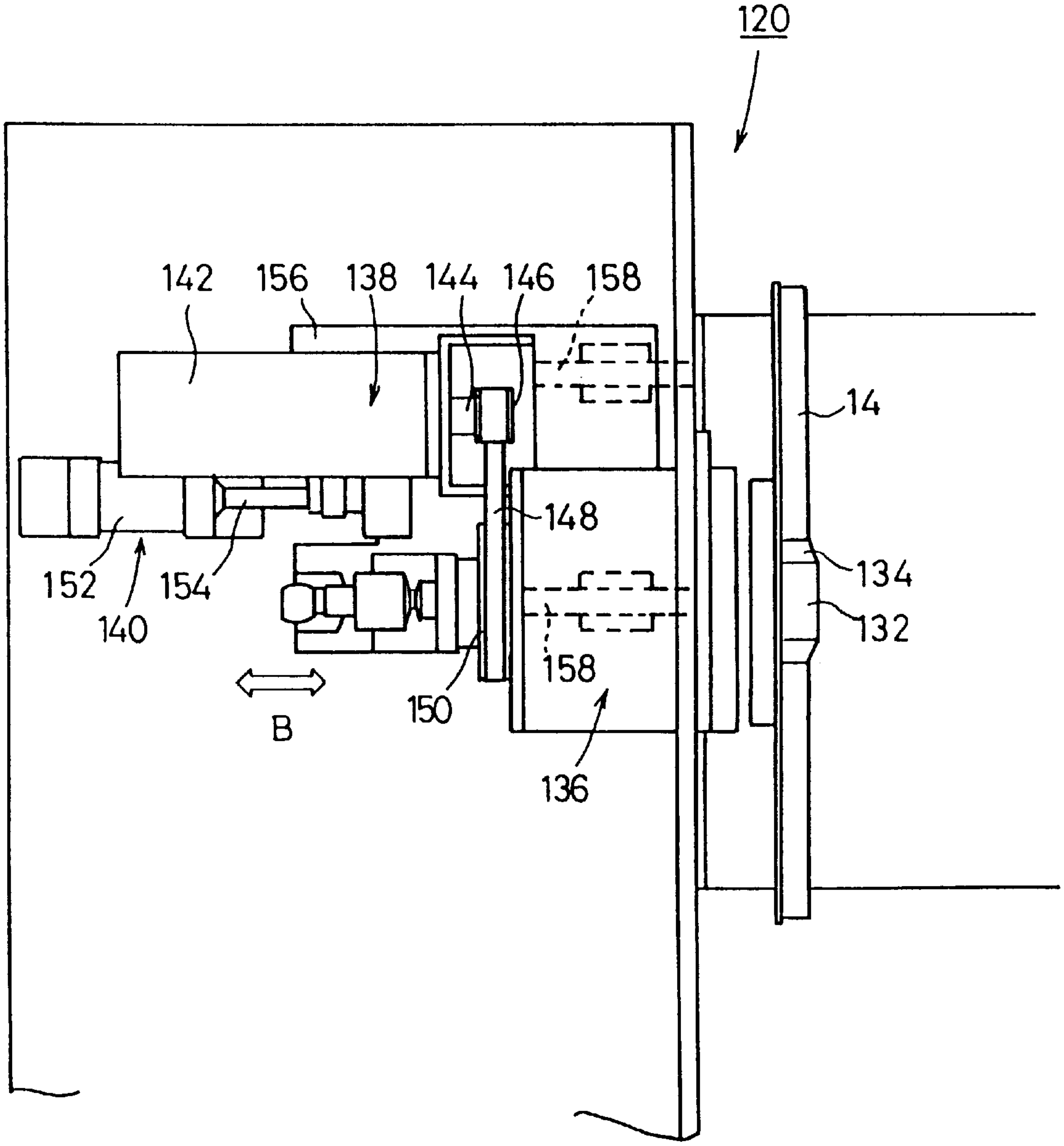
FIG. 8 is a plan view of a feeder of the film supply unit.

As shown in FIGS. 5 and 8, the feeder 120 has an unreeling shaft 132 coaxial with the shaft 100 of the film roll storage unit 86, for receiving one film roll 14, at a time, from the shaft 100. The unreeling shaft 132 is equipped with an air chuck 136 having three angularly spaced claws 134 movable radially with respect to the unreeling shaft 132. The unreeling shaft 132 can be rotated about its own axis by a rotary actuator 138, and can also be axially moved in the directions indicated by the arrows B by a linear actuator 140.

The rotary actuator 138 comprises a motor 142 having a drive shaft 144 on which a drive pulley 146 is mounted. A belt 148 trained around the drive pulley 146 is also trained around a driven pulley 150 mounted on the unreeling shaft 132. The linear actuator 140 comprises a cylinder 152 having a piston rod 154 fixed to a slide base 156 movably supported on a rail 158. The unreeling shaft 132 and the rotary actuator 138 are mounted on the slide base 156.

Figure 9:
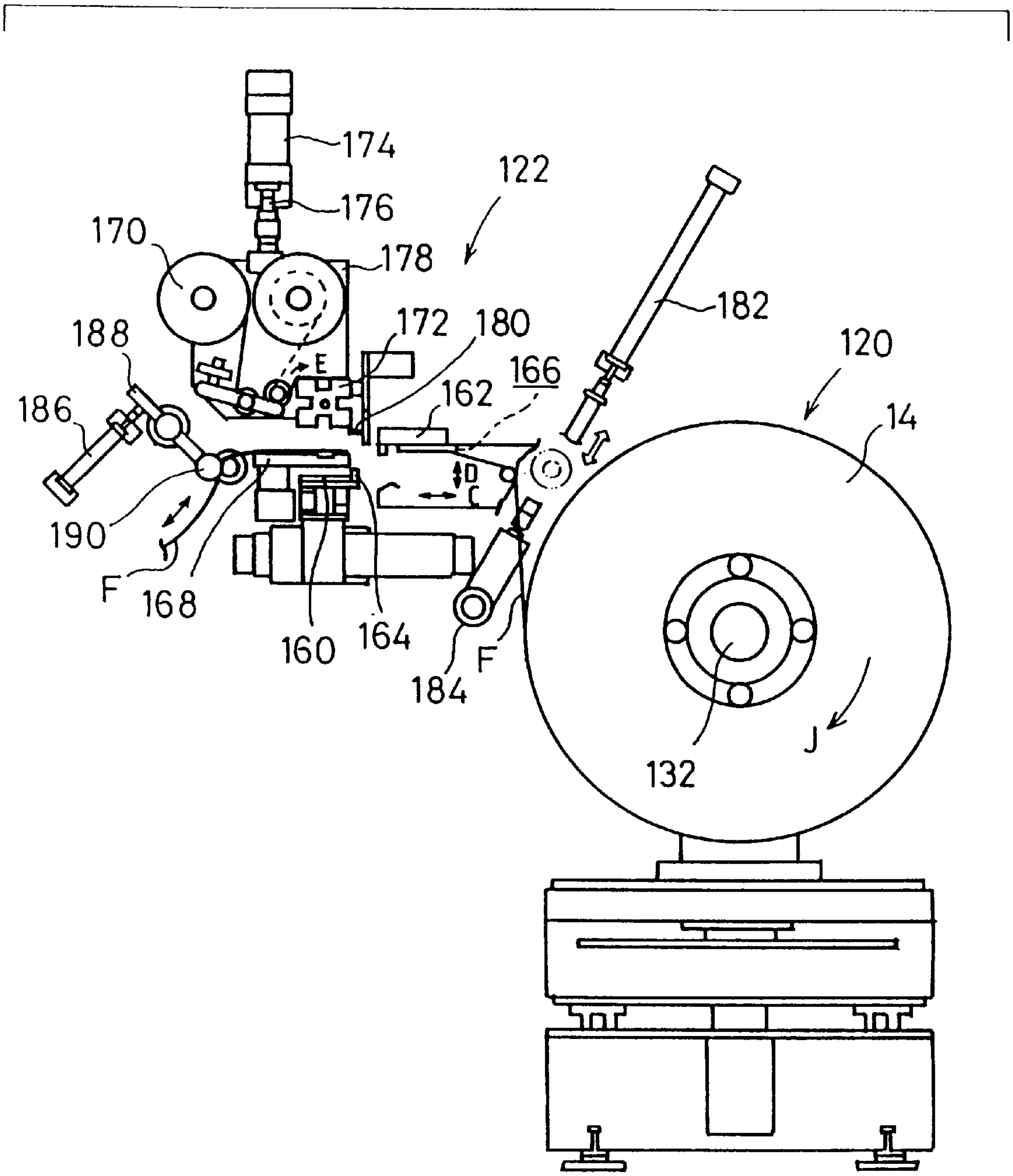
FIG. 9 is a side elevational view of the feeder.

As shown in FIG. 9, the splicer 122 comprises a splicing base 160 for attracting and holding the trailing end of an elongate film F and an auxiliary base 162 for attracting and holding the leading end of a new elongate film F. The splicing base 160 is horizontally and vertically movable in the directions indicated by the arrows C, D, and applies and presses the trailing end of the elongate film F attracted and held by the splicing base 160 overlappingly against the leading end of the new elongate film F attracted and held by the auxiliary base 162. The splicing base 160 has a positioning pin 164, and the auxiliary base 162 has a positioning hole 166 for receiving the positioning pin 164 therein.

An openable and closable guide 168 which comprises a parallel openable and closable air chuck is disposed above the splicing base 160 for positioning the trailing end of the elongate film F when a remaining length thereof is detected. Above the openable and closable guide 168, there is disposed an application base 172 of square cross section which is rotatable in the direction indicated by the arrow E for feeding a splicing tape 170, which comprises a double-sided adhesive tape, by a predetermined length in each cycle. The application base 172 is mounted on a lifting/lowering block 178 fixed to a piston rod 176 extending downwardly from a cylinder 174, and is vertically movable with a tape cutter 180 that is also mounted on the lifting/lowering block 178.

Elongate films F can be fed along a feed path that is associated with a path-forming roller 184 that is movable back and forth by a cylinder 182, and a nip roller 190 mounted on a swingable bar 188 held in engagement with a cylinder 186.

As shown in FIG. 6, the perforator 126 has a fixed die block 200 and a punch block 204 disposed upwardly of the die block 200 and vertically movable by an actuator (not shown) positioned below the die block 200. The perforator 126 also has a pair of suction chambers 206, 208 disposed respectively upstream and downstream of the punch block 204. A path roller 210 and a feed roller 212 are intermittently rotatably positioned upwardly of the suction chamber 206, and a sprocket roller 214 and a path roller 216 are intermittently rotatably positioned upwardly of the suction chamber 208.

As shown in FIG. 7, the side printer 128 comprises a first printing mechanism 222 disposed in confronting relationship to a constant-speed-feed path roller 220 and a second printing mechanism 226 disposed in confronting relationship to a constant-length-feed path roller 224. The first printing mechanism 222 records a web-shaped print depending on the type of the film as a latent image on one or both sides of elongate films F, and the second printing mechanism 226 records a DX bar code, frame numbers, frame number bar codes, a commercial name, depending on the size of the film as latent images on one or both sides of elongate films F.

The cutter 130 comprises a movable blade 228 and a fixed blade 230 which are disposed in vertically spaced and confronting relationship to each other, and cutting the elongate film F to a predetermined length as a sized film 16 depending on the desired size of the film 16. Downstream of the cutter 130, there are disposed end feed nip rollers 232, an openable and closable guide 234, insertion roller pairs 236, 238, and guide plates 240, 242. The openable and closable guide 234 is retractable out of the film feed path. As shown in FIG. 6, a suction discharger 244 is disposed below the openable and closable guide 234.

Figure 10:
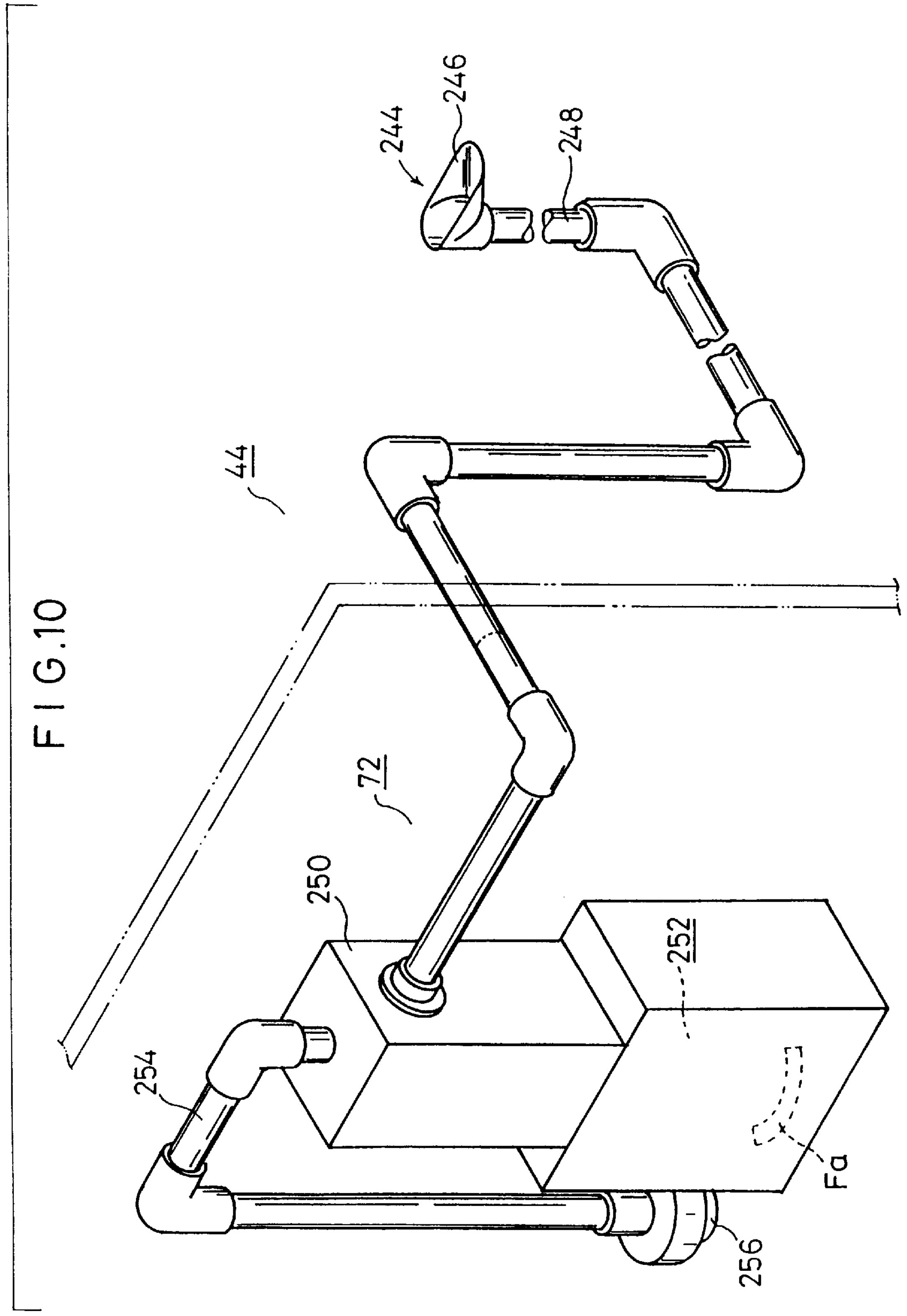
FIG. 10 is a perspective view of a suction discharger of the film supply unit.

As shown in FIGS. 6 and 10, the suction discharger 244 has a discharge receptacle 246 movable into and out of the film feed path. The discharge receptacle 246 is connected to an end of a discharge chute 248 in the form of a pipe of a synthetic resin such as vinyl chloride, for example. The other end of the discharge chute 248 extends from the dark chamber 44 into the bright chamber 72 where it communicates with an accumulation chamber 252 (see FIG. 10) within a discharge box 250. To an upper portion of the discharge box 250, there is connected an end of a pipe 254 which extends vertically downwardly and is connected to an air blower (or suction device) 256.

Figure 11:
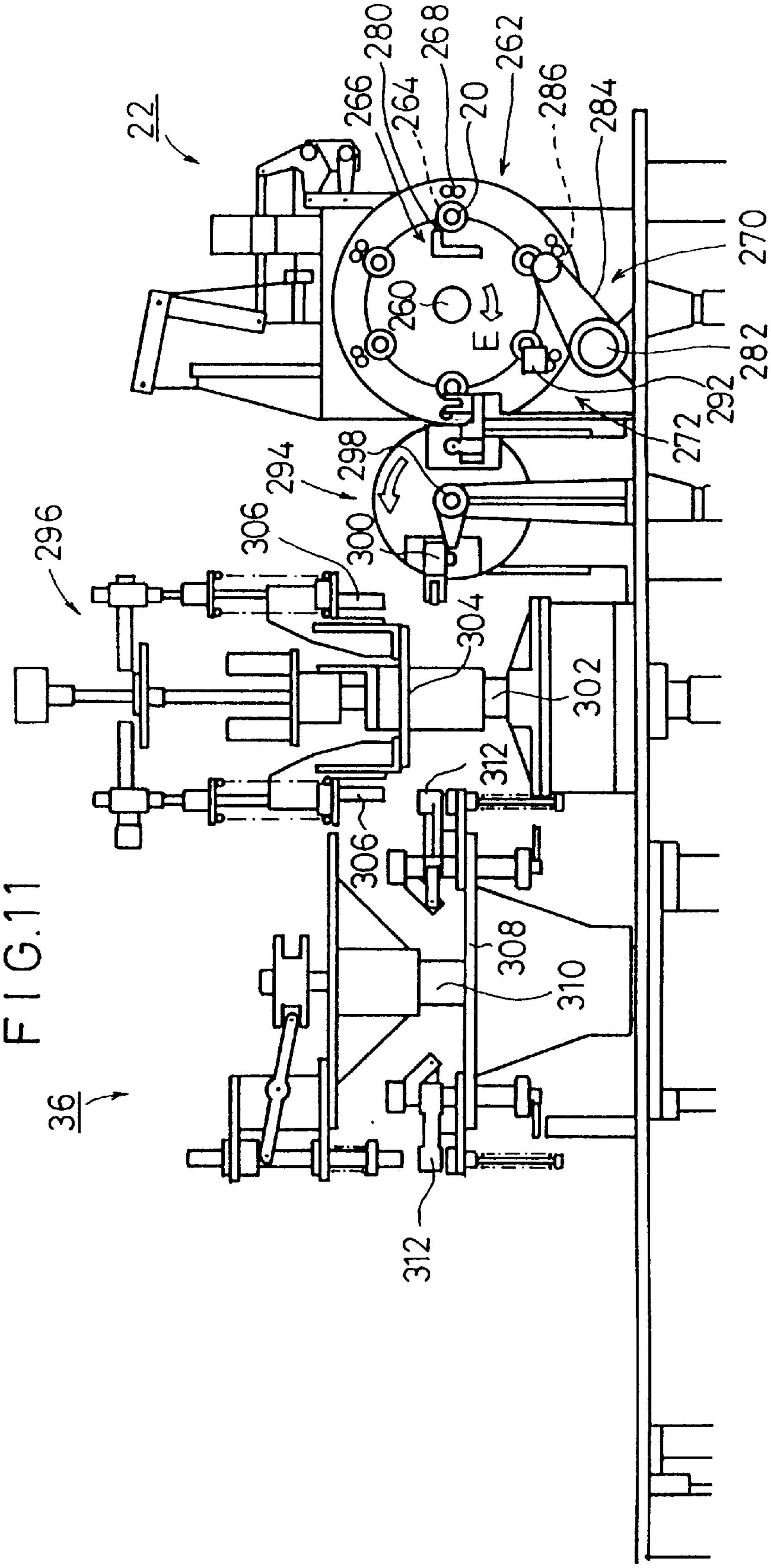
FIG. 11 is a side elevational view of a film winding unit and the assembling unit of the processing and packaging apparatus.

As shown in FIGS. 6 and 11, the film winding unit 22 comprises a turntable 262 fixed to a main shaft 260 rotatable in the direction indicated by the arrow E, a plurality of, e.g., six, spool chucks 264 mounted at equal angular intervals on the turntable 262, a spool positioner 266 for positioning spools 20 held by the spool chucks 264, a plurality of nip rollers 268 for pressing sized films 16 with their leading ends **16*a* inserted in the spools 20, a prewinder 270 for prewinding the sized films 16, and a winder 272 for winding the sized films 16 which have been prewound by the prewinder 270**.

As shown in FIG. 7, the turntable 262 has thereon a spool supply station ST1, a spool positioning station ST2, an inserting station ST3, a prewinding station ST4, a winding station ST5, and a transfer station ST6 which are successively angularly positioned clockwise (in the direction indicated by the arrow E) in the order named. The turntable 262 is associated with a self-locking brake (not shown) for preventing the spools 20 from rotating.

Figure 12:
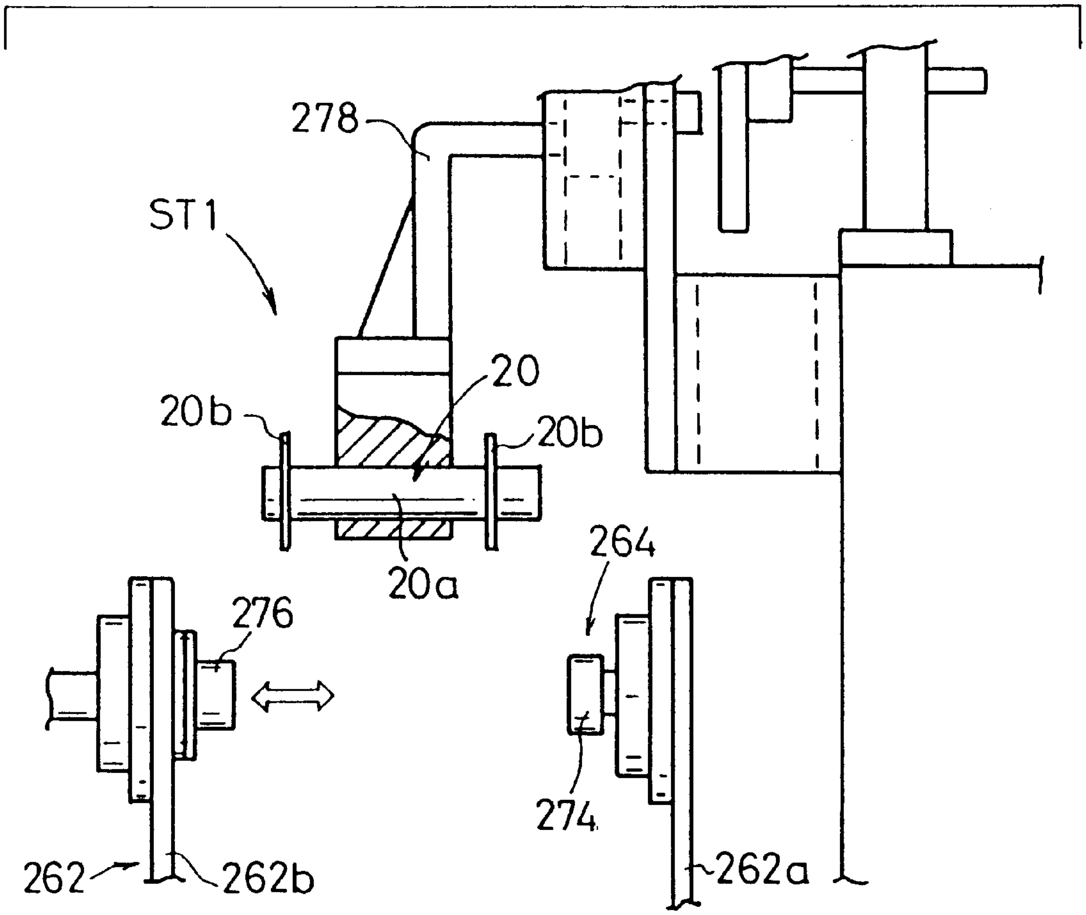
FIG. 12 is a view showing a spool chuck of the film winding unit.

As shown in FIG. 12, the turntable 262 comprises two rotatable plates **262*a*, 262*b*. The spool chucks 264 comprise respective fixed chucks 274 fixedly mounted on the rotatable plate 262***a*, and respective movable chucks 276 mounted on the rotatable plate 262*b*, the movable chucks 276 being movable back and forth in the directions indicated by the arrows by springs or the like (not shown). In the spool supply station ST1, a spool 20 is brought into a position between the fixed and movable chucks 274, 276 of one of the spool chucks 264 by a vertically movable support arm 278.

As shown in FIG. 11, the spool positioner 266 has a finger 280. While the finger 280 is held in abutment against the spool 20 held by one of the spool chucks 264 by a spring or a cylinder (not shown), the spool 20 is rotated through a clutch to bring the finger 280 into engagement with a step of the spool 20.

The prewinder 270 comprises a prewinding motor 282 that is operatively coupled to a main shaft 286 by a belt and pulley 284. The main shaft 286 has a touch roller (not shown) that is brought into contact with the movable chuck 276 of one of the spool chucks 264 to rotate the spool 20 supported thereby at a constant rotational speed.

A film guide 288 (see FIG. 7) extends toward the prewinding station ST4, and is associated with first and second photosensors 290*a*, 290*b* spaced from each other along the film guide 288. When a trailing end 16*c* of a sized film 16 prewound on a spool 20 in the prewinding station ST4 passes across the first photosensor 290*a*, the prewinder 270 is decelerated. When the same trailing end 16*c* passes across the second photosensor 290*b*, the prewinder 270 is stopped.

The winder 272 comprises a winding motor 292 (see FIG. 11) that can be connected coaxially to a chuck drive shaft of one of the spool chucks 264 through a clutch (not shown).

As shown in FIGS. 7 and 11, a first transfer unit 294 and a second transfer unit 296 are disposed downstream of the film winding unit 22. The first transfer unit 294 receives a roll 32, which comprises a sized film 16 wound on a spool 20, from one of the spook chucks 264, and converts the roll 32 from a horizontal attitude to a vertical attitude while making a 180° turn about its own axis. The first transfer unit 294 comprises a rotatable shaft 298 and a holder 300 rotatable by the rotatable shaft 298 in the direction indicated by the arrow F.

The second transfer unit 296 comprises a turntable 304 supported by a vertical rotatable shaft 302 and rotatable about a vertical axis by the vertical rotatable shaft 302. A plurality of vertically movable grips 306 are mounted on the turntable 304. The second transfer unit 296 inserts a roll 32 received from the first transfer unit 294 into a one-end-open cartridge 28 placed on an index table 308 of the assembling unit 36.

The index table 308 is fixedly mounted on a vertical rotatable shaft 310 for indexing movement to eight angularly spaced positions. Chucks 312 is mounted on the index table 308 for positioning and holding one-end-open cartridges 28 in respective stations (described below) corresponding to those eight angularly spaced positions.

Figure 13:
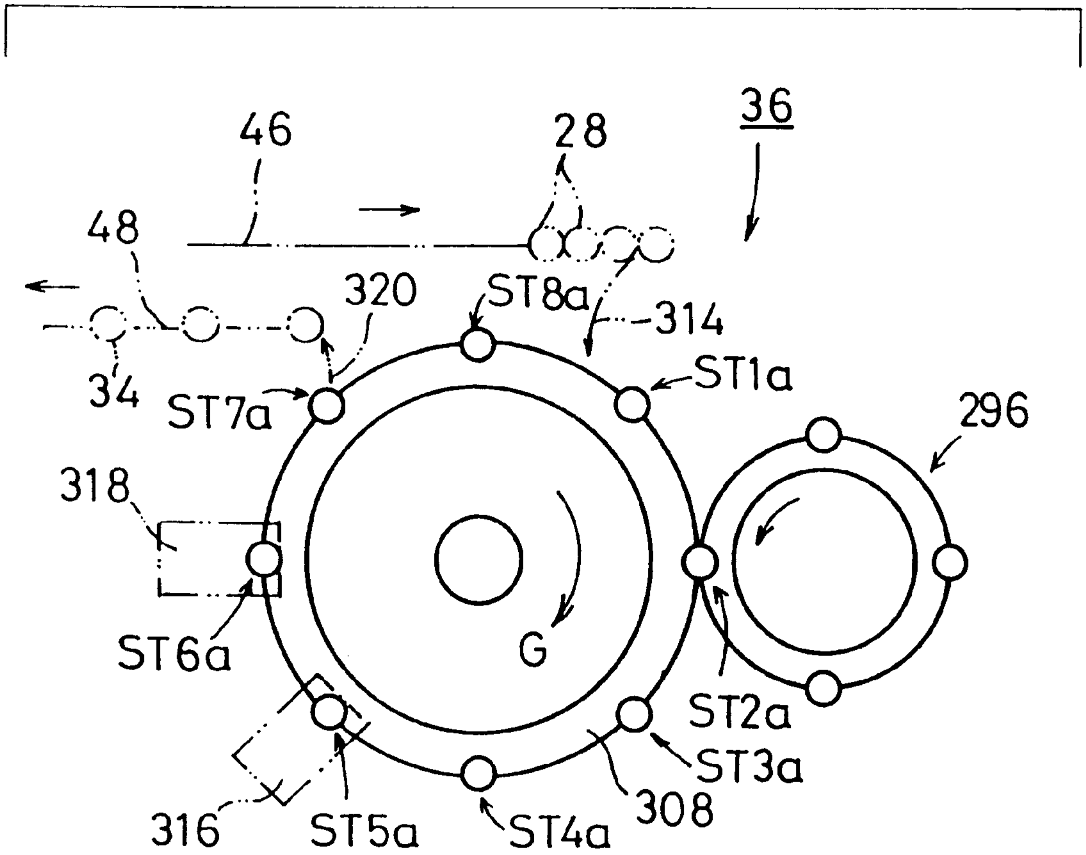
FIG. 13 is a plan view of the assembling unit.

As shown in FIG. 13, the index table 308 can successively be indexed to a one-end-open cartridge supply station ST1*a*, a film-wound spool inserting station ST2*a*, a tongue (the trailing end 16*c* of a sized film 16) detecting station ST3*a*, a centering station ST4*a*, a cap supply station ST5*a*, a cap crimping station ST6*a*, a defective product ejecting station ST7*a*, and a defective product ejecting station ST8*a*.

The one-end-open cartridge supply station ST1*a* is associated with a loading unit 314 for loading a one-end-open cartridge 28 from the first straight feed path 46 onto the index table 308. The cap supply station ST5*a* is associated with a cap feed unit 316. The cap crimping station ST6*a* is associated with a pressing unit 318. The defective product ejecting station ST7*a* is associated with an unloading unit 320 for unloading a film-contained cartridge 34 from the index table 308 to the second straight feed path 48.

Figure 14:
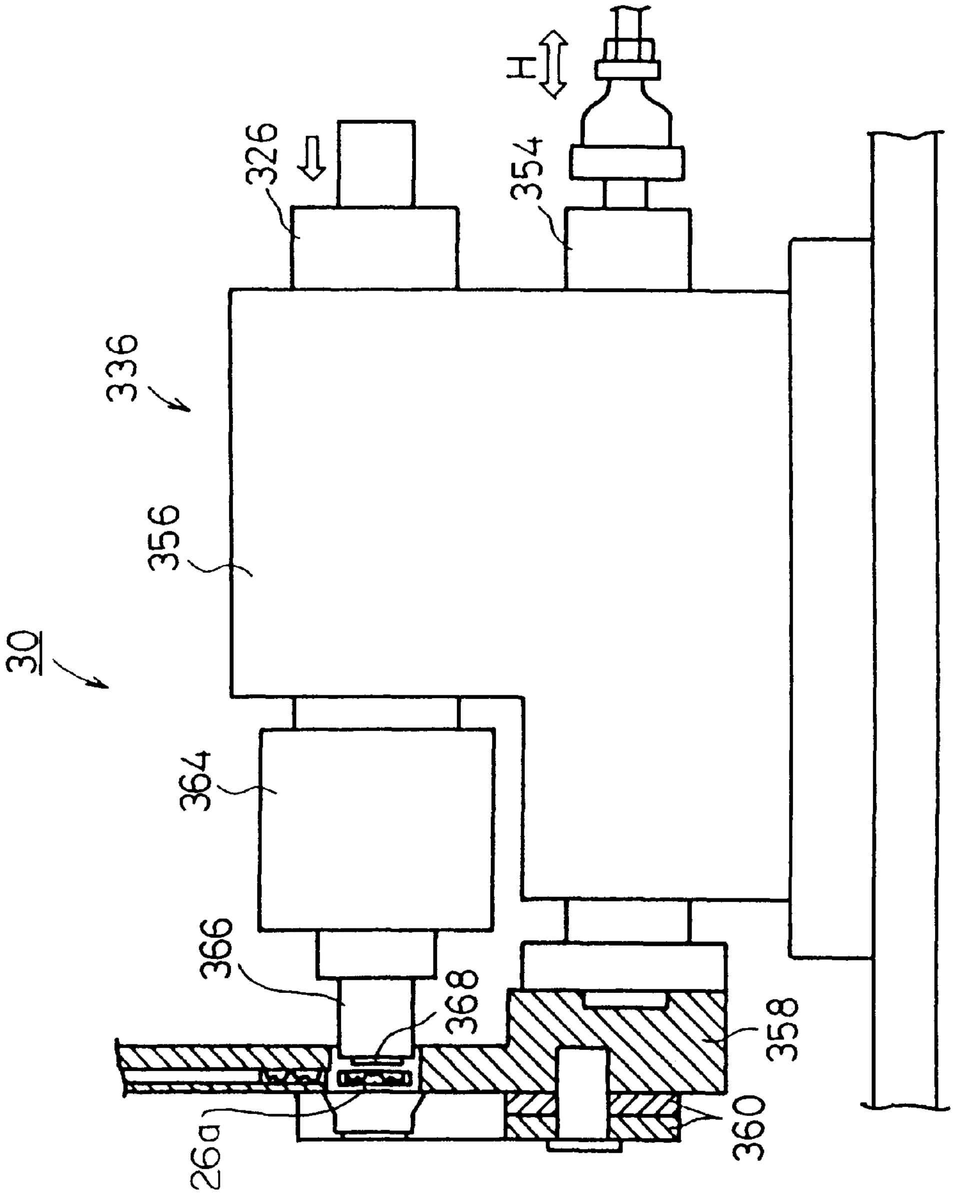
FIG. 14 is a side elevational view, partly in cross section, of a cartridge production unit of the processing and packaging apparatus.
Figure 15:
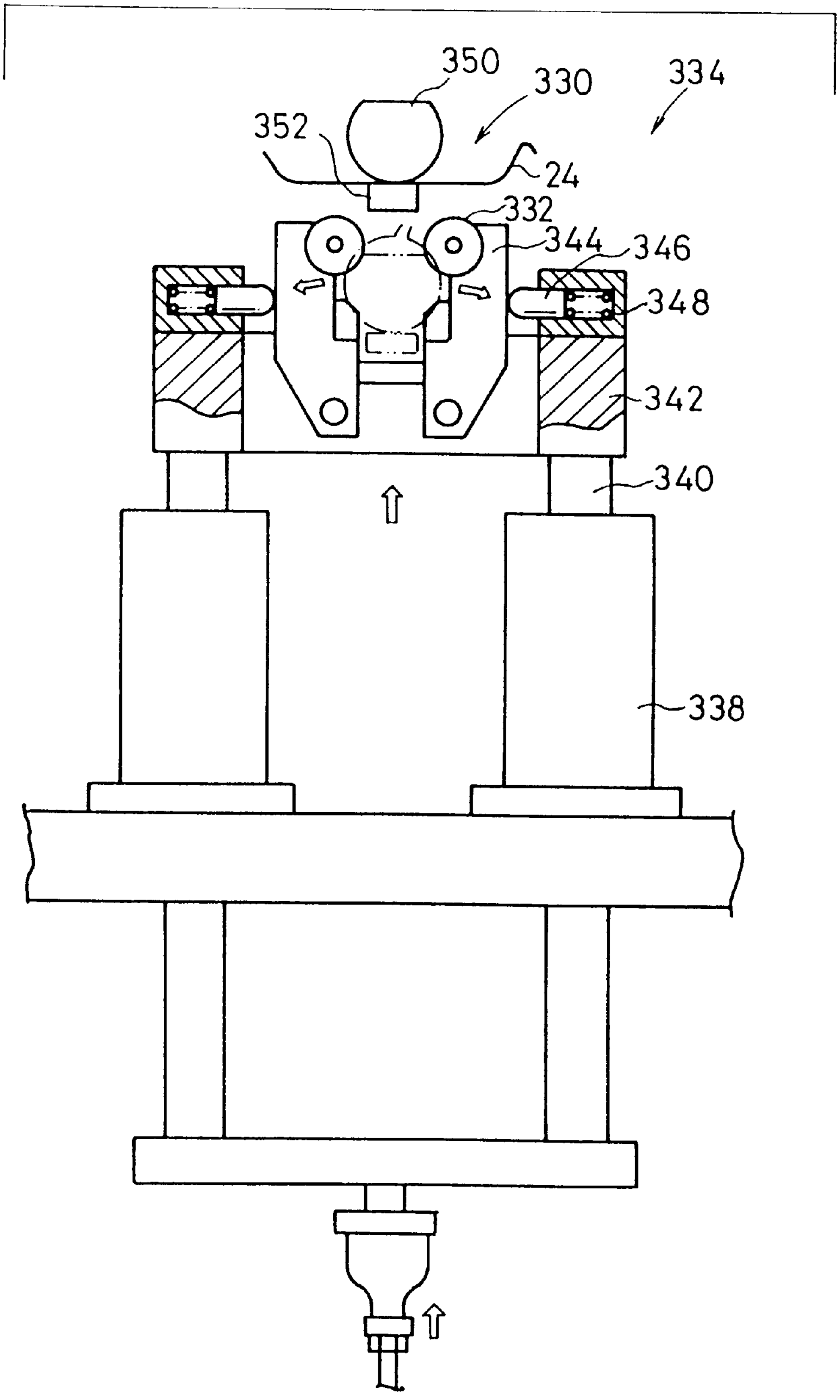
FIG. 15 is a front elevational view, partly in cross section, of the cartridge production unit.

As shown in FIGS. 14 and 15, the cartridge production unit 30 comprises a support pressing mechanism 330 for forming a lower portion of a barrel plate 28, a rounding roller mechanism 334 for rounding the barrel plate 28 with two pairs of vertically movable rounding rollers 332, and a crimping mechanism 336 for crimping a cap 26*a* on an end of the rounded barrel plate 28.

As shown in FIG. 15, the rounding roller mechanism 334 has a pair of vertical shafts 340 vertically movably supported in respective housings 338 and vertically actuatable by a cam (not shown), and a pair of roller holders 342 fixed respectively to the shafts 340. A pair of arms 344 is swingably supported on the respective roller holders 342. The rounding rollers 332 are rotatably mounted on respective ends of the arms 344. Pressers 346 supported respectively on the roller holders 342 are normally biased to be slidably held against the arms 344 by respective springs 348. The support pressing mechanism 330, which is positioned above the arms 344, comprises a core 350 and a support 352 which jointly hold the barrel plate 28. Actually, a plurality of angularly spaced cores 350 are mounted on a rounding index disk 370 (see FIG. 16).

The crimping mechanism 336 has a holder 356 which holds a shaft 354 that is axially movable in the directions indicated by the arrow H in FIG. 14, and a pair of openable and closable chucks 360 is mounted on an end of the shaft 354 by a chuck holder 358. A crimping head 364 is supported on the holder 356 by a shaft 326, and has finger ends 368 openable and closable by a shaft 366 that is reciprocally movably held in the shaft 326.

Figure 16:
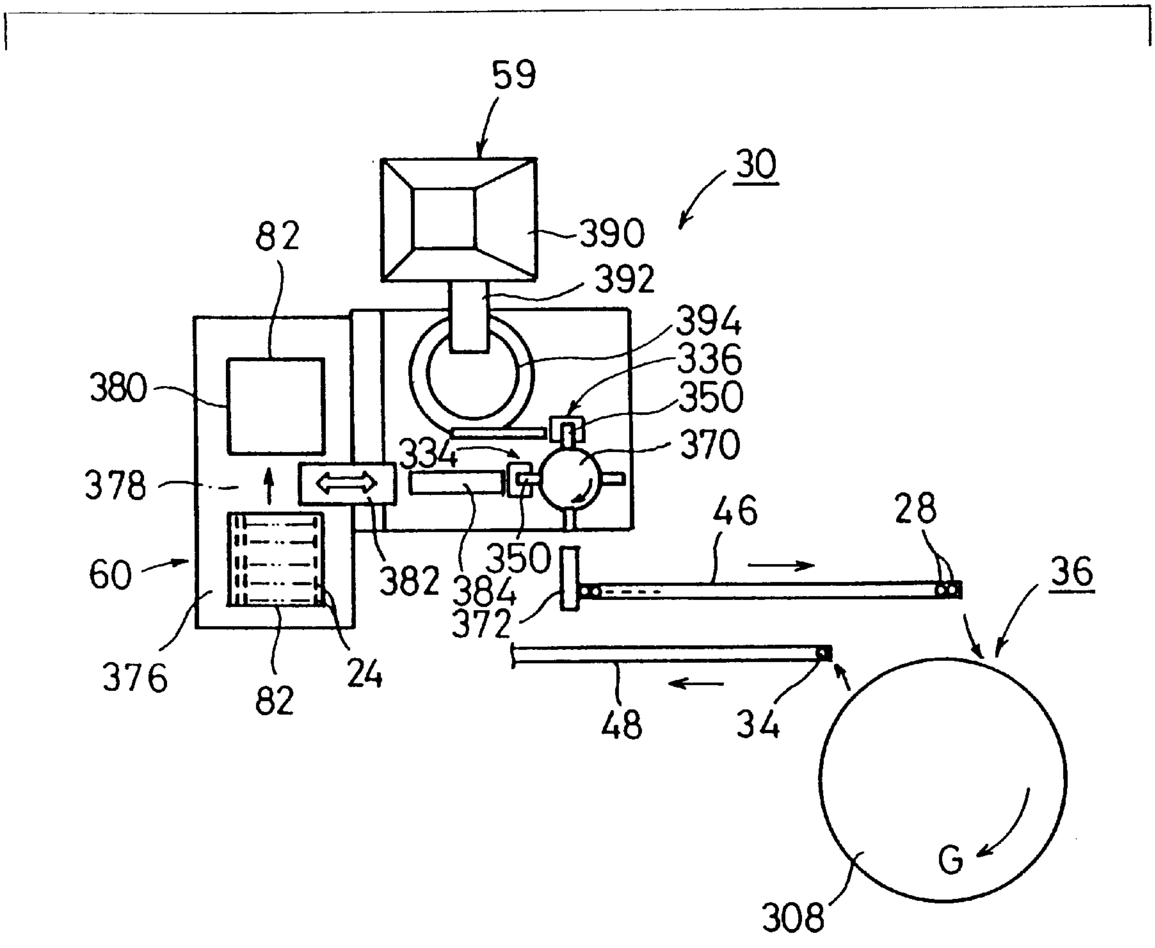
FIG. 16 is a plan view of the cartridge production unit.

As shown in FIG. 16, barrel plates 24 are rounded into one-end-open cartridges 28 by a rounding index disk 370, which rotates about its own axis, in coaction with the rounding roller mechanism 334 and the crimping mechanism 350, and the one-end-open cartridges 28 produced by the rounding index disk 370 are held by an oblique feed path 372 and then converted from a horizontal attitude to a vertical attitude, after which they are delivered into the first straight feed path 46.

The barrel plate supply unit 60 disposed adjacent to the cartridge production unit 30 has an inlet position 376 for introducing a container 82 which contains a plurality of barrel plates 24 vertically in a plurality of arrays, e.g., five arrays, a removal position 378 for removing one array, at a time, of barrel plates 24 from the container 82, and an outlet position 380 for discharging an empty container 82 from which all barrel plates 24 have been removed. The barrel plate supply unit 60 has a barrel plate removal mechanism 382 aligned with the removal position 378. The barrel plate removal mechanism 382 is movable between the container 82 and an inclined conveyor 384 which serves to deliver barrel plates 24 to the rounding index member 370.

The cap supply unit 52 has a hopper 390 for storing a plurality of caps 26*a*. A vertically movable component lifter 392 for removing a certain number of caps 26*a* from the hopper 390 and holding the removed caps 26*a* is reciprocally movably positioned between the hopper 390 and a feeder 394 positioned upwardly of the hopper 390. The component lifter 392 removes a certain number of caps 26*a* from the hopper 390 in the lower end of its vertical stroke, then is lifted, and automatically supplies the caps 26*a* to the feeder 294.

Figure 17:
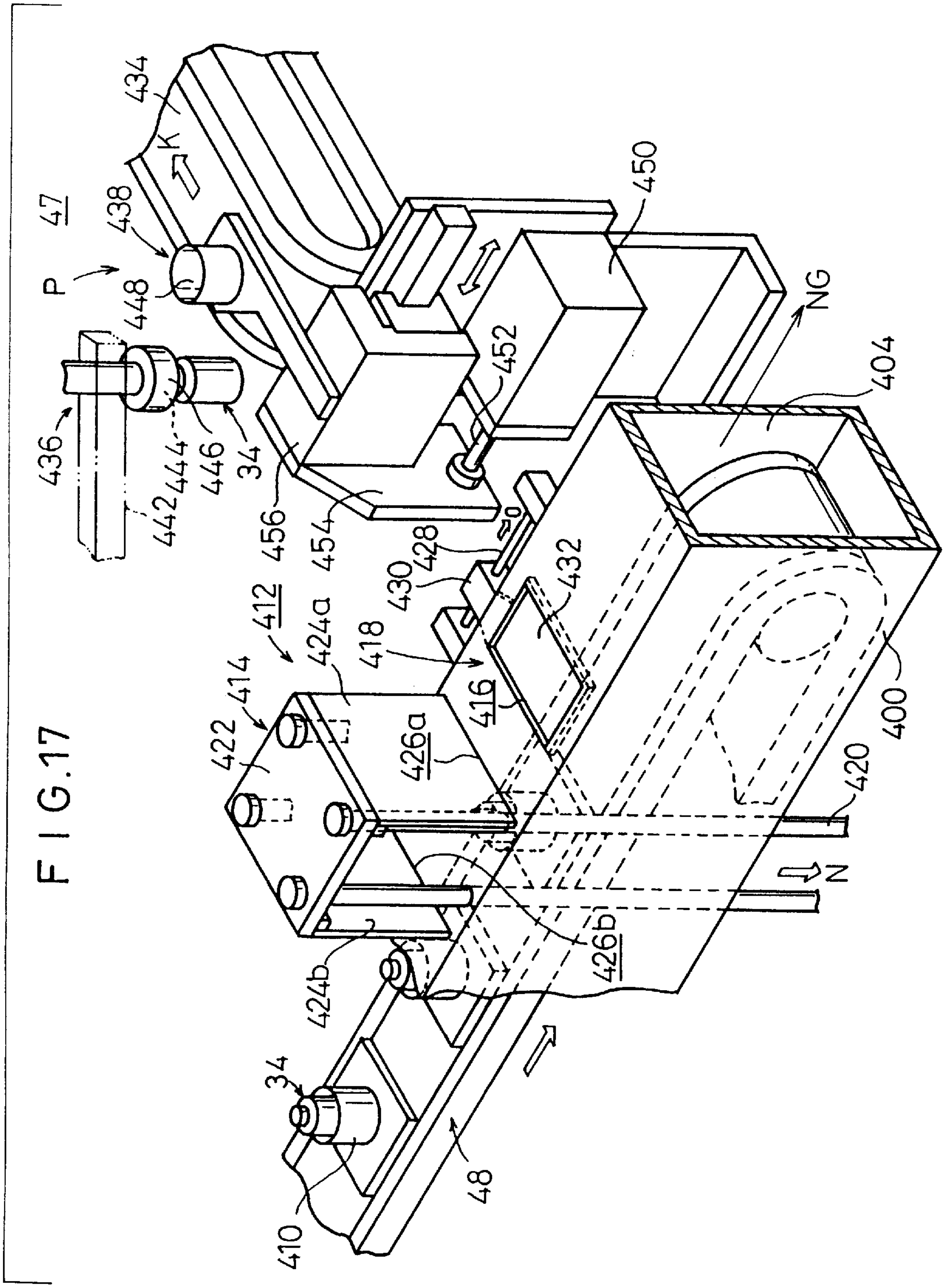
FIG. 17 is a perspective view of a switching feed mechanism and a light-tight mechanism of the processing and packaging apparatus.

As shown in FIG. 17, the second straight feed path 48 is covered with a light-tight cover 400. for preventing ambient light from entering from the bright chamber 72 into the dark chamber 44 along the second straight feed path 48. At a terminal end of the second straight feed path 48, there are disposed a torque detector for detecting with a torque checker a vertical torque applied when the trailing end 16*c* of a sized film 16 projecting from a film-contained cartridge 34 is pulled out to a predetermined length, and judging a film-contained cartridge 34 which requires a vertical torque greater than a given torque, as a defective cartridge, a length detector for detecting the length of the trailing end 16*c*, a height detector for detecting the height of a film-contained cartridge 34 which has been increased due to a failure to crimp a cap 26*b* or the like, and a cap detector for detecting whether there is a cap 26*b* or not. A film-contained cartridge 34 which has been judged as a defective cartridge is discharged from an ejector gate 404 of the light-tight cover 400.

The second straight feed path 48 has a plurality of buckets 410 for feeding film-contained cartridges 34 at given spaced intervals. A light-tight mechanism 412 is disposed on the terminal end of the second straight feed path 48, for preventing ambient light from being introduced into the second straight feed path 48 when film-contained cartridges 34 are removed from the second straight feed path 48.

The light-tight mechanism 412 has a shutter mechanism 414 vertically movably mounted on the light-tight cover 400 and an opening and closing mechanism 418 for selectively opening and closing an opening 416 defined in the light-tight cover 400. The shutter mechanism 414 has a plurality of vertically movable rods 420 vertically movable by a cam (not shown), and a support plate 422 connected to upper ends of the rods 420. The shutter mechanism 414 also has vertical shutter plates 424*a*, 424*b* fixed to and hanging downwardly from opposite side edges of the support plate 422. The shutter plates 424*a*, 424*b* extend parallel to each other and are spaced from each other by a distance equal to each of the spaced intervals between adjacent film-contained cartridges 34 on the second feed path 48. The shutter plates 424*a*, 424*b* are inserted respectively in slits 426*a*, 426*b* defined in the light-tight cover 400.

The opening and closing mechanism 418 comprises a slide base 430 supported on a horizontally extending guide bar 428 disposed alongside of the light-tight cover 400 and horizontally movable back and forth by a cam (not shown). A light-tight plate 432 for selectively opening and closing the opening 416 defined in the light-tight cover 400 is connected to the slide base 430. The shutter mechanism 414 and the opening and closing mechanism 418 are actuatable in synchronism with each other such that while the light-tight cover 400 is being closed by the shutter mechanism 414, the opening 416 is opened by the opening and closing mechanism 418.

Figure 18:
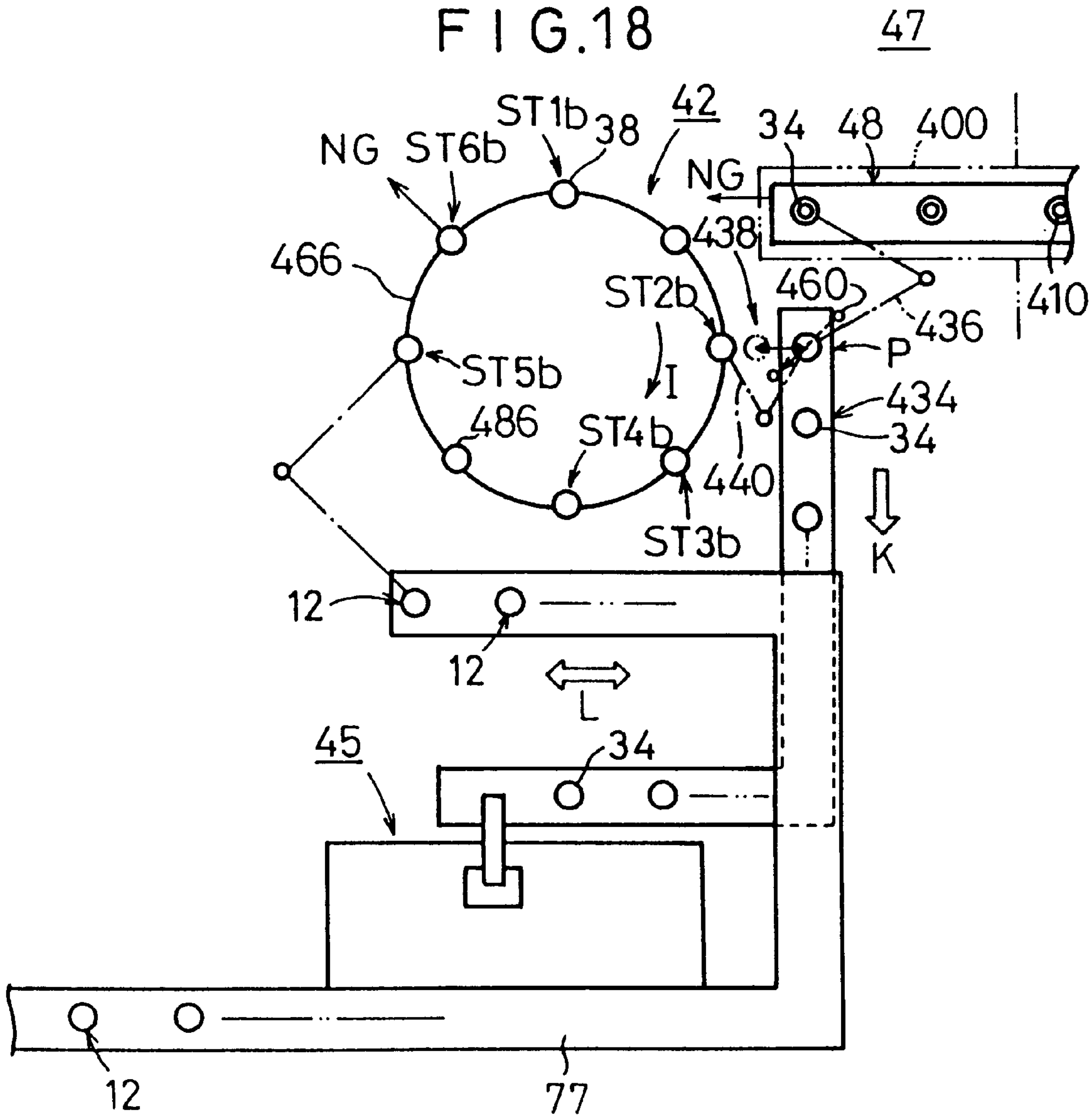
FIG. 18 is a plan view of the switching feed mechanism and an encasing unit of the processing and packaging apparatus.

As shown in FIGS. 17 and 18, the switching feed mechanism 47 comprises a feed path 434 for feeding film-contained cartridges 34 to the film-contained cartridge accumulating unit 45, a first loading unit (first delivery unit) 436 for holding a film-contained cartridge 34 discharged from the assembling unit 36 and delivering the film-contained cartridge 34 to a transfer position P on the feed path 434, a support unit 438 movable toward and away from the transfer position P, for temporarily supporting the film-contained cartridge 34 delivered by the first loading unit 436, and a second loading unit (second delivery unit) 440 for delivering the film-contained cartridge 34 supported by the support unit 438 to the encasing unit 42.

As shown in FIG. 17, the first loading unit 436 has a magnet 444 supported on a vertically movable, swingable arm 442 and housed in a holder 446. When the magnet 444 is lowered toward a bottom of the holder 446, it magnetically attracts a film-contained cartridge 34. The magnet 444 releases the film-contained cartridge 34 when it moves upwardly away from the bottom of the holder 446.

The support unit 438 comprises a bucket 448 for placing a film-contained cartridge 34 therein, and a cylinder (actuator) 450 for moving the bucket 448 toward and away from the transfer position P on the feed path 434. The cylinder 450 is fixed in position below the feed path 434, and has a horizontally extending piston rod 452 to which a slide base 456 is supported by a joint plate 454. The bucket 448 is disposed on the slide base 456. A detector 460 such as a phototube switch or the like is positioned in sandwiching relationship to the bucket 448 (see FIG. 18).

The encasing unit 42 comprises an index table 466 rotatable about its own axis clockwise in the direction indicated by the arrow I for indexing movement to eight angularly spaced positions. The index table 466 can successively be indexed to a case supply station ST1*b* for supplying a case 38, a cartridge inserting station ST2*b* for inserting a film-contained cartridge 34 into the case 38, a cartridge detecting station ST3*b* for detecting whether there is a film-contained cartridge 34 or not, a case cap inserting station ST4*b* for inserting a case cap 40 into the open end of the case 38, a normal packaged product discharging station ST5*b* for discharging a normal packaged product 12 onto the feed conveyor 77, and a defective packaged product discharging station ST6*b* for discharging a defective packaged product 12. The feed conveyor 77 extends alongside of the index table 466 in the direction indicated by the arrow L, then extends above and long the feed path 434 in the direction indicated by the arrow K, and extends again in the direction indicated by the arrow L toward the packaged product accumulating unit 43.

Figure 19:
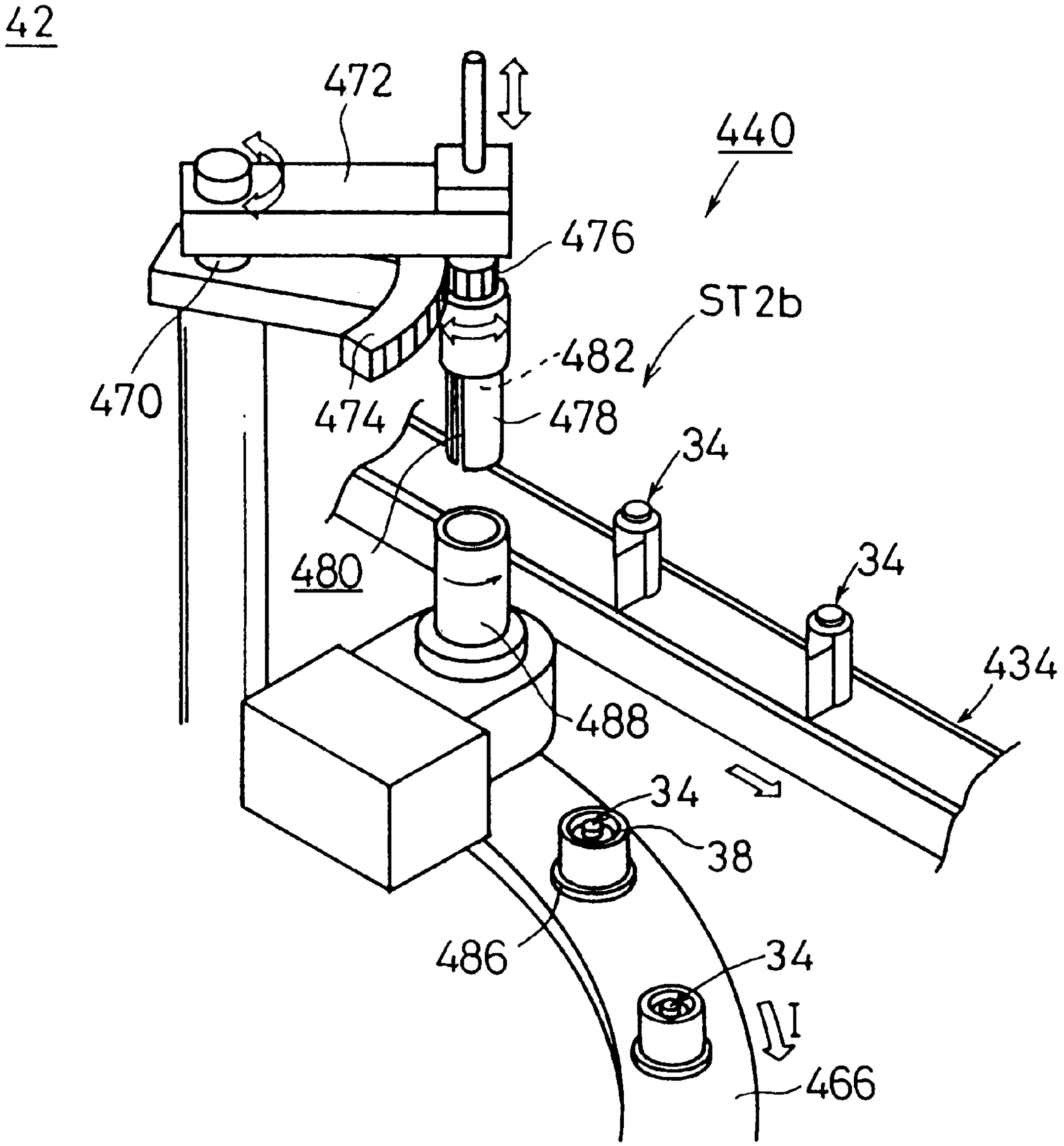
FIG. 19 is a fragmentary perspective view of the encasing unit.

As shown in FIG. 19, the second loading unit 440, which serves as a cartridge loading unit, is disposed in the cartridge inserting station ST2*b*. The second loading unit 440 has a rotatable shaft 470 rotatable about a vertical axis, a swing arm 472 having one end fixedly mounted on an upper end of the rotatable shaft 470, and a sector gear 474 attached to the upper end of the rotatable shaft 470 and lying below a distal end of the swing arm 472, the sector gear 474 having a center of curvature aligned with the shaft 470. The sector gear 474 is held in mesh with a gear 476 supported on an upper end of a tubular body 478 which is rotatably supported on the distal end of the swing arm 472. The tubular body 478 has a vertical slot 480 axially defined in a lower end portion thereof and having a certain width in the circumferential direction of the tubular body 478. A suction member 482 communicating with a vacuum source (not shown) is vertically movably disposed in the tubular body 478.

The swing arm 472 can position the tubular body 478 selectively over the bucket 448 on the feed path 434 and a bucket 486 on the index table 466. A tubular member 488 is disposed in the cartridge inserting station ST2*b* for guiding a case 38 pushed upwardly from the bucket 486.

Figure 20:
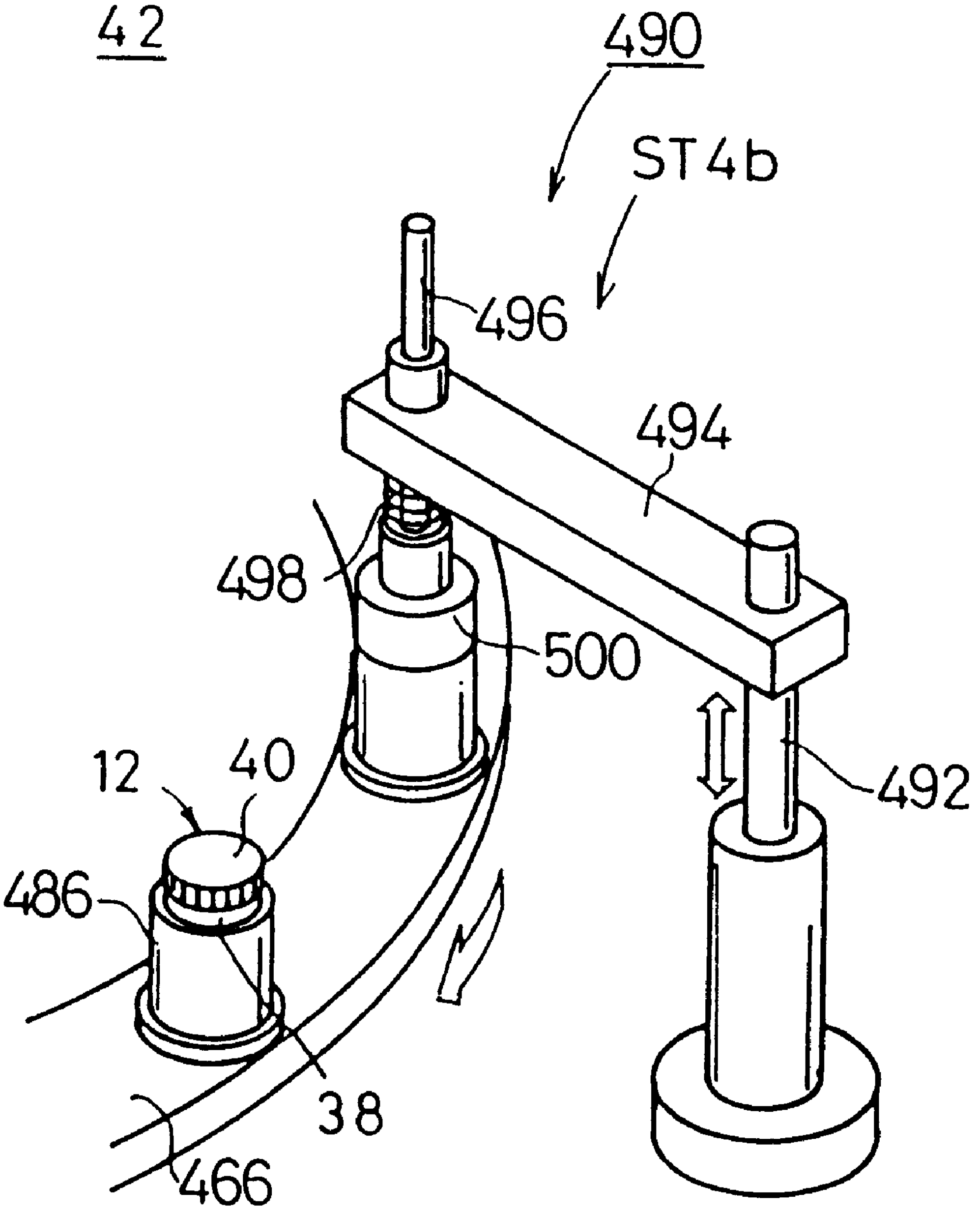
FIG. 20 is a fragmentary perspective view of the encasing unit.

As shown in FIG. 20, a capper 490 is disposed in the case cap inserting station ST4*b*. The capper 490 has a shaft 492 vertically movable by an actuating mechanism (not shown), and an arm 494 having an end fixed to an upper end of the shaft 492. A rod 496 vertically movably extends through the other end of the arm 494 with a spring 498 disposed around the rod 496 and acting on a presser 500 which is mounted on a lower end of the rod 496.

Figure 21:
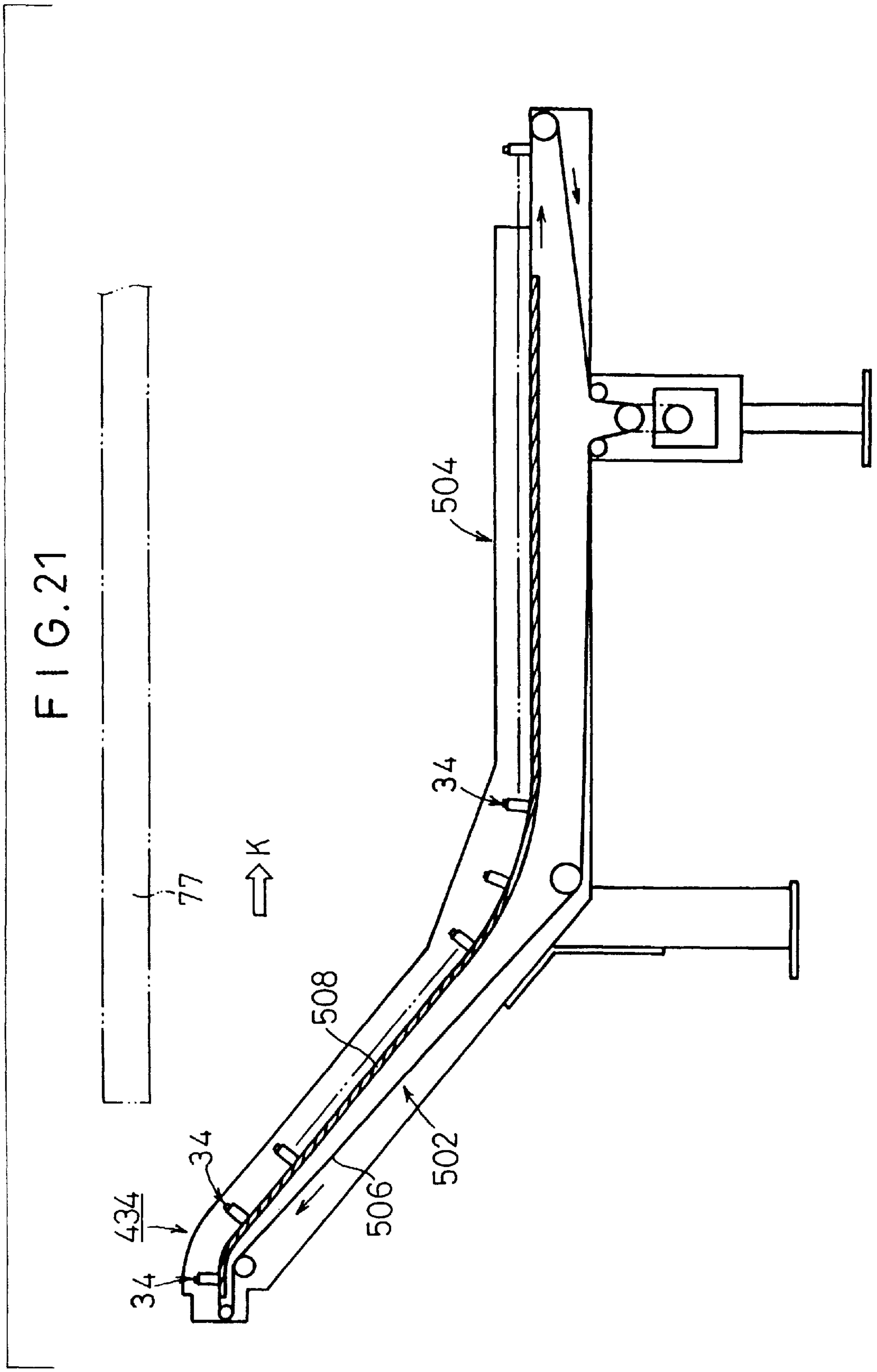
FIG. 21 is a side elevational view of a feed path of the switching feed mechanism.

As shown in FIG. 21, the feed path 434 comprises an inclined feed section 502 inclined downwardly in a feed direction indicated by the arrow K and a horizontal feed section 504 extending horizontally from a lower end of the inclined feed section 502. An endless feed belt 506 extends through the inclined feed section 502 and the horizontal feed section 504, and an elongate magnet 508 is disposed within the endless feed belt 506.

Figure 22:
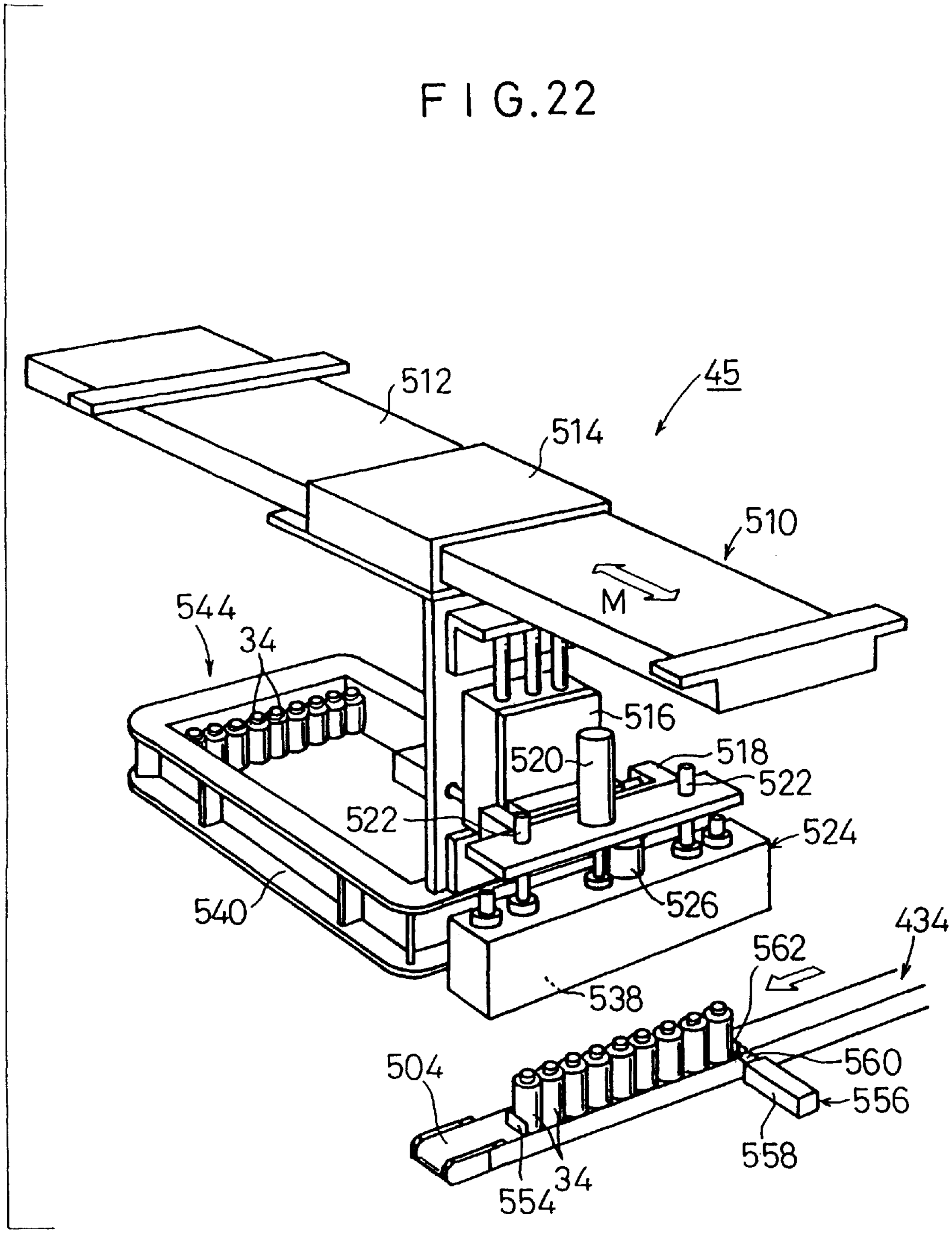
FIG. 22 is a perspective view of a film-contained cartridge accumulating unit of the processing and packaging apparatus.

The film-contained cartridge accumulating unit 45 is disposed in the vicinity of an end of the horizontal feed section 504 (see FIG. 22). As shown in FIG. 22, the film-contained cartridge accumulating unit 45 has a removal mechanism 510 for removing a group of film-contained cartridges 34 fed along the feed path 434 from the feed path 434. The removal mechanism 510 has a self-propelled movable base 514 movable along a horizontal frame 512 in the directions indicated by the arrow M, a vertically movable base 516 vertically movably supported by the movable base 514, and a main body 518 horizontally movably mounted on the vertically movable base 516.

Figure 23:
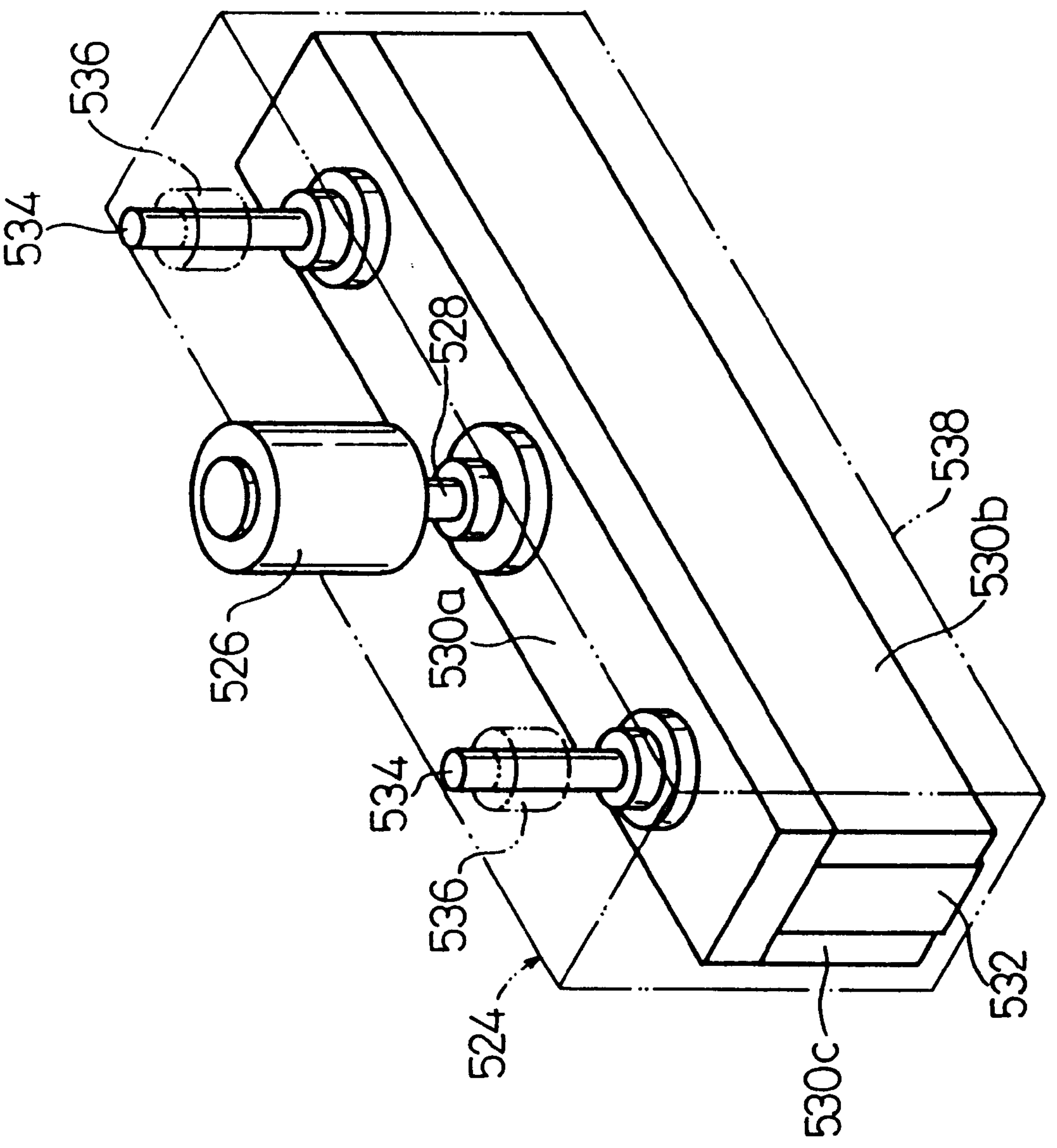
FIG. 23 is a perspective view of a removal mechanism of the cartridge accumulating unit.
Figure 24:
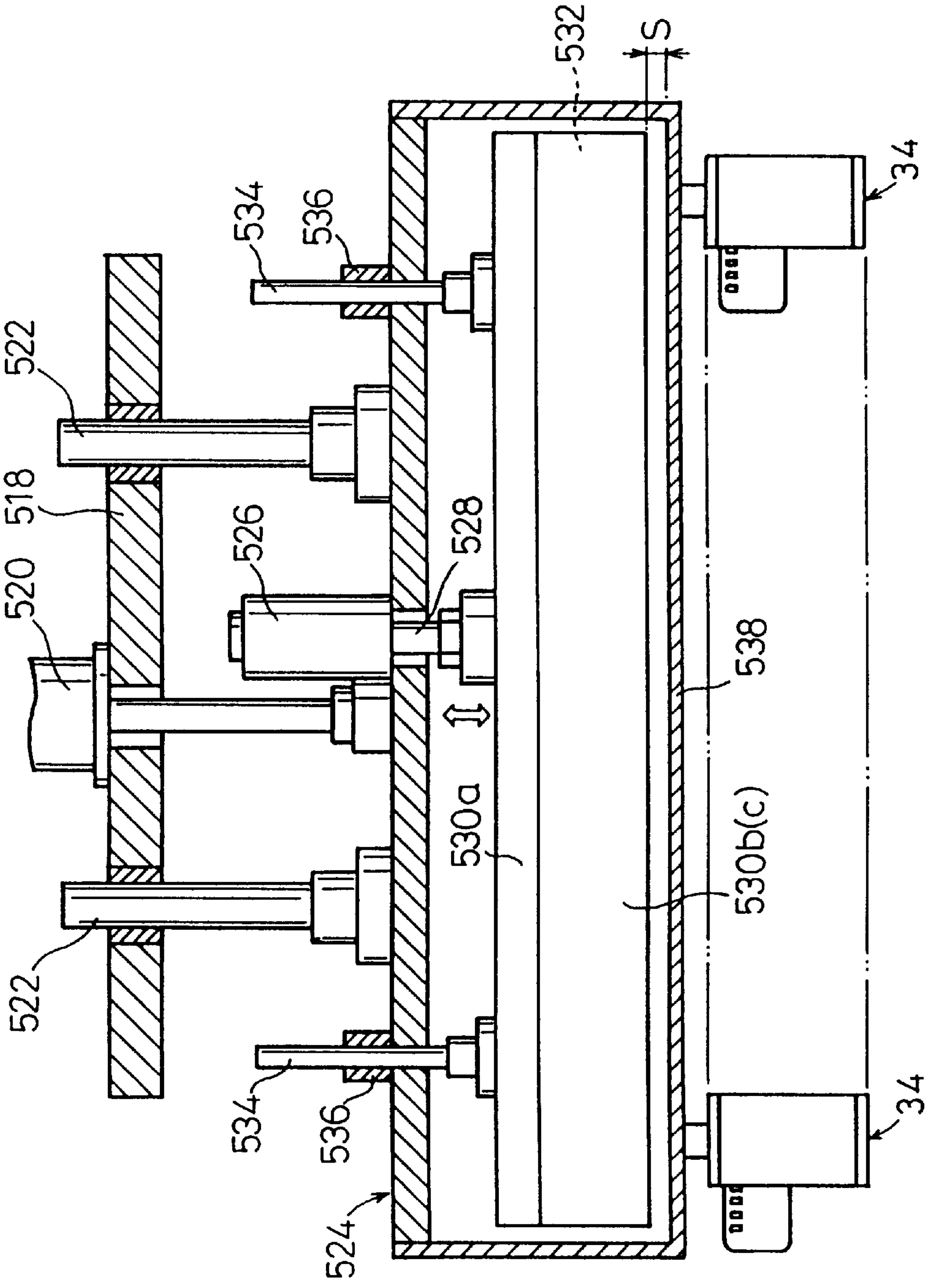
FIG. 24 is a vertical cross-sectional view of the removal mechanism.

A box 524 is fixed to the main body 518 by a cylinder 520 and a pair of guide rods 522. As shown in FIGS. 23 and 24, a cylinder 526 is fixedly mounted on an upper panel of the box 524 and has a downwardly extending rod 528 to which there is fixed a magnet 532 (such as a ferrite magnet) sandwiched by iron-base holders 530*a*~530*c*. The holders 530*a*~530*c* are vertically movably disposed in the box 524. Guide rods 534 are fixed to the holder 530*a* and guided by the box 524 through respective posts 536 mounted on the box 524. An abutment plate 538 is attached to the bottom of the box 524 for abutment against an array of film-contained cartridges 34 arranged on the feed path 434. The abutment plate 538 is made of a nonmagnetic material such as stainless steel, for example, to shield a magnetic field for thereby releasing the film-contained cartridges 34 when the magnet 532 is displaced away from the film-contained cartridges 34.

Figure 25:
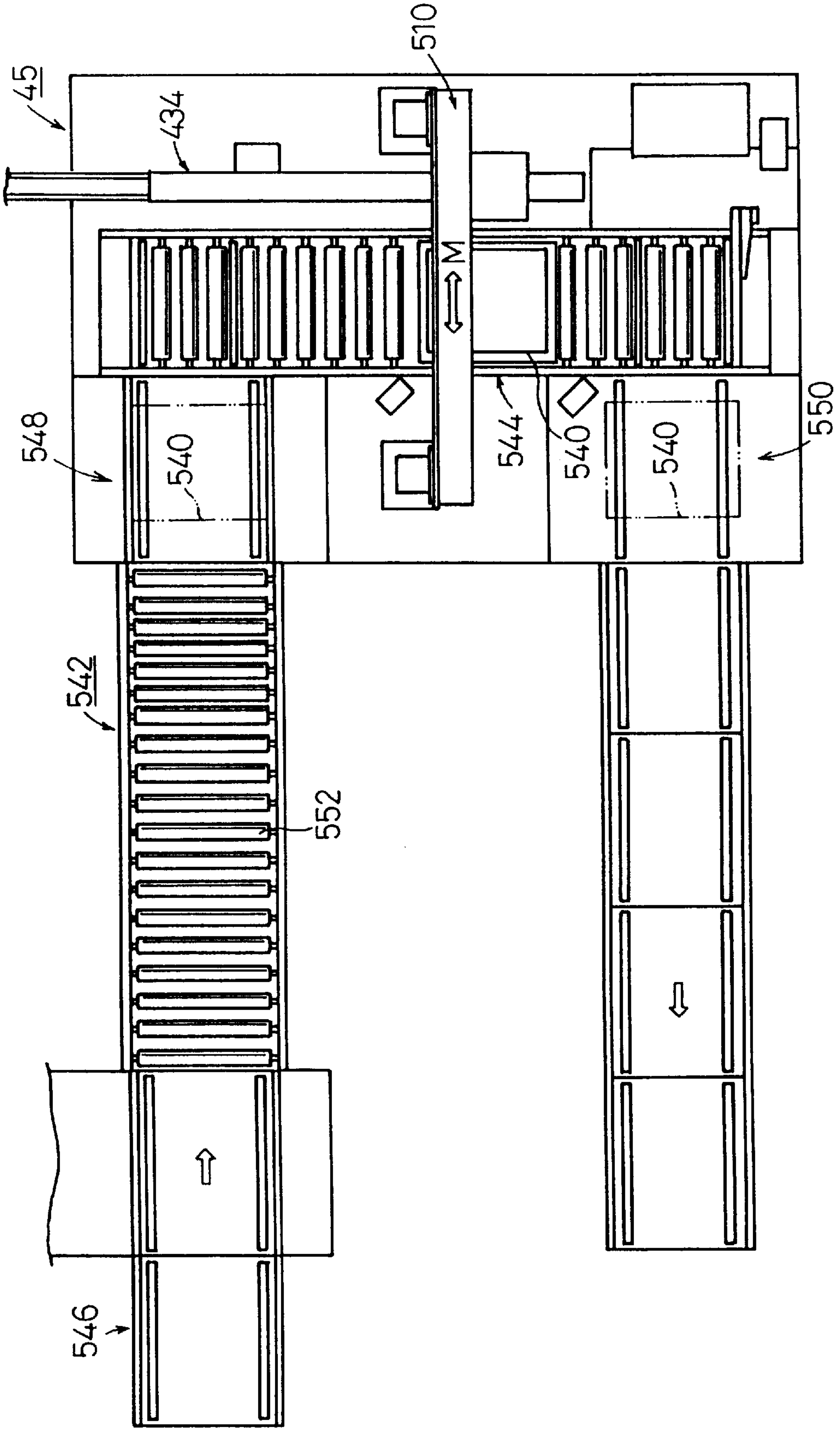
FIG. 25 is a plan view of the cartridge accumulating unit.

As shown in FIG. 25, a container 540 for housing film-contained cartridges 34 removed by the removal mechanism 510 can be fed to a film-contained cartridge receiving position 544 by a container supply mechanism 542. The container supply mechanism 542 comprises a container supply section 546 for placing thereon a stack of containers 540 before film-contained cartridges are housed therein, a feed section 548 for feeding the stacked containers 540, one by one, to the film-contained cartridge receiving position 544, and a container discharge section 550 for stacking containers 540 disposed in the film-contained cartridge receiving position 544 and housing film-contained cartridges 34. The container supply section 546, the feed section 548, and the container discharge section 550 are interconnected by a conveyor 552.

As shown in FIG. 22, a fixed engagement plate 554 is disposed on a distal end of the horizontal feed section 504 of the feed path 434 for abutting against a leading film-contained cartridge 34 fed from the feed path 434. An engaging member 556 is disposed at a position that is spaced upstream along the feed path 434 of the fixed engagement plate 554 by a distance corresponding to a certain number of film-contained cartridges 34. The engaging member 556 has a cylinder 558 having a rod 560 with a movable engaging plate 562 fixed to a tip end thereof.

Figure 26:
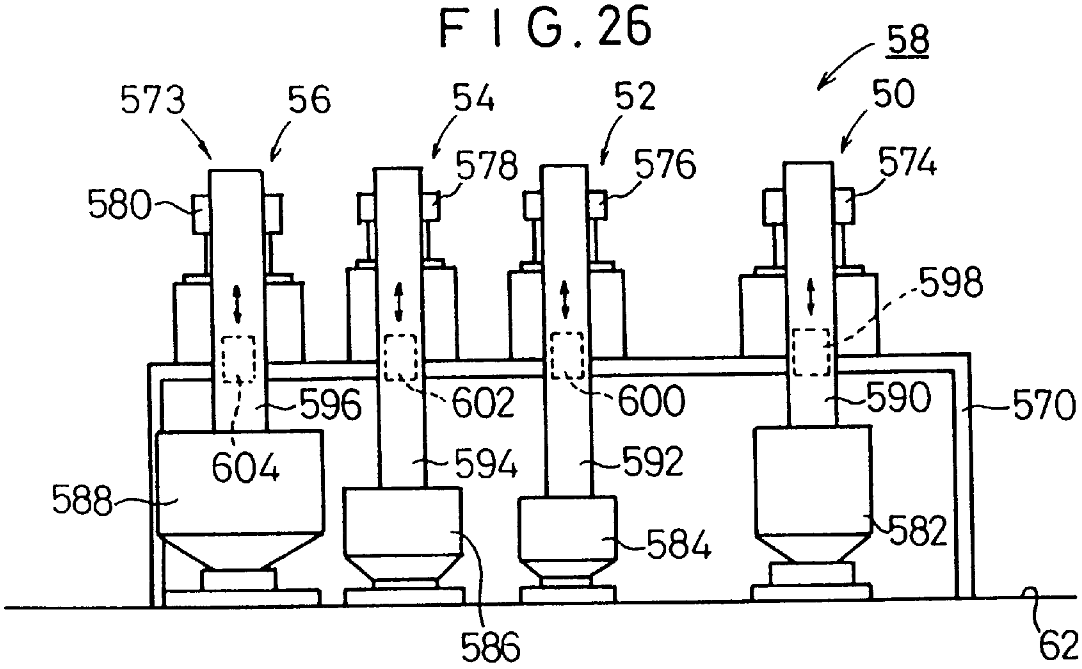
FIG. 26 is a front elevational view of a component supply assembly of the processing and packaging apparatus.

As shown in FIGS. 2, 3, and 26, the component supply assembly 58 has a component supply table 570 installed on the floor 62 and combined with stair steps 572. The component supply table 570 has a predetermined height and supports thereon a feed mechanism 573 which comprises a vibratory feeder 574, a vibratory feeder 576, a vibratory feeder 578, and a feeder (delivery unit) 580 that correspond respectively to the spool supply unit 50, the cap supply unit 52, the case cap supply unit 54, and the case supply unit 56.

Hoppers 582, 584, 586, 588 corresponding respectively to the spool supply unit 50, the cap supply unit 52, the case cap supply unit 54, and the case supply unit 56 are mounted on the floor 62, and component lifters 590, 592, 594, 596 are associated respectively with the hoppers 582, 584, 586, 588. The component lifters 590, 592, 594, 596 have respective vertically movable buckets 598, 600, 602, 604 for supplying spools 20, caps 26*b*, case caps 40, and cases 58, which are supplied in given quantities from the hoppers 582–588, to the respective feeders 574–580.

Figure 27:
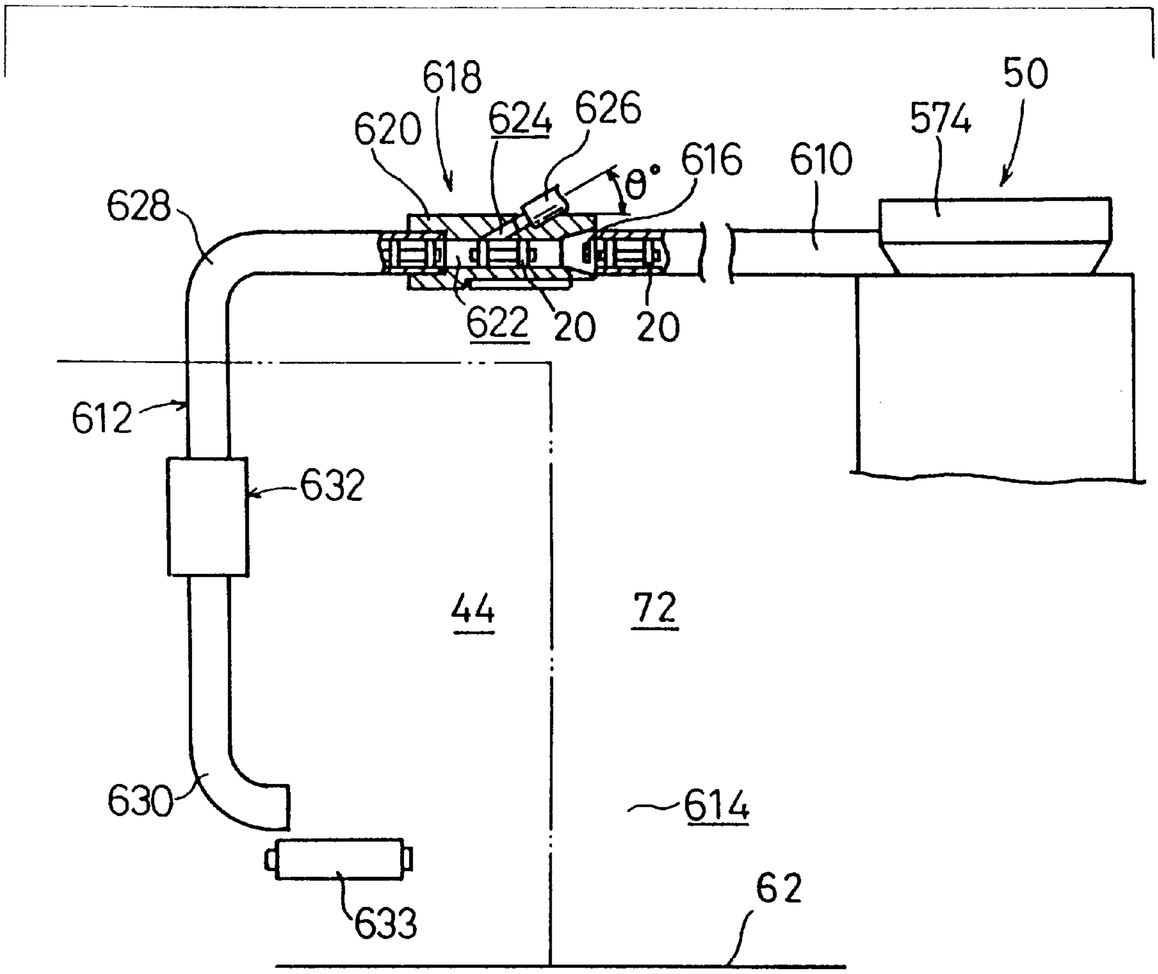
FIG. 27 is a view showing a conveyor and a pipe of a spool supply unit of the component supply unit.

As shown in FIG. 27, a component feed path comprising a conveyor 610 and a pipe 612 is connected to the feeder 574 of the spool supply unit 50. The conveyor 610 is disposed above the floor 62, with a walking space 614 defined below the conveyor 610. A separator 616 for controlling the direction of spools is movably disposed on an end of the conveyor 610, and an air blower 618 is also disposed on the end of the conveyor 610.

The air blower 618 has a joint block 620 joined between the end of the conveyor 610 and the pipe 612, and has a passage 622 defined centrally therein for feeding an array of spools 20 longitudinally. The passage 622 is held in communication with a blower hole 624 defined in the joint block 620 and inclined at an angle of θ, preferably 30°, radially inwardly toward the passage 622. The blower hole 624 is connected to an air tube 626 coupled to an air source (not shown).

The pipe 612 has a first bend 628 and a second bend 630 which are positioned in a section thereof that extends from the bright chamber 72 into the dark chamber 44. The first bend 628 and the second bend 630 are made of a light-tight material (light-impermeable material), and bent 90° at a certain radius of curvature. A shutter mechanism 632 is disposed between the first bend 628 and the second bend 630. The shutter mechanism 632 may be dispensed with because the pipe 612 has a desired light-tight property because of the presence of the first bend 628 and the second bend 630. Conversely, the first bend 628 and the second bend 630 may be dispensed with because of the presence of the shutter mechanism 632.

A spool conveyor 633 is disposed beneath the lower end of the pipe 612 for delivering spools 20 to the support arm 278.

Figure 28:
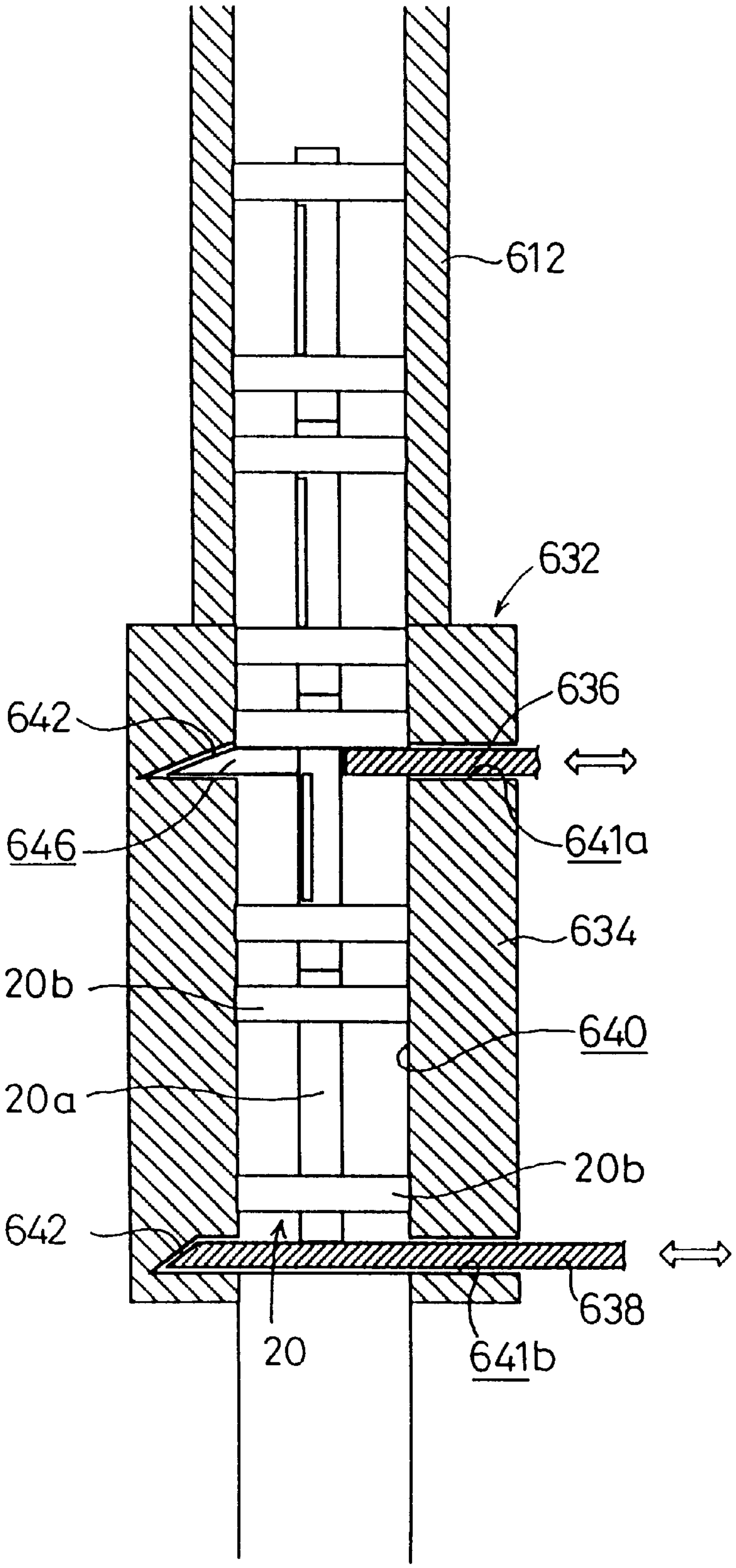
FIG. 28 Is a cross-sectional view of a shutter mechanism on the pipe.

As shown in FIG. 28, the shutter mechanism 632 has a block 634 disposed in the pipe 612, and an upper shutter plate 636 and a lower shutter plate 638 which are disposed as light-tight shutters in the block 634 and spaced from each other by a distance corresponding to the length of more than one spool 20. The upper and lower shutter plates 636, 638 are laterally movable into and out of a passage 640 defined vertically in the block 634. When one of the upper and lower shutter plates 636, 638 enters the passage 640 to block light in the pipe 612, the other of the upper and lower shutter plates 636, 638 is retracted from the passage 640. The block 634 has grooves 641*a*, 641*b* defined therein in which the upper and lower shutter plates 636, 638 are movably inserted.

Figure 29A:
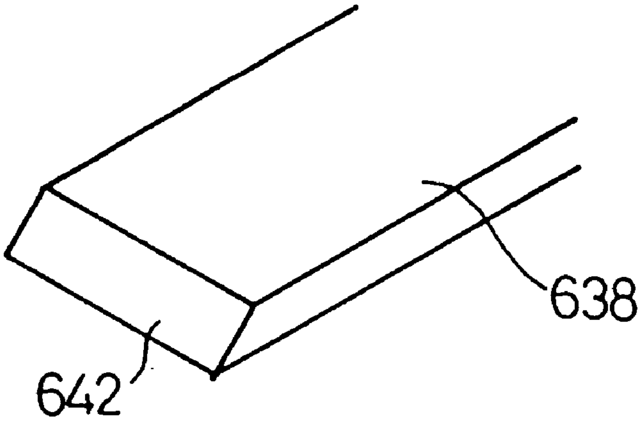
FIG. 29A is a fragmentary perspective view of a lower shutter plate of the shutter mechanism.
Figure 29B:
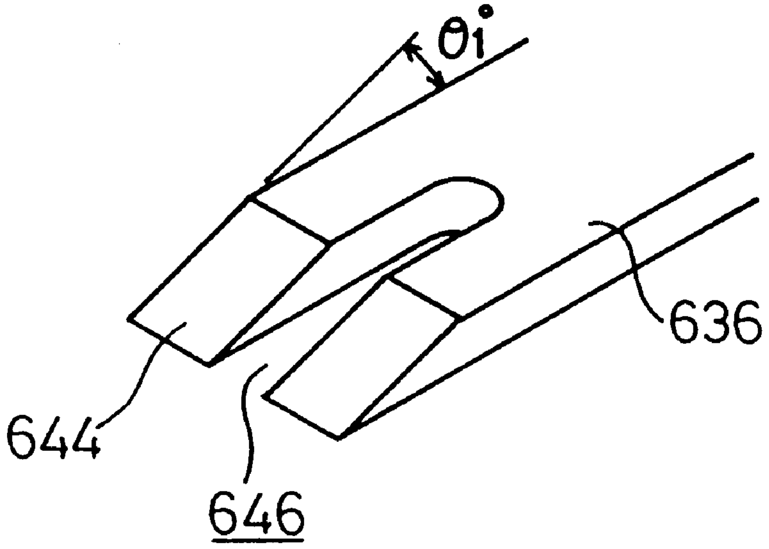
FIG. 29B Is a fragmentary perspective view of an upper shutter plate of the shutter mechanism.

Each of the spools 20 has a shank 20*a* and a pair of flanges 20*b* mounted respectively on the opposite ends of the shank 20*a*. As shown in FIG. 29A, the lower shutter plate 638 comprises a plate having a tapered surface 642 on its tip end, and serves to support an end of the shank 20*a* of the spool 20. As shown in FIG. 29B, the upper shutter plate 636 comprises a plate having a tapered surface 644 on its tip end which is inclined at an angle of θ1, preferably 15°–45°, more preferably 20°–30°, to an upper surface thereof, and a slot 646 defined therein for clearing the shank 20*a* of the spool 20.

Figure 30:
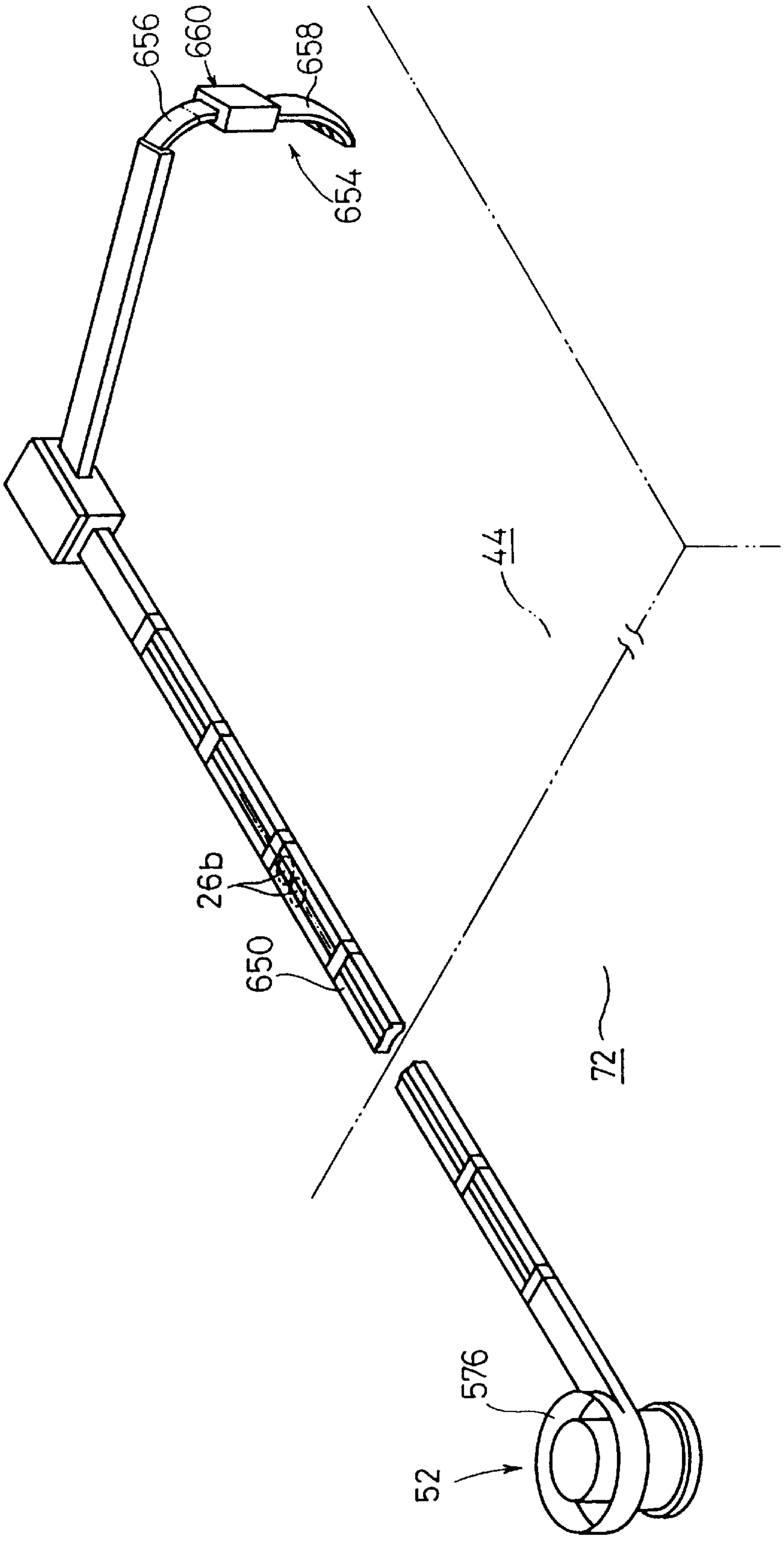
FIG. 30 is a perspective view of a conveyor and a chute connected to a cap supply unit of the component supply assembly.

As shown in FIG. 30, the feeder 576 of the cap supply unit 52 is connected to an end of conveyor 650 which is disposed above the floor 62 with the walking space 614 defined above the floor 62. The conveyor 650 serves to feed caps 26*b* in their horizontal attitude, and a chute 654 is connected to the opposite end of the conveyor 650. The chute 654 has a first arcuate bend 656 and a second arcuate bend 658, each curved through about 90°. The chute 654 serves to introduce caps 26*b* in their horizontal attitude into the dark chamber 44. The chute 654 has a shutter mechanism 660 in a vertical portion thereof between the first arcuate bend 656 and the second arduate bend 658.

Figure 31:
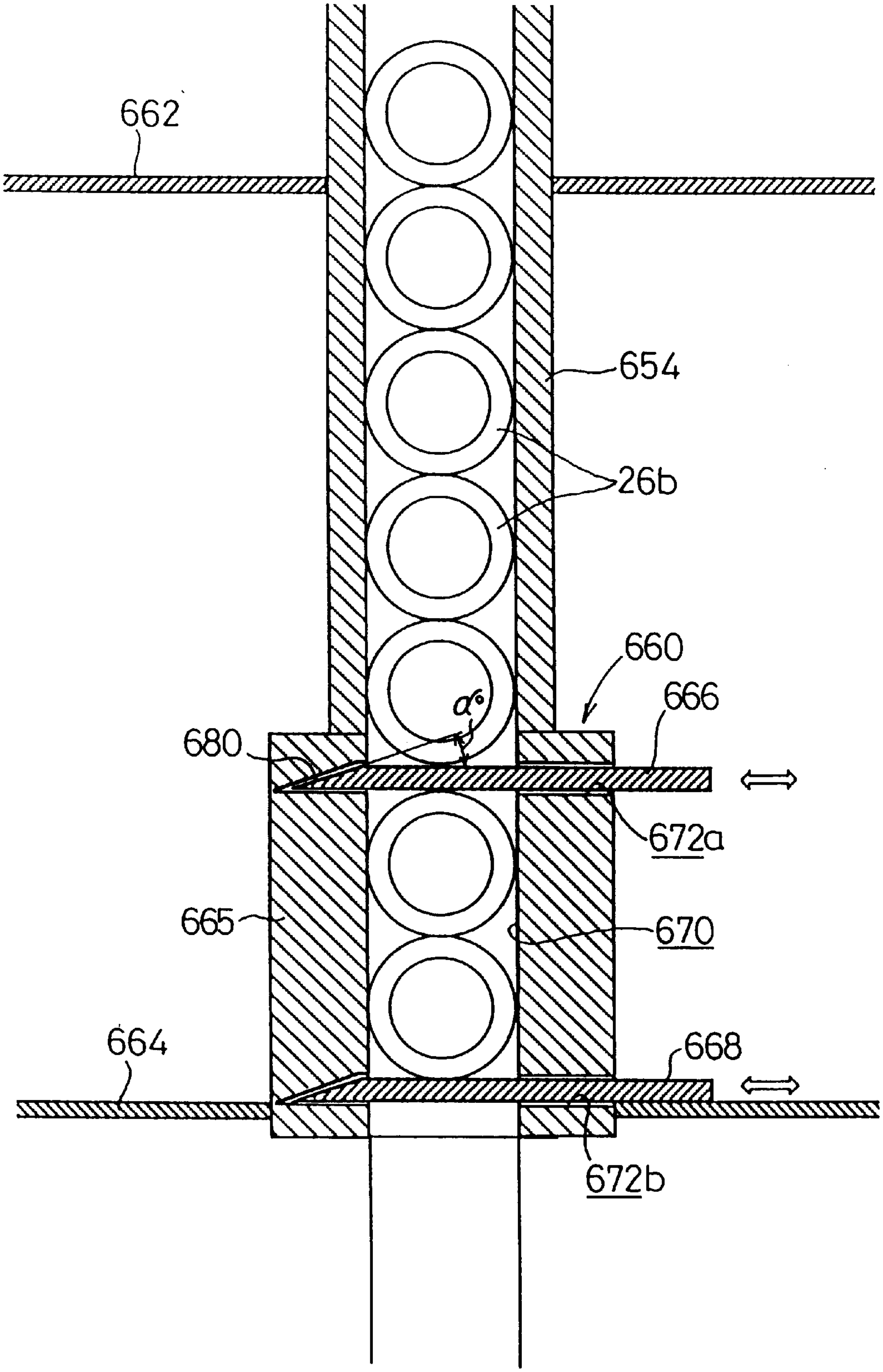
FIG. 31 is a cross-sectional view of a shutter mechanism on the chute.

As shown in FIG. 31, the shutter mechanism 660 has a block 665 disposed between two light-tight walls 662, 664 vertically spaced from each other, and an upper shutter plate 666 and a lower shutter plate 668 which are disposed as light-tight shutters in the block 665 and spaced from each other by a distance corresponding to the length of more than one spool 26 positioned in a passage 670 defined in the block 665. The upper shutter plate 666 and the lower shutter plate 668 are movably disposed in respective grooves 672*a*, 672*b* defined in the blocks 665. The upper shutter plate 666 has a tapered surface 680 on its tip end which is inclined at an angle of α, preferably smaller than 60°, more preferably 30°–45°, to an upper surface thereof.

The feeder 578 of the case cap supply unit 54 is connected to a component feed path comprising a conveyor and an air blower pipe, and serves to supply case caps 40 to the encasing unit 42.

Figure 32:
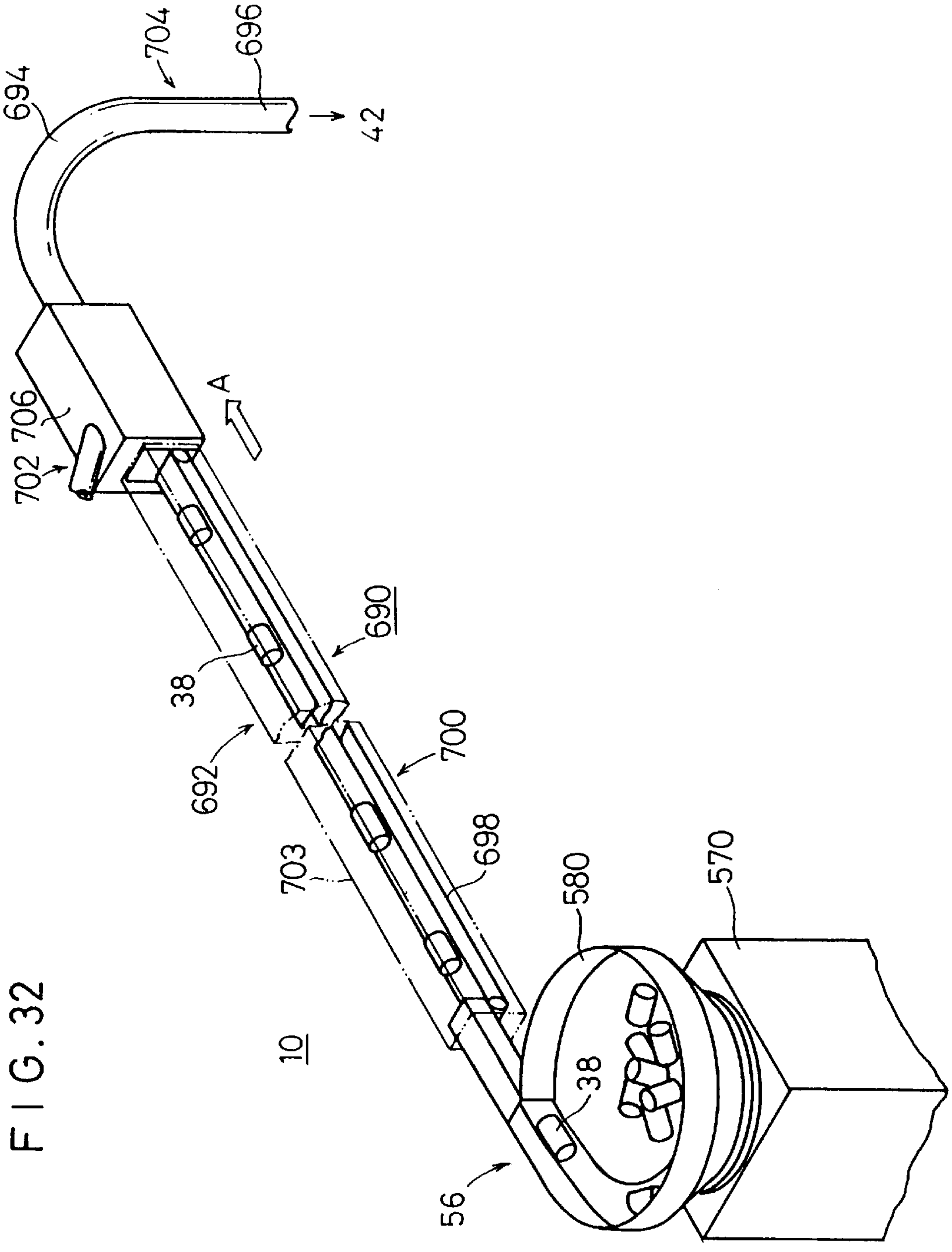
FIG. 32 is a perspective view of a feed mechanism for feeding resin components according to the present invention.

As shown in FIG. 32, the feeder 580 of the case supply unit 56 and the encasing unit 42 are interconnected by a feed path 690 which comprises an elevated horizontal feed section (straight horizontal section) 692 disposed above the floor 62, a bent feed section (bent section) 694 bent downwardly from an end of the elevated horizontal feed section 692, and a vertical feed section (straight vertical section) 696 extending vertically downwardly from an end of the bent feed section 694.

The elevated horizontal feed section 692 has a conveyor feeder 700 for feeding cases 38 with a straight belt conveyor 698. The bent feed section 694 has an air blower feeder 702 for feeding cases 38 under an air pressure. A dust-shield cover 703 is detachably mounted on the elevated horizontal feed section 692 in covering relationship to the belt conveyor 698.

The air blower feeder 702 is combined with a pipe 704 which serves as the bent feed section 694 and the vertical feed section 696 for feeding cases 38. The pipe 704 comprises a transparent pipe made of vinyl chloride or acrylic resin. A joint block 706 is joined between an end of the pipe 704 and an end of the belt conveyor 698.

Figure 33:
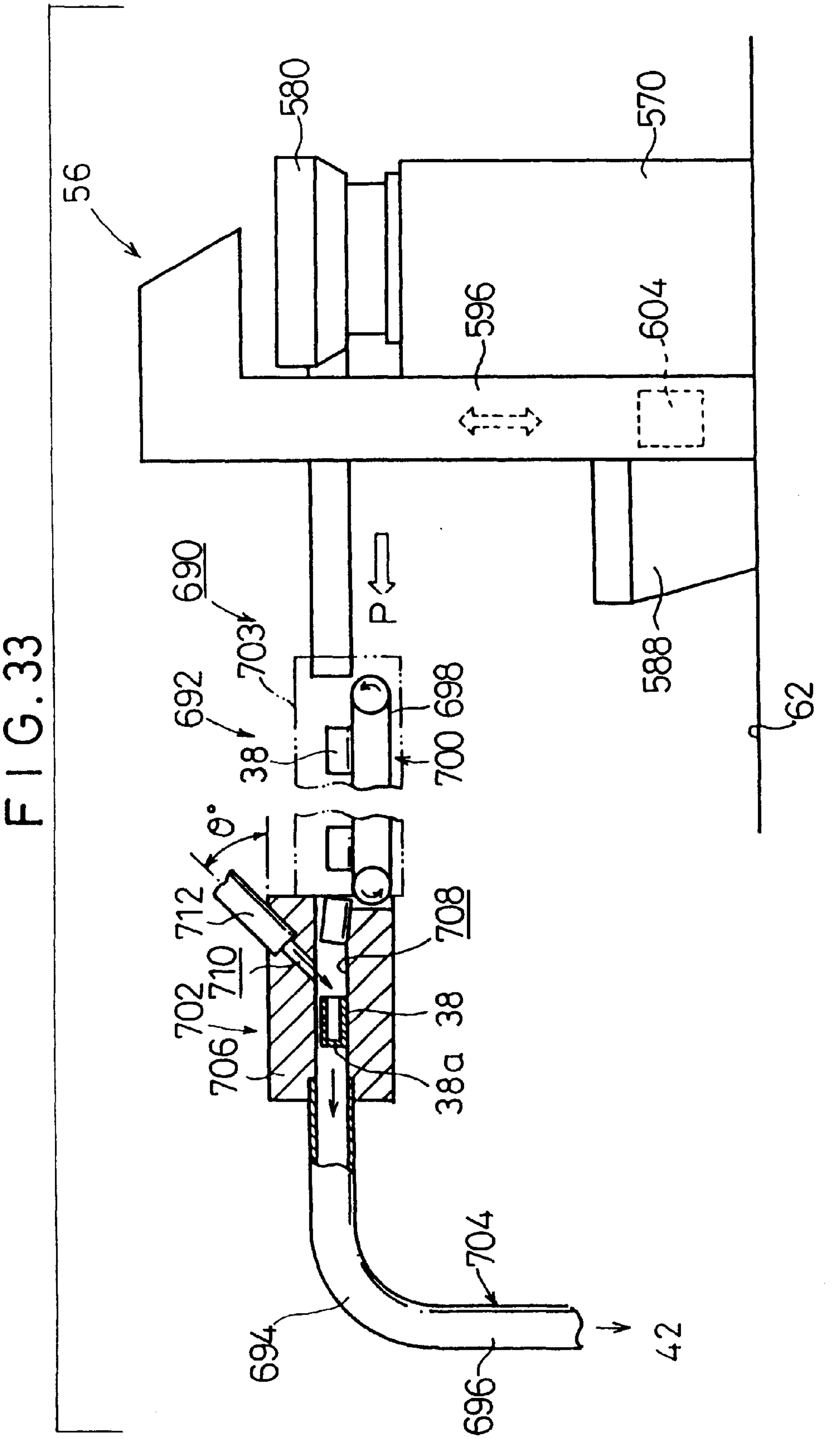
FIG. 33 is a side elevational view of the feed mechanism.

As shown in FIG. 33, the joint block 706 has a passage 708 defined centrally therein for feeding an array of cases 38 with their closed ends 38*a* facing forward. The passage 708 is held in communication with a blower hole 710 defined in the joint block 706 and inclined at an angle of θ, preferably 30°, radially inwardly toward the passage 708. The blower hole 710 is connected to an air tube 712 coupled to an air source (not shown).

Figure 34:
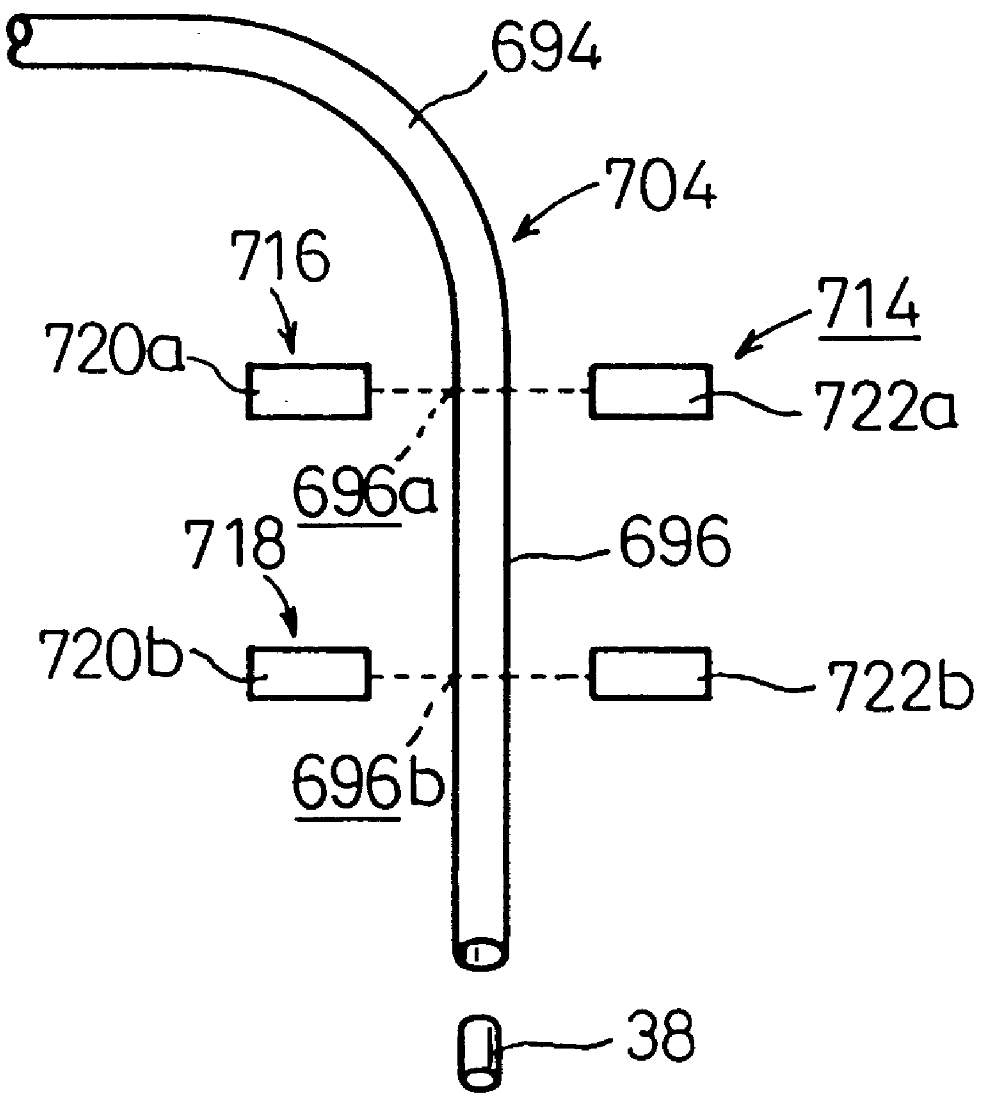
FIG. 34 is a side elevational view of a vertical feed section of an air blow feeder of the feed mechanism.

As shown in FIG. 34, the vertical feed section 696 is associated with a detector 714 for detecting whether a certain number of cases 38 are present in the vertical feed section 696. The detector 714 comprises first and second sensors 716, 718 that are vertically spaced from each other. The first and second sensors 716, 718 are photoelectric sensors for detecting transparent bodies, and comprise first and second light-emitting elements 720*a*, 720*b* and first and second light-detecting elements 722*a*, 722*b*. The vertical feed section 696 has first and second through holes 696*a*, 696*b* defined therein in alignment with respective optical axes of the first and second sensors 716, 718.

Figure 35:
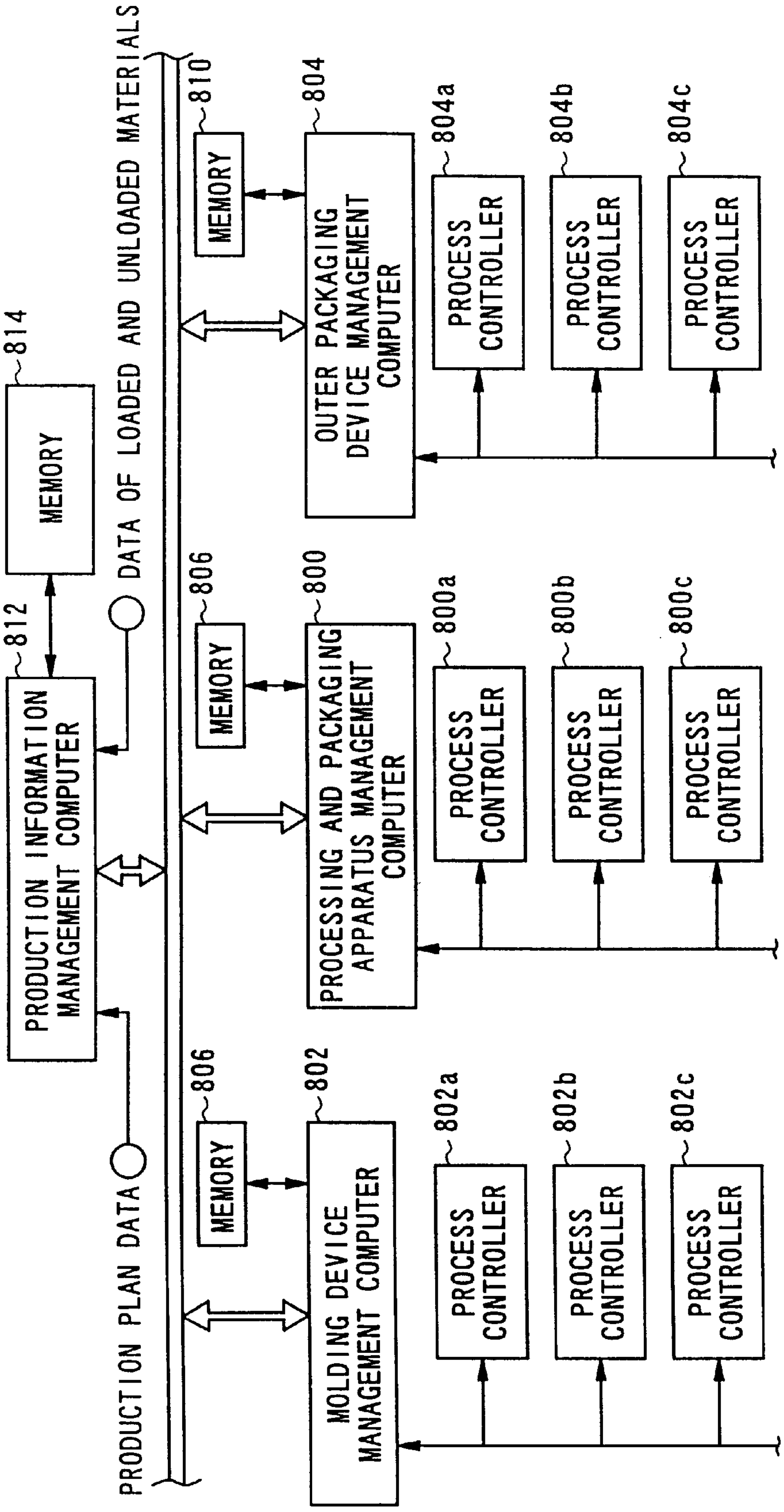
FIG. 35 is a block diagram of an in-factory network including a processing and packaging apparatus management computer for controlling the processing and packaging apparatus.

FIG. 35 shows in block form an in-factory network including a processing and packaging apparatus management computer 800 for controlling the processing and packaging apparatus 10. The in-factory network also has facility management computers including, in addition to the processing and packaging apparatus management computer 800, a molding device management computer 802 and an outer packaging device management computer 804 which are individually operable for control operation.

The molding device management computer 802 is associated with process controllers 802*a*, 802*b*, 802*c*, . . . for performing various processes under suitable conditions to operate a molding device for molding barrel plates 24, for example. The process controllers 802*a*, 802*b*, 802*c*, . . . serve to control the respective various processes under commands from the molding device management computer 802.

The processing and packaging apparatus management computer 800 send commands to process controllers 800*a*, 800*b*, 800*c* for controlling various processes to mount a film roll 14, insert film-contained cartridges 34 into cases 38, mount case caps 40 to produce packaged products 12, or produce film-contained cartridges 34 as semi-products, as shown in FIG. 1.

The outer packaging device management computer 804 send commands to process controllers 804*a*, 804*b*, 804*c* for controlling various processes to package packaged products 12 with small boxes, wrap the small boxes cellophane sheets, or place a certain number of small boxes into a cardboard box.

The molding device management computer 802, the processing and packaging apparatus management computer 800, and the outer packaging device management computer 804 have respective memories 806, 808, 810 which store achievement data, such as data of numbers of products and semi-products, data of numbers of normal and defective products and semi-products, and inspection data from process controllers for inspection process management, available from the process controllers 802*a*, . . . , 800*a*, . . . , 804*a*, . . . .

The molding device management computer 802, the processing and packaging apparatus management computer 800, and the outer packaging device management computer 804, which are installed for respective production facilities, are controlled altogether by a production information management computer 812, thus making up the in-factory network. The production information management computer 812 supply production command information individually to the molding device management computer 802, the processing and packaging apparatus management computer 800, and the outer packaging device management computer 804, and give commands to them for establishing conditions for processing or inspection processes that are carried out in the production facilities.

The production information management computer 812 is supplied with production plan data and data of loading and unloading plans or loaded and unloaded achievements of materials (raw materials and components). The production plan data can be entered through the control console 90 or a keyboard of the production information management computer 812 or a recording medium such as a magnetic disk or the like, and is stored in the memory 814. The data of loading and unloading plans or loaded and unloaded achievements of materials can also be entered in the same way as the production plan data, or can be entered from a facility management computer.

The memory 814 of the production information management computer 812 stores processing tables prepared respectively for types of photographic film cartridges (photographic films packaged in small boxes) to be produced. Abbreviated titles representative of the product types are assigned respectively to the processing tables, which store processing data such as of types of materials, manufacturing conditions, and inspecting conditions necessary to manufacture photographic film cartridges of those types.

When supplied with production plan data, the production information management computer 812 generates a production command table. The production plan data represent order numbers, abbreviated product titles corresponding respectively to the types of products to be manufactured, and planned quantities of the types of products to be manufactured. Based on the abbreviated product titles of the production plan data, the production information management computer 812 searches the processing tables, and reads all processing data from the processing table to which the abbreviated product titles are assigned. The production information management computer 812 thus recognizes processing types, material types, and material names which are required to manufacture desired products, and manufacturing conditions and inspecting conditions which are needed to operate the production facilities.

When an inventory of materials is confirmed, the production information management computer 812 generates a production command table. In the production command table, processing types, production quantities, material names, manufacturing conditions, and inspecting conditions are assigned to order numbers and abbreviated product titles. These data items are classified into fixed items which are uniquely determined when the type of products is determined and arbitrary items which can be modified. The fixed items include material names and production quantities which are differently used depending on the type of products, and are automatically established. The arbitrary items include production lot numbers of materials, some manufacturing conditions, and some inspecting conditions, and are arbitrarily established.

The production command tables thus generated are stored altogether in the memory 814 of the production information management computer 812. The data of material names, production lot numbers thereof, manufacturing conditions, and inspecting conditions in the production command tables are classified with respect to the production facilities by the production information management computer 812, and thereafter transmitted, together with order numbers, abbreviated product titles, processing types, and production quantities, to the facility management computers which manage the corresponding production facilities. For example, the production information management computer 812 transmit control constants required for establishing desired types to the processing and packaging apparatus management computer 800. In response to the received control constants, the processing and packaging apparatus management computer 800 sets the perforating motor speed, the fixed feed distance, and the overall film length detection setting of the processing and packaging apparatus 10 to values corresponding to the types and sizes due to type changes.

As described above, the production information management computer 812 controls the molding device management computer 802, the processing and packaging apparatus management computer 800, and an outer packaging device management computer 804, which are facility control computers for the respective production facilities, generates and stores production command tables depending on production plan data, generates individual production command tables for the respective production facilities, and transmits the generated individual production command tables to the facility control computers.

Figure 36:
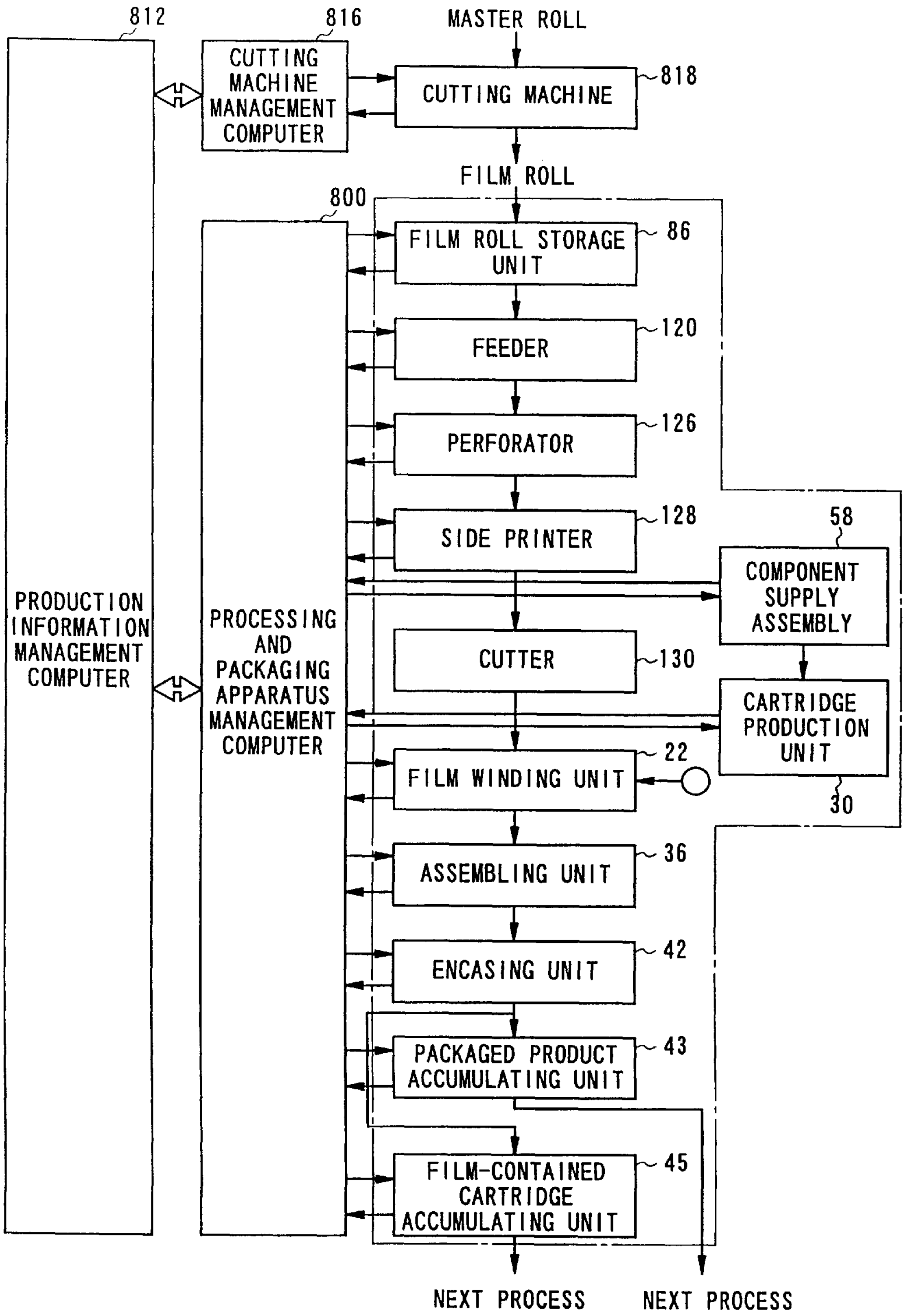
FIG. 36 is a block diagram showing a manufacturing process carried out by the processing and packaging apparatus management computer and the processing and packaging apparatus.

As shown in FIG. 36, the production information management computer 812 manages a cutting machine management computer 816 which is used as a facility control computer for each of the production facilities. The cutting machine management computer 816 transmits, to a cutting machine 818, established data of slitting conditions, e.g., the feed speed of a master roll, and inspecting conditions for a surface inspection apparatus in the cutting machine 818, for thereby indicating operating conditions to the cutting machine 818. When the cutting machine 818 is operated, the master roll is cut to the same width as the sized film 16, producing a film roll 14.

Operation of the processing and packaging apparatus 10 will be described below.

Figure 37:
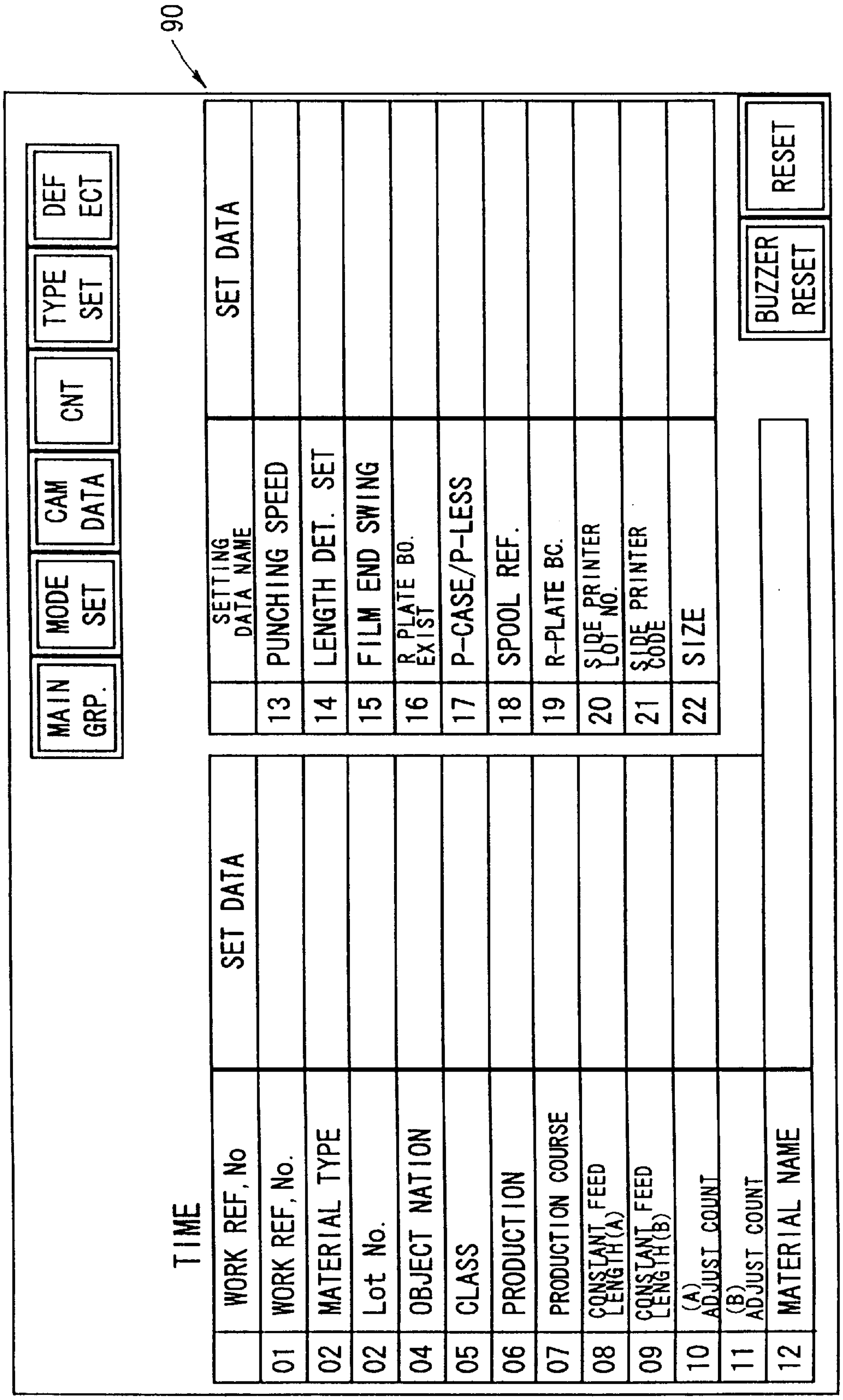
FIG. 37 is a view of a product type setting image displayed on a display monitor of a control console.
Figure 38:
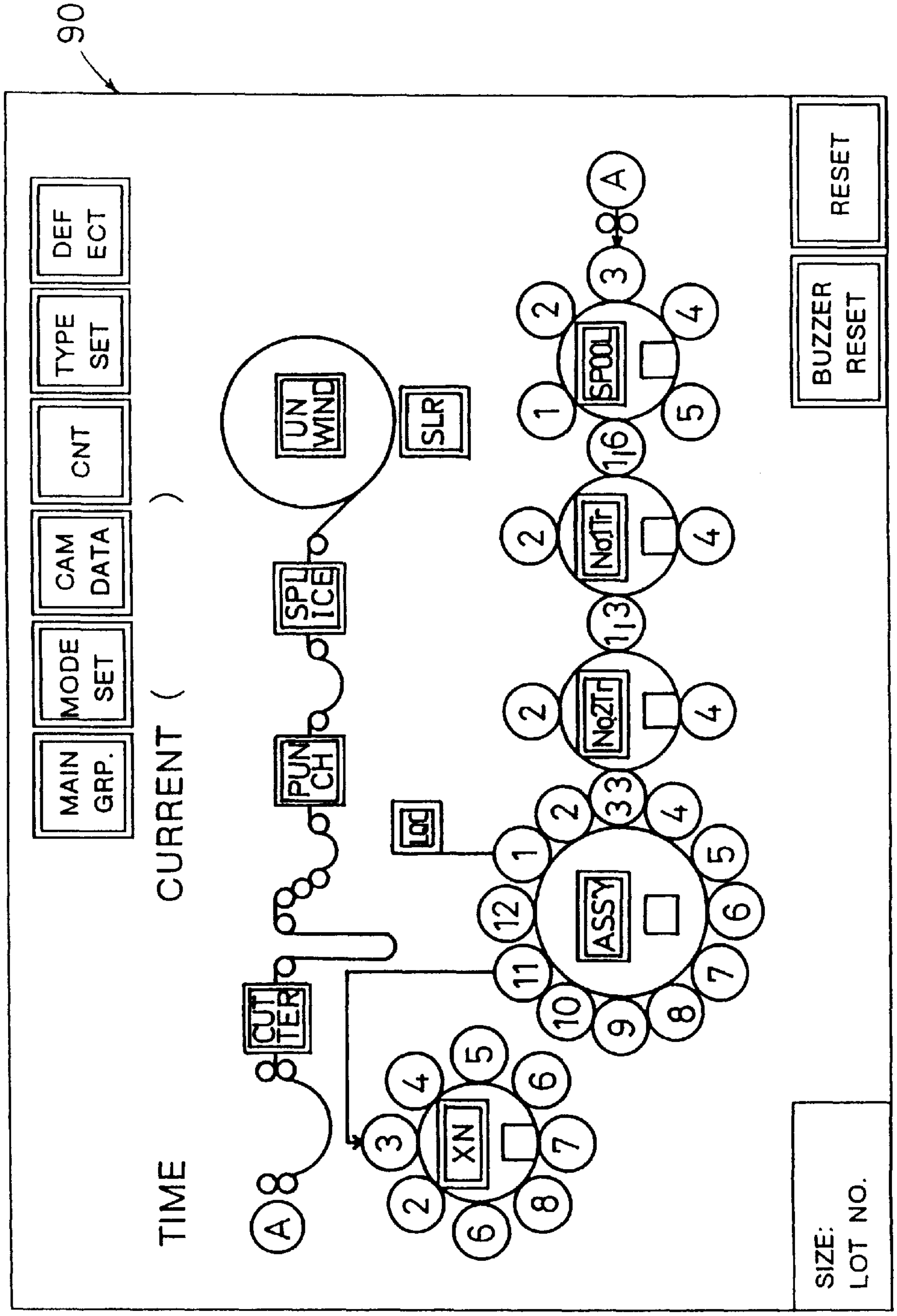
FIG. 38 is a view of an operation status image displayed on the display monitor.

The operator operates the control console 90 to establish a product type. At this time, various setting conditions are displayed on the display monitor 92 of the control console 90 as shown in FIG. 37. When the processing and packaging apparatus 10 operates, an image as shown in FIG. 38 is displayed on the display monitor 92 of the control console 90.

When the motor 142 is energized, a film roll 14 mounted on the unreeling shaft 132 as shown in FIGS. 5 and 8 is rotated in the direction indicated by the arrow J in FIG. 7 by the drive pulley 146, the belt 148, the driven pulley 150, feeding an unreeled leading end to the splicer 122.

As shown in FIG. 9, the trailing end of an elongate film F has been attracted to the splicing base 160 of the splicer 122. The leading end of a new elongate film F unreeled from the unreeling shaft 132 is attracted to the auxiliary base 162. After the splicing tape 170 is wound around the application base 172, the cylinder 174 is actuated to lower the rod 176, lowering the application base 172 and the tape cutter 180 together with the lifting/lowering block 178. The splicing tape 170 is now applied to the trailing end of the elongate film F on the splicing base 160 across a certain width. Then, the lifting/lowering block 178 is elevated, and the splicing base 160 is moved in the directions indicated by the arrows C, D. Therefore, the trailing end of the elongate film F is superimposed on and applied to the leading end of the new elongate film F attracted to the auxiliary base 162, with the splicing tape 170 interposed therebetween.

After the above splicing process, the elongate film F is fed to the perforator 126. In the perforator 126, as shown in FIG. 6, the suction chambers 206, 208 are evacuated to attract a upstream portion of the elongate film F between the feed roller 212 and the path roller 210, and also to attract a downstream portion of the elongate film F between the sprocket roller 214 and the path roller 216. The elongate film F is given a predetermined tension between the sprocket roller 214 and the feed roller 212. When the punch block 204 is vertically moved, perforations 124 are formed in opposite sides of the elongate film F by the punch block 204 in coaction with the die block 200.

Then, the feed roller 212 and the sprocket roller 214 are intermittently rotated by an indexing device (not shown) to feed the elongate film F intermittently. Thereafter, the punch block 204 is vertically moved to form perforations 124 in opposite sides of the elongate film F in coaction with the die block 200. The above perforating cycle is repeated to form a succession of perforations in opposite sides of the elongate film F at a constant pitch.

The perforated elongate film F is fed to the side printer 128 where latent images of strip-like prints depending on the film type are formed on one or both sides of the elongate film F by the first printing mechanism 222 (see FIGS. 6 and 7). The printed elongate film F forms a free loop between the path roller 220 and the sprocket 224, after which the second printing mechanism 226 above the sprocket 224 records a DX bar code, frame numbers, frame number bar codes, a commercial name, depending on the film size as latent images on one or both sides of elongate films F.

The elongate film F which has passed through the side printer 128 is fed to the cutter 130 where the elongate film F is cut to a predetermined length by the movable blade 228 and the fixed blade 230, producing a sized film 16. When the elongate film F is thus cut off, the trailing end 16*c* of the sized film 16 which has been severed and the leading end of a sized film 16 to be produced next time are processed. At the same time that the leading end of the sized film 16 to be produced next time is processed, holes for engaging a spool are also formed in the leading end.

When a defective region, e.g., a junction between the preceding and following elongate films F, is fed to the cutter 130, the openable and closable guide 234 is retracted from the film feed path, and the discharge receptacle 246 suction discharger 244 is moved into the film feed path. As shown in FIG. 10, when the air blower 256 is actuated, a defective film Fa is attracted to the discharge receptacle 246 and has its trailing end cut off by the cutter 130, whereupon the defective film Fa is drawn into the accumulation chamber 252 in the discharge box 250 in the bright chamber 72 through the discharge chute 248. Accordingly, the defective film Fa can reliably be drawn and discharged into the accumulation chamber 252 through a highly simple arrangement. Therefore, the defective film Fa is prevented from becoming jammed in the film feed path. Since the discharge chute 248 has 90° bends, it provides a light shield capability when the defective film Fa is discharged from the dark chamber 44 into the bright chamber 72.

Production of a sized film 16 with the cutter 130 will be described in detail below.

Figure 39A:
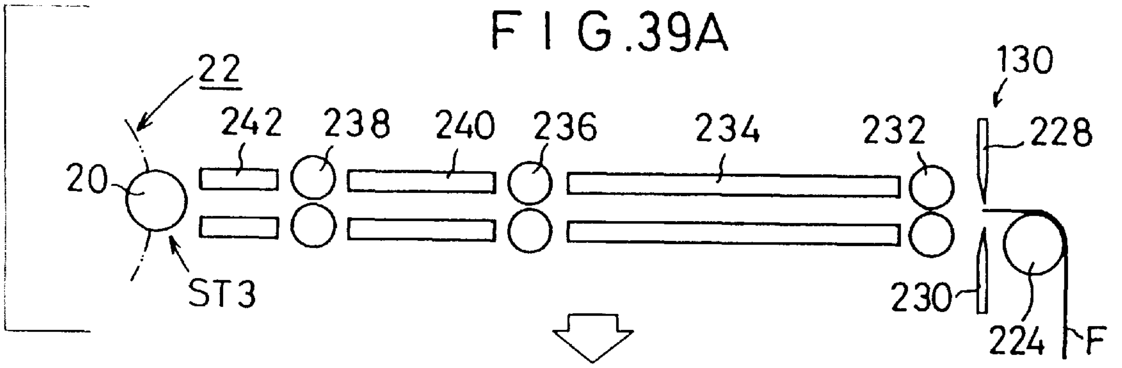
FIG. 39A is a schematic view of the film supply unit at the time when an elongate film starts being fed.
Figure 39B:
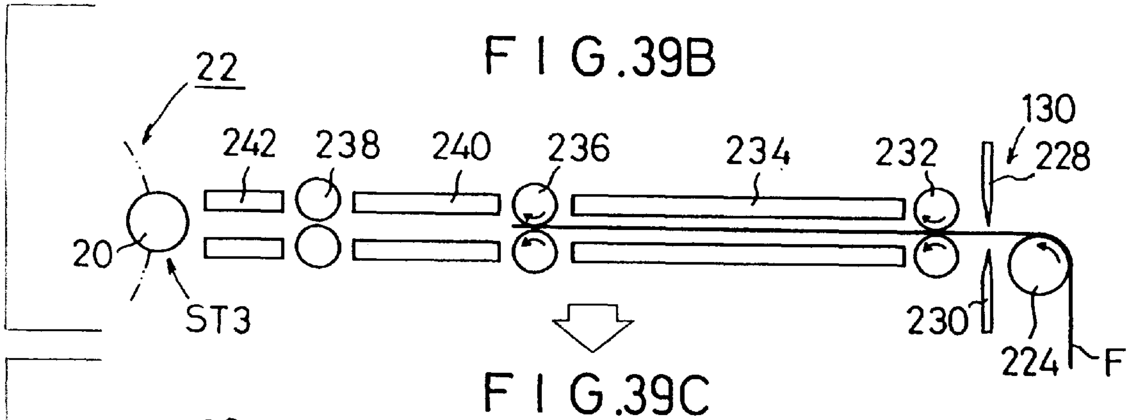
FIG. 39B is a schematic view of the film supply unit at the time when the elongate film has passed through an openable and closable guide.
Figure 39C:
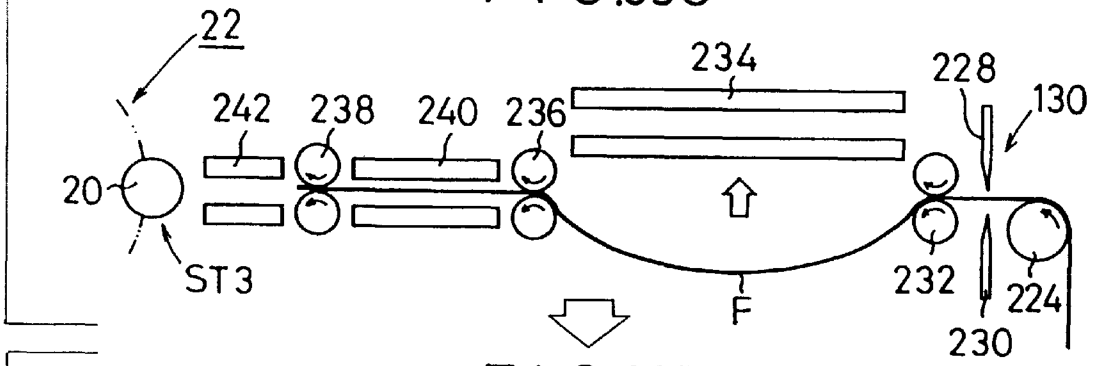
FIG. 39C is a schematic view of the film supply unit at the time when the elongate film forms a loop at the openable and closable guide.

As shown in FIG. 39A, when the leading end of an elongate film F is fed to the cutter 130, the sprocket 224, the nip rollers 232, and the insertion roller pairs 236, 238 start feeding the elongate film F at a constant linear speed. As shown in FIG. 39B, when the elongate film F passes through the openable and closable guide 234, the openable and closable guide 234 is opened and retracted from the film feed path (see FIG. 39B). Thereafter, the leading end of the elongate film F passes through a deceleration detector (not shown). At this time, the insertion roller pairs 236, 238 are decelerated, lowering the speed of the elongate film F to an insertion speed.

Figure 39D:
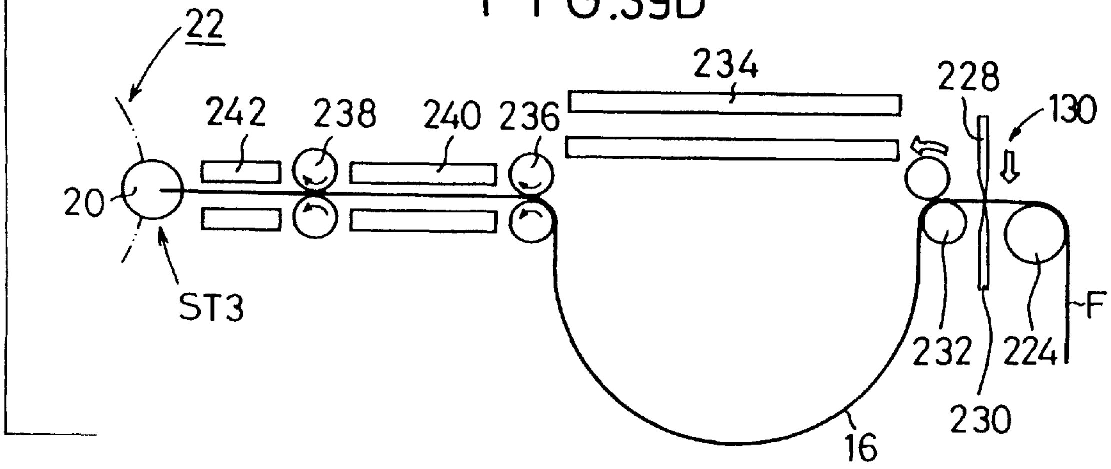
FIG. 39D is a schematic view of the film supply unit at the time when the elongate film is cut off at a predetermined position.

Therefore, there is developed a difference in speed between the nip rollers 232 and the insertion roller pairs 236, 238, forming a loop in the elongate film F below the openable and closable guide 234. As shown in FIG. 39D, the nip position of the nip rollers 232 is changed to change the angle at which the elongate film F emerges from the nip rollers 232. When the elongate film F is thereafter to be inserted into a spool 20 in the film winding unit 22, the insertion roller pairs 236, 238 are stopped against rotation. After the nip rollers 232 have completed its operation to feed the elongate film F by a given length, the cutter 130 is operated to sever the elongate film F, producing a sized film 16.

Figures 40A, 40B, 40C, 40D, 40E, 40F:
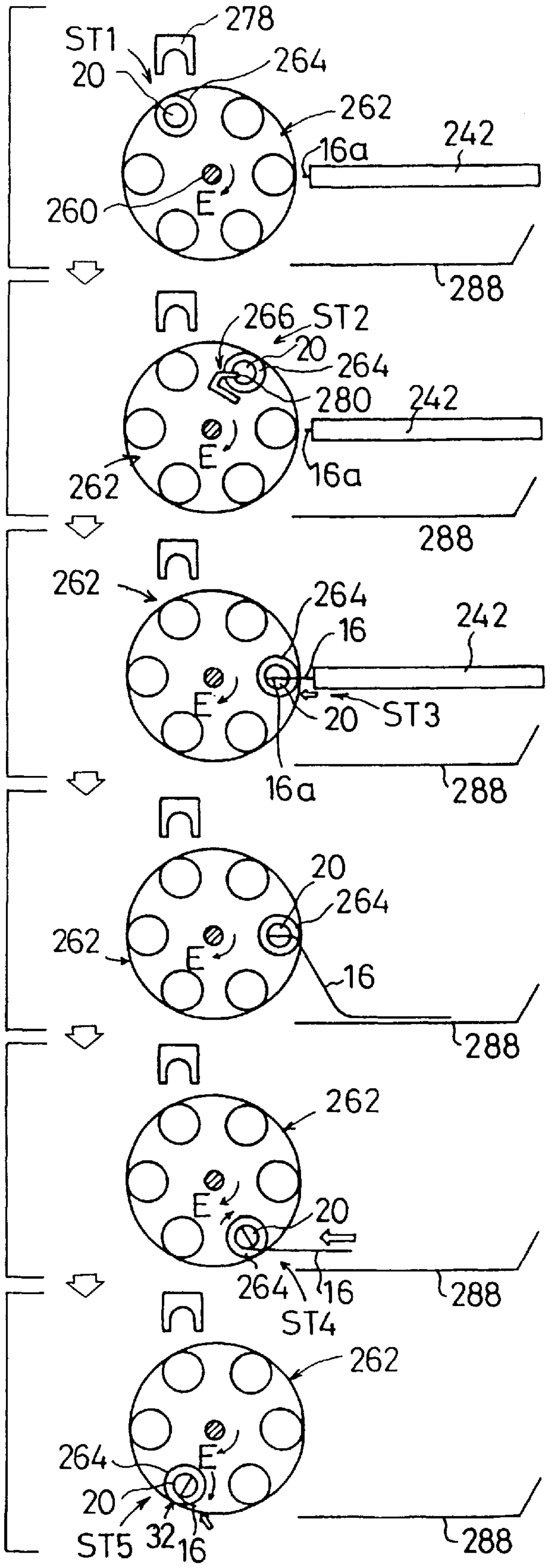
FIGS. 40A through 40F are schematic views showing the manner in which the film winding unit operates.

In the film winding unit 22, a spool 20 is delivered from the spool conveyor 633 to the support arm 278, and supplied to the spool chuck 264 in the spool supply station ST1 on the turntable 262 (see FIG. 40A). In the spool chuck 264, as shown in FIG. 12, the movable chuck 276 is displaced toward the fixed chuck 274 by a spring (not shown), holding the opposite ends of the spool 20 with the movable chuck 276 and the fixed chuck 274.

Then, the main shaft 260 is intermittently rotated in the direction indicated by the arrow E, moving the spook chuck 264 which holds the spool 20 to the spool positioning station ST2. As shown in FIG. 40A, the finger 280 of the spool positioner 266 is pressed against the spool 20. When the spool 20 is rotated through a clutch (not shown), the filter 280 engages the step of the spool 20, thereby positioning the spool 20.

Further rotation of the turntable 262 in the direction indicated by the arrow E brings the spool 20 into the inserting station ST3. As shown in FIG. 40C, the sized film 16 is fed to the turntable 262 until its leading end 16*a* is inserted into the groove of the spool 20. The guide plate 242 is opened, allowing the leading end 16*c* of the sized film 16 to fall onto the film guide 288 (see FIG. 40D).

In response to continued rotation of the turntable 262, the spool chuck 264 reaches the prewinding station ST4. As shown in FIG. 11, the prewinding motor 282 of the prewinder 270 is energized to cause the belt and pulley 284 to move the touch roller (not shown) into contact with the spool chuck 264, for thereby rotating the spool 20. The sized film 16 whose leading end 16*b* engages the spool 20 is now prewound on the spool 20 to a predetermined length (see FIG. 40E). As shown in FIG. 7, when the trailing end 16*c* of the sized film 16 passes the first photosensor 290*a*, the touch roller is decelerated, and when the trailing end 16*c* of the sized film 16 is detected by the second photosensor 290*b*, the spool 20 is stopped against rotation.

The turntable 262 is further rotated to move the spool chuck 264 which holds the spool 20 with the prewound film 16 to the winding station ST5. In the winding station ST5, the winding motor 292 of the winder 272 is energized to wind the sized film 16 on the spool 20, producing a roll 32 (see FIG. 40F).

As shown in FIG. 11, the roll 32 is held by the holder 300 of the first transfer unit 294, and then angularly moved 90° from a horizontal attitude to a vertical attitude when the holder 300 turns 180°. The roll 32 in the vertical attitude is gripped by the grips 306 of the second transfer unit 296. In the second transfer unit 296, turntable 304 rotates in unison with the vertical rotatable shaft 302, bringing the roll 32 gripped in the vertical attitude by the grips 306 to a standby position above the chuck 312 placed in the film-wound spool inserting station ST2*a* on the index table 30 of the assembling unit 36. A one-end-open cartridge 28 is placed in the chuck 312.

In the cartridge production unit 30, as shown in FIG. 15, a barrel plate 24 is gripped by the core 350 and the support 352, and thereafter the shafts 340 are lifted by the cam (not shown). The roller holders 342 are moved upwardly, causing the rounding rollers 332 on the arms 344 to rollingly contact the barrel plate 24 for thereby rounding the barrel plate 24 around the core 350 as indicated by the two-dot-and-dash lines in FIG. 15.

As shown in FIG. 14, when the shaft 354 of the crimping mechanism 336 is then displaced toward the rounding index disk 370, the chucks 360 which move with the chuck holder 358 toward the rounding index disk 370 grip the barrel plate 24 which has been rounded by the rounding roller mechanism 334. In unison with the chuck holder 358, the crimping head 364 moves in the direction indicated by the arrow with the shaft 326 for thereby fitting a cap 26 into an end of the rounded barrel plate 24. At this time, the shaft 366 is moved by a cam (not shown), opening the finger ends 368 to crimp the cap 26. In this manner, a one-end-open cartridge 28 is produced.

As shown in FIG. 16, after the one-end-open cartridge 28 has been delivered from the rounding index disk 370 into the oblique feed path 372, the one-end-open cartridge 28 is fed through the first feed path 46 to the assembling unit 36. As shown in FIG. 13, the one-end-open cartridge 28 is transferred by the loading unit 314 to the chuck 312 that is disposed in the one-end-open cartridge supply station ST1*a* on the index table 308. The index table 308 is intermittently rotated in the direction indicated by the arrow G to move the chuck 312, to which the one-end-open cartridge 28 is transferred in the one-end-open cartridge supply station ST1*a*, to the film-wound spool inserting station ST2*a*, in which the roll 32 is inserted into the one-end-open cartridge 28 by the second transfer unit 296.

Then, the one-end-open cartridge 28 with the roll 32 inserted therein is fed to the tongue detecting station ST3*a* which detects whether there is a trailing end 16*c* on the one-end-open cartridge 28 with the roll 32 inserted therein. Thereafter, the one-end-open cartridge 28 is fed to the centering station ST4*a* and then to the cap supply station ST5*a*. In the cap supply station ST5*a*, a cap 26*b* delivered by the cap feed unit 316 is positioned in an upper open end of the one-end-open cartridge 28. In the cap crimping station ST6*a*, the cap 26*b* is pressed into the upper open end of the one-end-open cartridge 28 by the pressing unit 318 and crimped in place, producing a film-contained cartridge 34. The pressing unit 318 has substantially the same structure as the crimping head 364 of the crimping mechanism 336.

The film-contained cartridge 34 is placed into a bucket 410 on the second feed path 48 by the unloading unit 320. On the second feed path 48, a torque with which the trailing end 16*c* of the sized film 16 projecting from the film-contained cartridge 34 is drawn out, the length of the trailing end 16*c*, the height of the film-contained cartridge 34, and whether there is a cap 26*b* or not, are detected. The film-contained cartridge 34 which has been judged as defective based on detected results is discharged from the ejector gate 404. The film-contained cartridge 34 which has been judged as normal based on detected results is delivered to the encasing unit 42. As shown in FIGS. 17 and 18, film-contained cartridges 34, while being shielded from light by the light-tight cover 400, are intermittently delivered at spaced intervals by the buckets 410 toward the tip end of the second feed path 48. As shown in FIG. 17, when a film-contained cartridge 34 placed in a bucket 410 reaches a position (removal position) corresponding to the opening 416 of the light-tight cover 400, the shutter mechanism 414 and the opening and closing mechanism 418 of the light-tight mechanism 412 are actuated in synchronism with each other.

Specifically, the rods 420 of the shutter mechanism 414 are lowered in the direction indicated by the arrow N by a cam (not shown), and the support plate 422 and the shutter plates 424*a*, 424*b* are lowered in unison with the rods 420. The shutter plates 424*a*, 424*b* descend in the slits 426*a*, 426*b* defined in the light-tight cover 400, and are positioned one on each side of the film-contained cartridge 34, thereby closing the light-tight cover 400. The slide base 430 of the opening and closing mechanism 418 is moved in the direction indicated by the arrow O by a cam (not shown) while being guided by the guide bar 428. Therefore, the opening 416 in the light-tight cover 400 is opened by the light-tight plate 432 on the slide base 430 (see FIG. 41).

Then, the swingable arm 442 of the first loading unit 436 is turned to a position above the opening 416, and then lowered to cause the magnet 444 to attract the film-contained cartridge 34 below the opening 416. Thereafter, the swingable arm 442 is lifted and moved to the transfer position P on the feed path 434.

For feeding the film-contained cartridge 34 to the encasing unit 42, the support unit 438 of the switching feed mechanism 47 is actuated for placing a bucket 448 in the transfer position P with the cylinder 450 (see FIG. 17). The bucket 448 in the transfer position P is automatically detected by the detector 460.

The film-contained cartridge 34 removed from the second feed path 48 by the first loading unit 436 is positioned above the bucket 448 on the feed path 434 when the first loading unit 436 is displaced to the transfer position P. The magnet 444 is retracted upwardly away from the bottom of the holder 446, releasing the film-contained cartridge 34.

In the encasing unit 42, after a case 38 has been placed in a bucket 486 of the index table 466 in the case supply station ST1*b*, the index table 466 is intermittently rotated in the direction indicated by the arrow I (see FIG. 19) into the cartridge inserting station ST2*b*. Then, as shown in FIG. 19, the shaft 470 of the second loading unit 440 is actuated to position the swing arm 472 over the film-contained cartridge 34 supported in the bucket 448 on the feed path 434.

The suction member 482 is lowered, and the vacuum source is actuated to enable the suction member 482 to attract the film-contained cartridge 34. When the suction member 482 which has attracted the film-contained cartridge 34 is lifted, the film-contained cartridge 34 is introduced into the tubular body 478, and the trailing end 16*c* of the sized film 16 extends out of the slot 480.

The swing arm 472 is now displaced by the shaft 470 to a position above the tubular member 488. Since the gear 476 on the upper end of a tubular body 478 is held in mesh with the sector gear 474, when the swing arm 472 swings from the feed path 434 toward the index table 466, the tubular body 478 rotates about its own axis in unison with the gear 476. Therefore, the trailing end 16*c* extends out of the slot 480 is withdrawn into the tubular body 478.

Below the tubular body 488, the case 38 is placed in the bucket 486 on the index table 466. The case 38 is elevated by a cam (not shown) into the tubular body 488. The suction member 482 is lowered, and ejects air, rather than draws air, to insert the film-contained cartridge 34 into the case 38. At this time, as shown in FIG. 19, the tubular body 488 is rotated as indicated by the arrow, and the case 38 lifted and pressed against the lower end of the tubular body 488 by a spring (not shown) is also rotated. Therefore, the trailing end 16*c* is smoothly inserted into the case 38 when the film-contained cartridge 34 is released from the suction member 482 and lowered.

As shown in FIG. 18, the case 38 with the film-contained cartridge 34 inserted therein is intermittently rotated in unison with the index table 466 in the direction indicated by the arrow I. After the cartridge detecting station ST3*b* has detected whether there is a film-contained cartridge 34 or not, a case cap 40 is inserted into the open end of the case 38 in the case cap inserting station ST4*b*, producing a packaged product 12. If the packaged product 12 is judged as being defective, it is ejected from the defective packaged product discharging station ST6*b*. If the packaged product 12 is judged as being normal, it is delivered from the normal packaged product discharging station ST5*b* onto the feed conveyor 77, from which the packaged product 12 is delivered to one of the silos 76*a*, 76*b*, 76*c* positioned adjacent to the component supply assembly 58.

Figure 42:
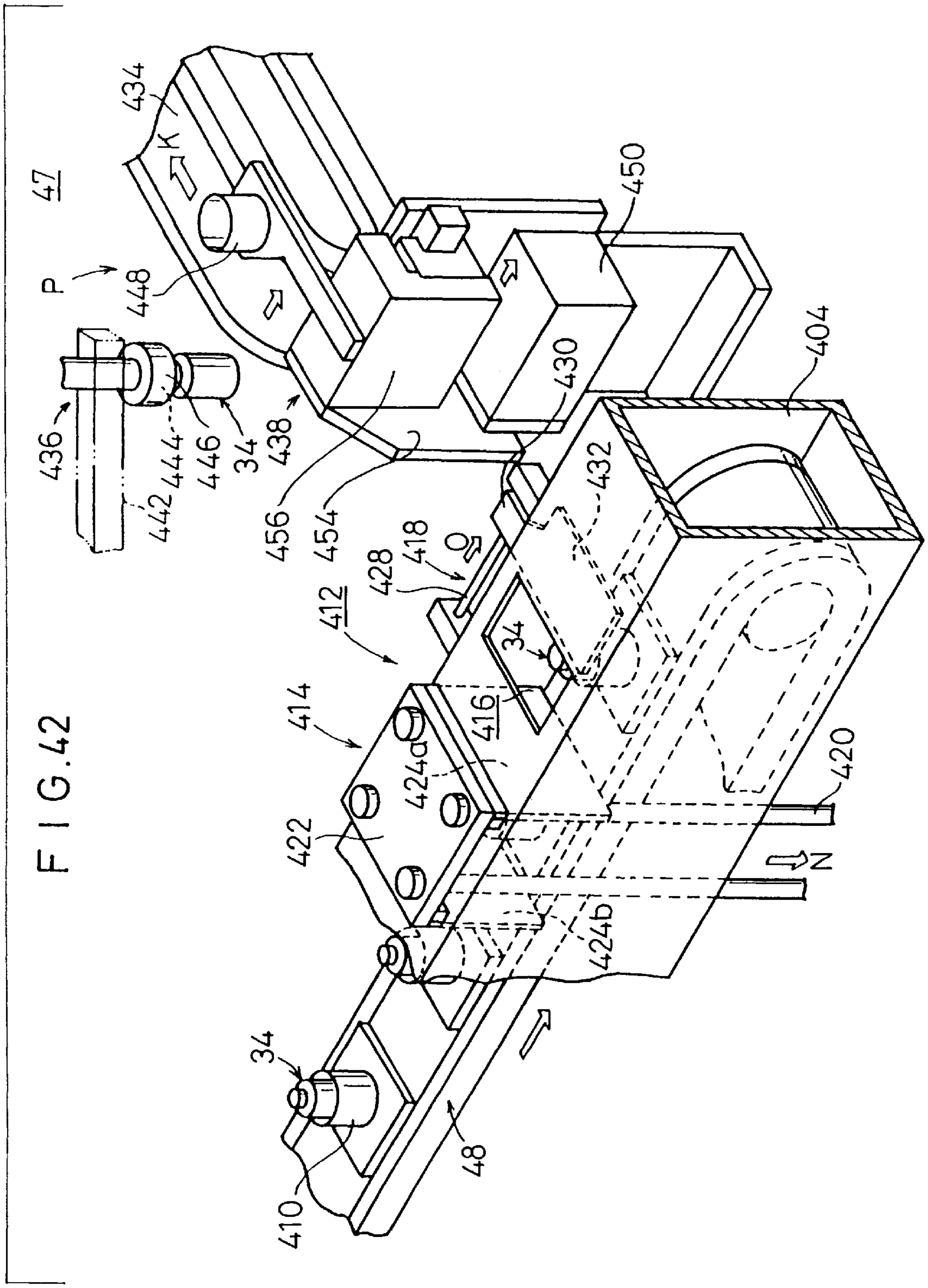
FIG. 42 is a perspective view showing the manner in which the switching feed mechanism operates.

If the film-contained cartridge 34 is not to be inserted into the case 38, but to be accumulated in the film-contained cartridge accumulating unit 45, then the cylinder 450 of the switching feed mechanism 47 is actuated to displace the bucket 448 away from the transfer position P on the feed path 434, as shown in FIG. 42. Then, when the film-contained cartridge 34 is delivered from the feed path 48 to the transfer position P by the first loading unit 436, since no bucket 448 is present in the transfer position P, the film-contained cartridge 34 is directly placed on the feed path 434.

As shown in FIG. 21, the film-contained cartridge 34 which is placed on the end of the feed path 434, i.e., the inclined feed section 502, is fed in the direction indicated by the arrow K by the feed belt 506 as it is circulatingly actuated. Because the elongate magnet 508 extends in the feed belt 506 from the inclined feed section 502 to the horizontal feed section 504, the film-contained cartridge 34 on the feed belt 506 is magnetically attracted by the magnet 508 such that the film-contained cartridge 34 is fed reliably in its vertical attitude along the inclined feed section 502 and then along the horizontal feed section 504. Inasmuch as film-contained cartridges 34 thus fed by the feed belt 506 are kept spaced at given distances, the film-contained cartridges 34 are thus reliably prevented from frictionally contacting each other and hence damaging their outer circumferential surfaces, i.e., printed surfaces.

As the film-contained cartridges 34 are fed along the feed path 434, the leading film-contained cartridge 34 is borne by the fixed engagement plate 554 as shown in FIG. 22. After a predetermined number of film-contained cartridges 34 are arrayed on the feed path 434, the cylinder 558 of the engaging member 556 is actuated to inset the movable engaging plate 562 between film-contained cartridges 34. Then, the removal mechanism 510 is operated to place the main body 518 over the feed path 434 and actuate the cylinder 520 to lower the box 524 as shown in FIG. 24.

Therefore, the abutment plate 538 attached to the bottom of the box 524 abuts against the upper ends of the film-contained cartridges 34 arrayed on the feed path 434, whereupon the magnet 532 attracts the film-contained cartridges 34. Then, the cylinder 520 lifts the box 524, and the vertically movable base 516 and the movable base 514 are actuated to move the box 524 to a certain position in a container 540 that is placed in the film-contained cartridge receiving position 544.

When the film-contained cartridges 34 attracted by the abutment plate 538 are placed in the container 540, the cylinder 526 is operated to lift the rod 528 and hence the holders 530*a*~530*c* by a predetermined distance S (see FIG. 24). The magnet 532 is spaced from the abutment plate 538, which blocks the magnetic field from the magnet 532 thereby to release the film-contained cartridges 34.

Similarly, successive arrays of film-contained cartridges 34 fed along the feed path 434 are attracted to the box 524 and delivered, one by one, into the container 540. After a desired number of film-contained cartridges 34 are stored in the container 540, the container 540 is fed from the film-contained cartridge receiving position 544 to the container discharge section 550. The container 540 thus fed to the container discharge section 550 is stacked on previously stacked containers 540 in the container discharge section 550. As shown in FIG. 25, when a stack of empty containers 540 are supplied to the conveyor 552, these containers 540 are supplied to the container supply section 546. The container supply section 546 supplies one at a time of the containers 540 to the film-contained cartridge receiving position 544.

In this embodiment, when the film-contained cartridge 34 discharged from the assembling unit 36 is delivered to the encasing unit 42, the support unit 438 of the switching feed mechanism 47 is actuated to place the bucket 448 in the transfer position P on the feed path 434. If the film-contained cartridge 34 is to be accumulated as it is, then the bucket 448 is retracted away from the transfer position P.

Therefore, the process of accumulating packaged products in the packaged product accumulating unit 43 and the process of accumulating film-contained cartridges 34 in the film-contained cartridge accumulating unit 45 can easily and efficiently be carried out selectively. While film-contained cartridges 34 are being delivered so as to be accumulated in the film-contained cartridge accumulating unit 45, the encasing unit 42 and subsequent units can be shut off by a simple control operation. Therefore, the processing and packaging apparatus 10 can be operated with high efficiently as a whole.

A certain number of film-contained cartridges 34 arrayed and fed along the feed path 434 are attracted and held by the removal mechanism 510. Since the certain number of film-contained cartridges 34 can reliably be attracted altogether by the single magnet 532, the removal mechanism 510 is effectively simplified in overall arrangement. The magnet 532 is movable toward and away from the abutment plate 538 by the cylinder 526 for selectively attracting and releasing the film-contained cartridges 34. Consequently, the arrangement for attracting and releasing film-contained cartridges 34 is much simpler than if an electromagnet were used.

As shown in FIG. 17, the light-tight mechanism 412 is disposed on the terminal end of the second straight feed path 48. When the shutter plates 424*a*, 424*b* are upwardly retracted for feeding a film-contained cartridge 34, the light-tight plate 432 closes the opening 416 to close the light-tight cover 400.

Figure 41:
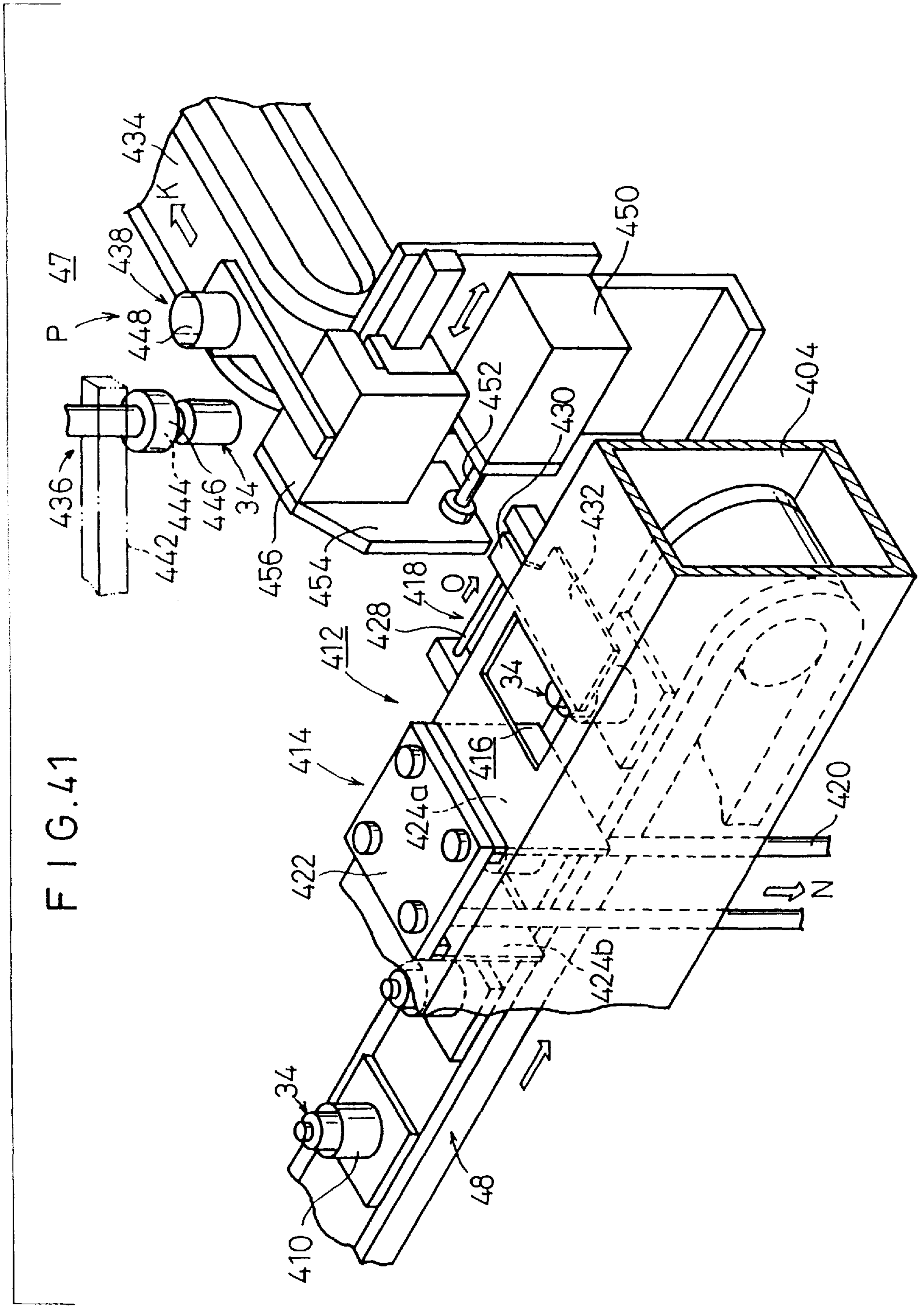
FIG. 41 is a perspective view showing the manner in which the light-tight mechanism operates.

When the opening 416 is opened, as shown in FIG. 41, the shutter plates 424*a*, 424*b* enter the light-tight cover 400 for thereby preventing ambient light from being introduced from the opening 416 into the light-tight cover 400. Accordingly, when a film-contained cartridge 34 is delivered by the second feed path 48 which extends from the dark chamber 44 into the bright chamber 72, ambient light is prevented from being introduced into the dark chamber 44 by a relatively simple arrangement.

When the film roll 14 held in the film supply unit 18 is used up, a new film roll 14 stored in the film roll storage unit 86 is supplied to the film supply unit 18. As shown in FIGS. 5 and 8, the air chuck 136 is operated to displace the claws 134 radially inwardly into the unreeling shaft 132, releasing the core of the film roll 14 from the unreeling shaft 132. The cylinder 152 is actuated to move the slide base 156 away from the film roll storage unit 86. The core is now removed from the unreeling shaft 132 and discharged.

Then, the shaft 100 of the film roll storage unit 86 is brought into coaxial alignment with the unreeling shaft 132, and the cylinder 89 is actuated to move the slide base 91 toward the unreeling shaft 132 until the shaft 100 coaxially engages the unreeling shaft 132. The cylinder 104 is actuated to displace the pusher 102 forward along the guide bar 108 for thereby transferring a foremost one of film rolls 14 supported on the shaft 100 onto the unreeling shaft 132.

The air chuck 136 is actuated to displace the claws 134 radially outwardly to hold the transferred film roll 14 on the unreeling shaft 132. In the film roll storage unit 86, the cylinder 89 is actuated to retract the slide base 91 away from the unreeling shaft 132. The new film roll 14 mounted on the unreeling shaft 132 is delivered to the splicer 122, in which the leading end of the elongate film F from the new film roll 14 is spliced to the trailing end of the previous elongate film F.

A process of supplying components including barrel plates 24, spools 20, caps 26*a*, 26*b*, cases 38, and case caps 40 to the processing and packaging apparatus 10 will be described below.

As shown In FIG. 2, an unmanned delivery vehicle AGV which carries a plurality of film rolls 14 moves along the delivery line 88 and enters from the opening 70 (or the opening 74) into the antechamber 68, and thereafter moves into the dark chamber 44. In the dark chamber 44, the film rolls 14 are automatically or manually transferred from the unmanned delivery vehicle AGV to the film roll storage unit 86.

In the barrel plate supply unit 60, an unmanned delivery vehicle (not shown) moves along the delivery line 84 to deliver a container 82 housing a plurality of barrel plates 24 to the inlet position 376 (see FIG. 16). As shown in FIG. 16, the container 82 is fed from the inlet position 376 to the removal position 378, in which the barrel plates 24 are delivered, one array at a time, from the container 82 to the inclined conveyor 384 by the barrel plate removal mechanism 382.

The barrel plates 24 on the inclined conveyor 384 are successively delivered, one at time, to the rounding index disk 370. After all the barrel plates 24 have been removed from the container 82, the container 82 is delivered to the outlet position 380, and then received by the unmanned delivery vehicle, which runs along the delivery line 84 to return the container 82 to a barrel plate receiving position.

An unmanned delivery vehicle (not shown) runs along the delivery line 80 to the component supply assembly 58, in which spools 20, caps 26*b*, case caps 40, and cases 38 from the unmanned delivery vehicle are filled in the hoppers 582–588 of the spool supply unit 50, the cap supply unit 52, the case cap supply unit 54, and the case supply unit 56.

As shown in FIG. 26, a predetermined number of spools 20 are supplied from the hopper 582 to the bucket 598, which is then lifted along the component lifter 590 to supply the spools 20 to the feeder 574. Similarly, caps 26*b*. case caps 40, and cases 38 are lifted from the hoppers 584–588 by the buckets 600–604 through the component lifters 592–596 and then supplied to the feeders 576–580.

In the cap supply unit 59, as shown in FIG. 16, caps 26*a* are supplied from an unmanned delivery vehicle (not shown) to the hopper 390, from which a predetermined number of caps 26*a* are fed through the component lifter 392 to the feeder 394. The caps 26*a* are fed one by one to the rounding index disk 370.

An unmanned delivery vehicle (not shown) moves along the delivery line 78, removes packaged products 12 accumulated in the silos 76*a*–76*c*, and automatically deliver the packaged products 12 to a next outer packaging process.

In this embodiment, as described above, the spool supply unit 50, the cap supply unit 52, the case cap supply unit 54, and the case supply unit 56 are closely positioned downstream of the film processing and packaging process, thereby making up the component supply assembly 58. Therefore, various components including spools 20, caps 26*b*, case caps 40, and cases 38 can easily be supplied in one concentrated area by the component supply assembly 58. Even if those components are supplied manually, rather than automatically, the components can be supplied efficiently for achieving an improved component handling capability.

The component supply assembly 58 has the component supply table 570 which is of a certain height, and the feeders 574–580 disposed on the component supply table 570. The conveyors 610, 650 and the feed path 690 are connected to the feeders 574–580, and positioned above the floor 62, providing the walking space 614 over the floor 62. Therefore, the component supply assembly 58 can be operated efficiently, and the working space can be utilized effectively three-dimensionally, thereby allowing the processing and packaging apparatus 10 to be reduced in overall size.

Components can be supplied from an unmanned delivery vehicle or manually to the hoppers 582–588 on the floor 62, rather than directly to the feeders 574–580 that are positioned at a certain height. Consequently, components can be supplied highly efficiently.

As shown in FIG. 2, the film supply unit 18, the film winding unit 22, the assembling unit 36, and the encasing unit 42 are arranged linearly along the film processing and packaging process in the direction indicated by the arrow A. Therefore, various facilities can effectively be placed in the working space, which can effectively be utilized without creating substantial dead space.

As shown in FIG. 30, when caps 26*b* are supplied to the feeder 576 of the cap supply unit 52, the caps 26*b* are delivered to the conveyor 650 by the feeder 576. The caps 26*b* successively fed along the conveyor 650 are delivered horizontally and then vertically beyond the first bend 656, and thereafter delivered from the second bend 568 to a cap conveyor (not shown) in the dark chamber 44. At this time, the shutter mechanism 660 is operated.

Figure 43A:
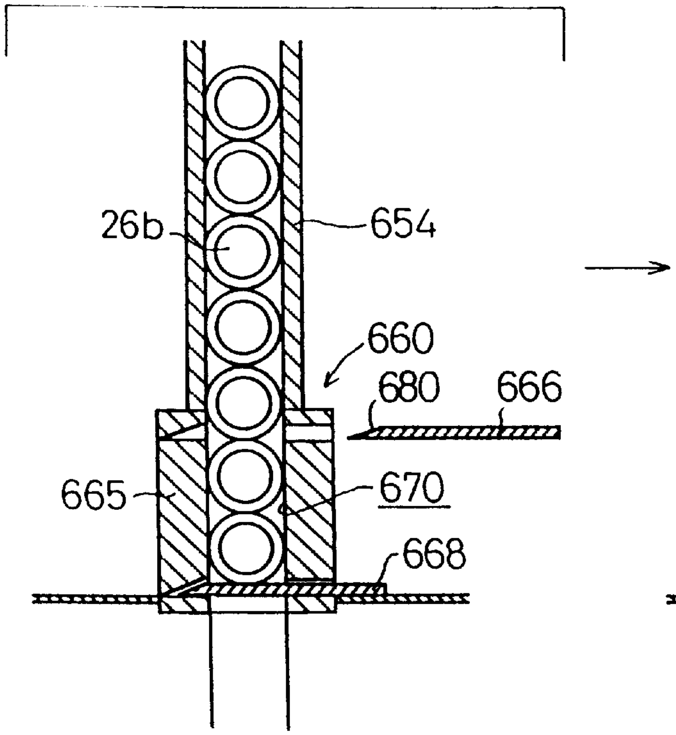
FIGS. 43A through 43D are cross-sectional views showing the manner in which the shutter mechanism on the chute connected to the cap supply mechanism operates.
Figure 43B:
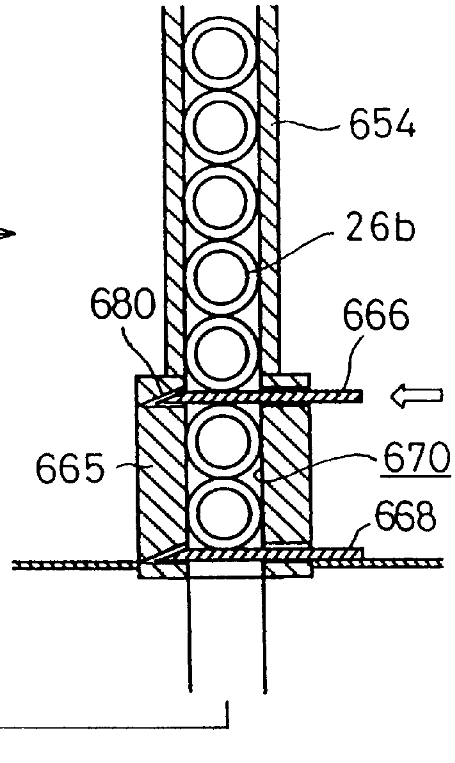

More specifically, as shown in FIG. 43A, the lower shutter plate 668 enters the passage 670 and holds a lower side of a cap 26*b*, and block light in the chute 654. Then, as shown in FIG. 43B, the upper shutter plate 666 enters the passage 670 and has its tip end positioned between caps 26*b*. Since the upper shutter plate 666 has the tapered surface 680 inclined at the angle of $\alpha$, when the upper shutter plate 666 is inserted between the caps 26*b*, the upper cap 26*b* is smoothly lifted by the tapered surface 680, and hence the upper shutter plate 666 is smoothly inserted.

Figure 43C:
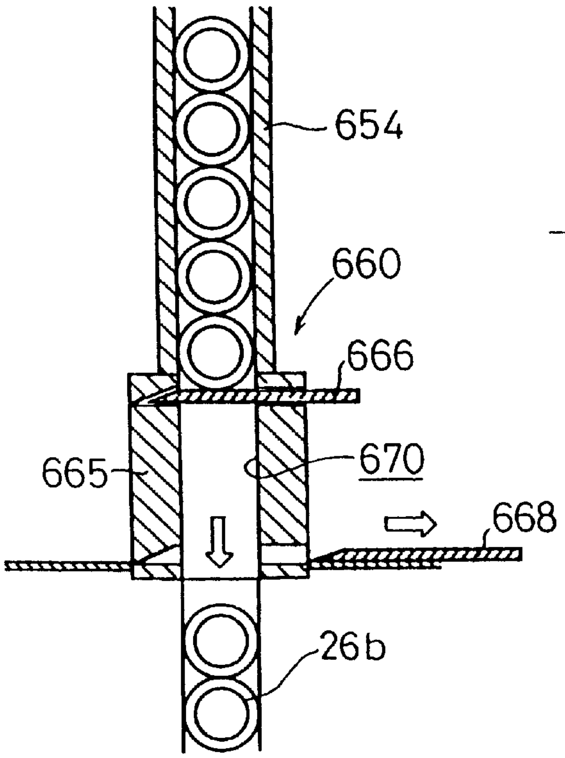
Figure 43D:
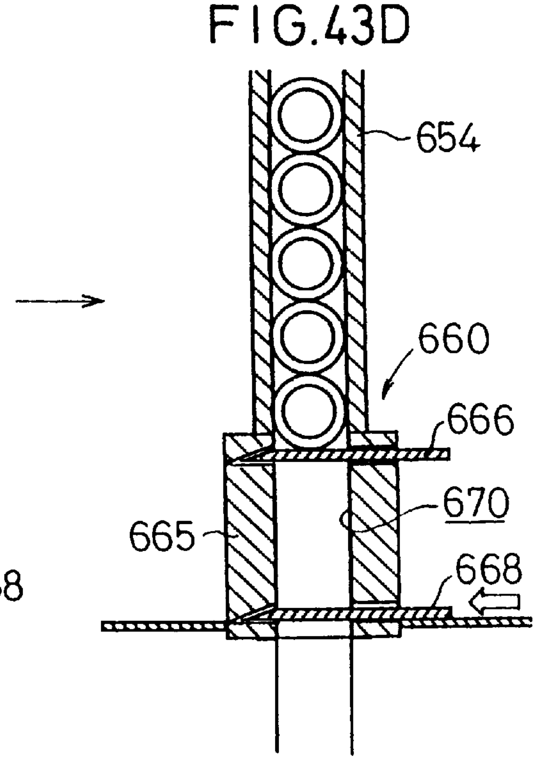

Then, as shown in FIG. 43C, the lower shutter plate 668 is retracted from the passage 670, allowing the caps 26*b*, which have been held between the upper and lower shutter plates 666, 668, to drop. Thereafter, the lower shutter plate 668 enters the passage 670 (see FIG. 43D), repeating the above process.

As described above, the chute 654 is associated with the shutter mechanism 660, and the upper and lower shutter plates 666, 668 of the shutter mechanism 660 are independently movable into and out of the passage 670 for closing the passage 670 at all times. Therefore, ambient light is always prevented from being introduced from the bright chamber 72 into the dark chamber 44 through the chute 654.

The chute 654 has the first and second bends 656, 658 bent through about 90° in its portion extending from the bright chamber 72 into the dark chamber 44 for thereby preventing ambient light from being introduced through the chute 654 from the bright chamber 72 into the dark chamber 44. While the chute 654 has the first and second bends 656, 658 each of which is bent through about 90° in the illustrated embodiment, the combined angle of the first and second bends 656, 658 may be about 90° or more, and the first and second bends 656, 658 may be bent in a two-dimensional space or a three-dimensional space.

As shown in FIG. 27, the feeder 574 of the spool supply unit 50 successively delivers spools 20 in the axial direction. The direction of the spools 20 is controlled by the separator 616 at the end of the conveyor 610. The spools 20 which are controlled in direction are each introduced into the passage 622 of the joint block 620 and delivered through the pipe 612 by air that is ejected into the passage 22 from the blower hole 624 that is inclined at the angle of θ (30°).

The pipe 612 has the first and second bends 628, 630 each bent through about 90°, and feeds spools 20 from the bright chamber 72 into the dark chamber 44 while blocking light against entry into the pipe 612 with the first and second bends 628, 630. The pipe 612 is associated with the shutter mechanism 632. As is the case with the shutter mechanism 660, the upper and lower shutter plates 636, 638 of the shutter mechanism 632 are alternately actuated to close the passage 640 for allowing spools 20 to be supplied in a light-tight condition.

The lower shutter plate 638 for placing thereon the end of the shank 20*a* of a spool 20 has the tapered surface 642 on its tip end. The upper shutter plate 636 which serves to effectively push the flange 20*b* of a spool 20 needs to surround the shank 20*a*. Therefore, the upper shutter plate 636 has on its tip end the tapered surface 644 inclined at the angle of θ1, and the slot 646 defined therein for receiving the shank 20*a*.

While the pipe 612 has the first and second bends 628, 630 each of which is bent through about 90° in the illustrated embodiment, the combined angle of the first and second bends 628, 630 may be about 90° or more, and the first and second bends 628, 630 may be bent in a two-dimensional space or a three-dimensional space.

In the case supply unit 56, a plurality of cases 38 are filled in the hopper 588. A predetermined number of cases 38 are supplied from the hopper 588 to the vertically movable bucket 604, which is lifted along the component lifter 596 to supply the cases 38 to the feeder 580. Then, the cases 38 are successively delivered to the feed path 690 by the feeder 580.

As shown in FIGS. 32 and 33, on the feed path 690, a case 38 is fed to the elevated horizontal feed section 692 and placed on the belt conveyor 698 of the conveyor feeder 700. When the bent conveyor 698 is circulatingly moved, the case 38 is fed in the direction indicated by the arrow P. When the case 38 reaches the end of the elevated horizontal feed section 692, the case 38 is delivered from the conveyor feeder 700 to the air blower feeder 702. As shown in FIG. 33, the case 38 is introduced into the passage 708 in the joint block 706 of the air blower feeder 702.

In the joint block 706, the blower hole 710 communicates with the passage 708 at the angle of θ (30°). Air is supplied to the passage 708 through the air tube 712 coupled to the air source and the blower hole 710. Therefore, the case 38 is fed under the air pressure from the passage 708 into the bent feed section 694 of the pipe 704 which is connected to the joint block 706. Then, the case 38 drops by gravity through the vertical feed section 696 into the encasing unit 42.

In the vertical feed section 696, the first and second sensors 716, 718 of the detector 714 detects whether there is a case 38 in a certain vertical position in the vertical feed section 696 (see FIG. 34).

Figure 44A:
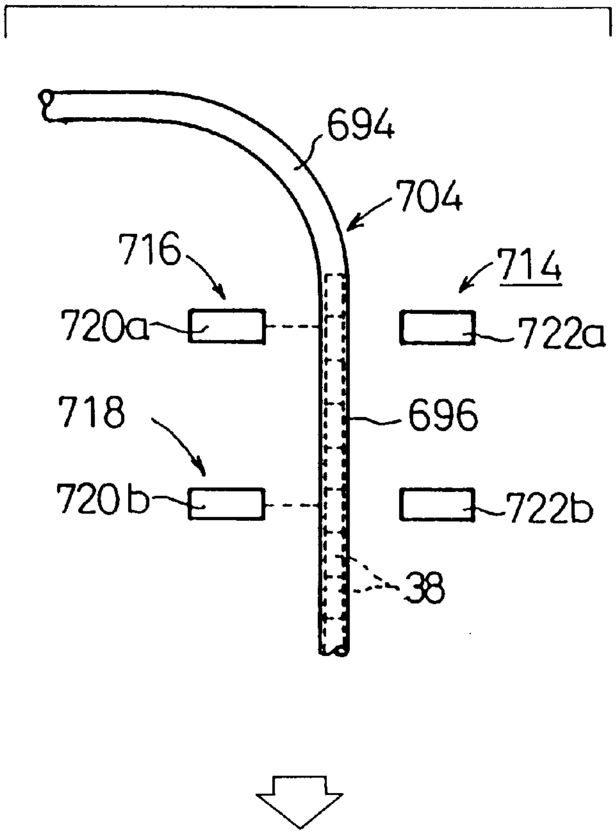
FIG. 44A is a view showing the manner in which first and second sensors of the air blow feeder detect a case.

As shown in FIG. 44A, when the first sensor 716 detects a case 38, it is determined that the vertical feed section 696 is supplied with a sufficient number of cases 38, and the delivery of cases 38 by the belt conveyor 698 is stopped. Specifically, the feeder 580 or the belt conveyor 698 is inactivated.

Figure 44B:
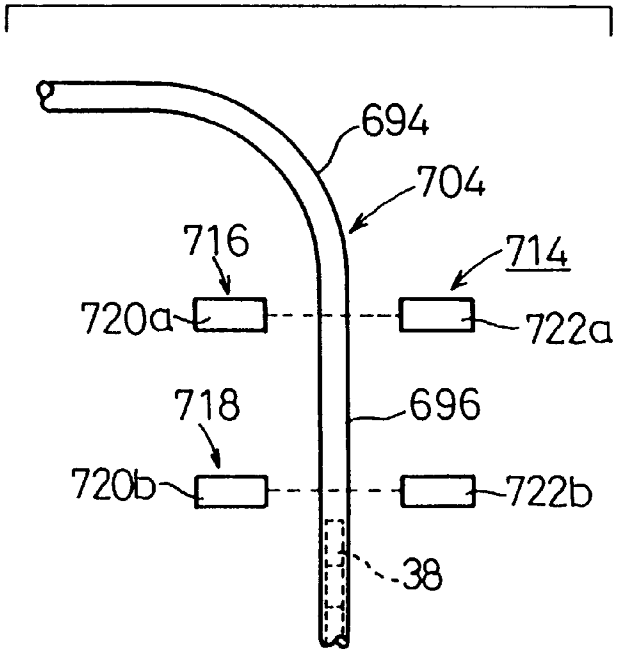
FIG. 44B is a view showing the manner in which first and second sensors of the air blow feeder do not detect a case.

As shown in FIG. 44B, when both the first and second sensors 176, 178 do not detect a case 38, it is determined that the vertical feed section 696 is not supplied with a necessary number of cases 38, and the feeder 580 or the belt conveyor 698 is actuated again to supply cases 38 to the vertical feed section 696.

In this embodiment, therefore, the encasing unit 42 is reliably supplied with cases 38, and cases 38 are prevented from staying and becoming jammed on the belt conveyor 698. Therefore, the cases 38 are effectively prevented from frictionally contacting the belt conveyor 698 and being damaged thereby.

The conveyor feeder 700 having the belt conveyor 698 is associated with the elevated horizontal feed section 692 of the feed path 690. The air blower feeder 702 for feeding cases 38 under air pressure is associated with the bent feed section 694 where cases 38 cannot smoothly be fed by the conveyor feeder 700. When cases 38 are fed under air pressure to the vertical feed section 696, the cases 38 are then allowed to drop by gravity through the vertical feed section 696.

By combining the conveyor feeder 700 and the air blower feeder 702 with each other, it is possible to feed cases 38 smoothly and effectively along the feed path 690 even through the feed path 690 is of a relatively complex configuration.

Cases are fed under air pressure only in the bent feed section 694 where cases 38 cannot smoothly be fed by the conveyor feeder 700. Consequently, cases 38, which are resin components susceptible to wear, are less liable to be damaged due to frictional contact with inner surfaces of the pipe 704 and produce worn debris than if the feed path 690 comprised an elongate pipe and were combined with the air blower feeder 702 in its entirety.

Since the vertical feed section 696 is joined to the bent feed section 694, cases 38 can easily be fed from the bent feed section 694 into the vertical feed section 696 simply by supplying a relatively weak air pressure through the air blower feeder 702, and then can fall by gravity through the vertical feed section 696. As a result, the cases 38 thus fed are worn and damaged only to a relatively small extent.

Since cases 38 are effectively protected against substantial wear and damage, worn debris of the cases 38 will not be deposited in the feed path 690 even after operation over a long period of time. Accordingly, no substantial amount of worn debris will be attached to the trailing end 16*c* of a sized film 16 which is exposed out of a one-end-open cartridge 28 inserted in a case 38, and problems will not be caused when the cartridge 28 is loaded in a camera to tape pictures.

If the feed path 690 comprised an elongate pipe in its entirety, then when a case 38 is jammed in the elongate pipe, it would be tedious and time-consuming to remove the jammed case 38 from the elongate pipe. According to the illustrated embodiment, the belt conveyor 698 is disposed in the relatively long elevated horizontal feed section 692 and covered with the cover 703. Therefore, in the event that a case 38 is jammed on the belt conveyor 698, the jammed case 38 can easily be removed by opening the cover 703.

The air blower feeder 702 comprises the pipe 704 having the bent feed section 694 and the air tube 712 for supplying air obliquely into the pipe 704. When cases 38 are arrayed with their closed ends 38*a* facing forward, they can quickly and efficiently be fed through a relatively simple arrangement.

In the embodiment, the detector 714 comprises the first and second sensors 716, 718 which are photoelectric sensors. However, the detector 714 may comprise transmissive ultrasonic sensors or proximity sensors.

When a trouble such as a failure, a jam, or the like occurs between the film supply unit 18 and the assembling unit 36, the display monitor 92 (see FIG. 38) of the control console 90 displays a fault location in red, for example. The operator can then operate the control console 90 to display fault information on the display monitor 92, and confirms any troubled location in the dark chamber 44 on the display monitor 92.

Then, the operator enters the dark chamber 44 and handle the fault at the troubled location which has been confirmed. Therefore, in the event of a fault, the operator is not required to remove the light-tight cover, but can directly enter the dark chamber 44 and quickly make an action to recover from the trouble. The operator can smoothly perform the recovery action by wearing an infrared vision scope.

Since the recovery action is performed directly in the dark chamber 44, elongate films F in the dark chamber 44 are protected from the danger of being exposed to ambient light and spoiled.

The film supply unit 18, the film winding unit 22, and the assembling unit 36 are accommodated in the dark chamber 44 so as to be arranged along the film processing and packaging process in the direction indicated by the arrow A. Therefore, the facilities used are much simpler in structure and the processing and packaging apparatus 10 is much more inexpensive to manufacture than if the facilities were covered with light-tight covers and automatically operated in the bright chamber.

The film supply unit 18, the film winding unit 22, the assembling unit 36, and the encasing unit 42 are linearly arranged along the film processing and packaging process, and the overall layout space including the cartridge production unit 30 and the component supply assembly 58 is substantially rectangular in shape (see FIG. 2). Consequently, the spaced in the factory can effectively be utilized without creating substantial dead space.

The feeder 120, the slicer 122, the perforator 126, the side printer 128, and the cutter 130 of the film supply unit 18, the film winding unit 22, the assembling unit 36, the encasing unit 42, the cartridge production unit 30, the spool supply unit 50, the cap supply unit 52, the case cap supply unit 54, and the case supply unit 56 of the component supply unit 58, the barrel plate supply unit 60, and the cap supply unit 59 are constructed as individual units. Therefore, for installing the processing and packaging apparatus 10 in a factory, those units may individually be installed. As a result, the processing and packaging apparatus 10 can be installed with ease in a relatively short period of time.

As shown in FIGS. 35 and 36, the molding device management computer 802, the processing and packaging apparatus management computer 800, the outer packaging device management computer 804, and the cutting machine management computer 816 are installed in a functionally dispersed fashion as facility management computers for respective production facilities, and are managed in common by the production information management computer 812. Therefore, the process controllers 800*a*, 800*b*, 800*c*, . . . of the processing and packaging apparatus management computer 800, for example, are prevented from suffering excessive burdens, allowing data to be processed quickly and reliably, and simplifying the entire control system.

The production facilities are operated fully under commands from the production information management computer 812, and achievement data produced by the production facilities, and data relative to production histories such as types of materials used in processing and assembling processes, and production lot numbers are fed back to the production information management computer 812. As a result, the operation of the production facilities can be managed by a production management department, and the achievement data of the entire production facilities can easily be recognized. The production information management computer 812 transmits individual production command tables to the facility management computers including the processing and packaging apparatus management computer 800 for automatically indicating fixed items based on production plan data. Therefore, the expenditure of labor is much smaller and human errors are less likely to occur than if manufacturing conditions were individually established and entered into each of the facility management computers.

Figure 45:
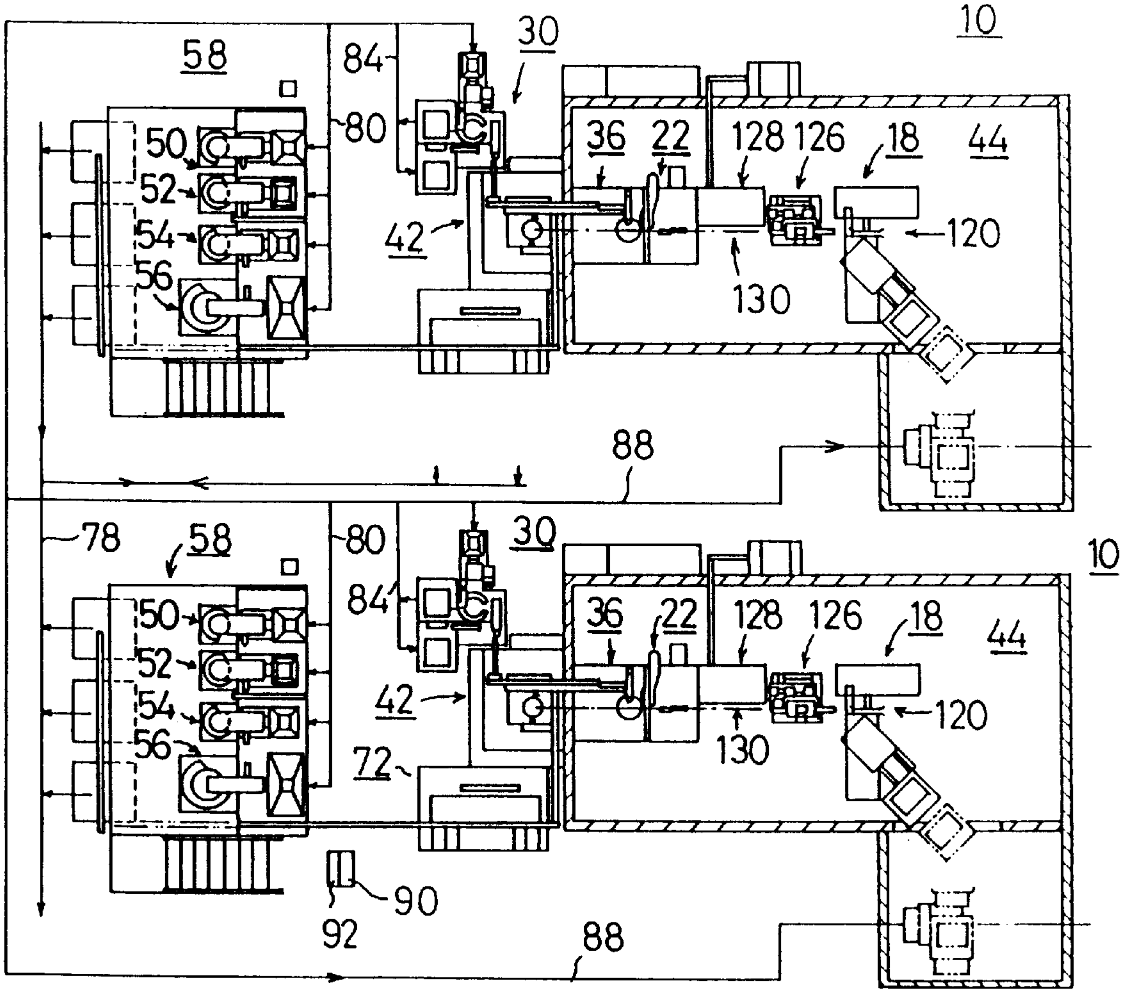
FIG. 45 is a plan view of a system comprising a plurality of processing and packaging apparatus according to the present invention.

In factories, a plurality of processing and packaging apparatus 10 are usually installed and operated as shown in FIG. 45. In such a case, product types are established for each of the processing and packaging apparatus 10 by a single production information management computer 812. Accordingly, overall facilities are simplified and reduced in cost.

As described above, the apparatus for processing and packaging a photographic film according to the present invention has the film supply unit for cutting off a roll film and supplying a sized film, the film winding unit for winding the sized film around a spool, and the assembling unit for inserting a roll composed of the spool and the sized film wound therearound into a one-end-open cartridge and attaching a cap to the one-end-open cartridge, the film supply unit, the film winding unit, and the assembling unit being accommodated altogether in a dark chamber. In the event of trouble, the operator can directly enter the dark chamber, does not need to remove light-tight covers, and can make a recovery action easily and quickly. Since the film supply unit, the film winding unit, and the assembling unit are only required to be installed in the dark chamber, the entire facilities are effectively made simpler and less costly than if each of the facilities were covered with a light-tight cover.

The apparatus for processing and packaging a photographic film according to the present invention has the switching feed mechanism for selectively feeding film-contained cartridges discharged from the assembling unit to the encasing unit and the film-contained cartridge accumulating unit. The process of accumulating packaged products in the packaged product accumulating unit and the process of accumulating film-contained cartridges in the film-contained cartridge accumulating unit can easily and efficiently be carried out selectively.

In a mechanism for and a method of feeding resin components according to the present invention, resin components are horizontally fed along a linear horizontal feed section by a conveyor, and fed by air along a bent feed section where the resin components cannot be fed by the conveyor. The resin components which have been fed by air are then allowed to fall by gravity through a linear vertical feed section.

Therefore, the resin components are fed under air pressure only in the section where they cannot be fed by the conveyor. The resin components are reliably prevented from being worn and damaged even if the feed path is of a complex shape including bent sections, and can be fed smoothly along the feed path.

Although certain preferred embodiments of the present invention have been shown and described in detail, it should be understood that various changes and modifications may be made therein without departing from the scope of the appended claims.

What is claimed is:

1. A mechanism feeding a resin component for use in an apparatus for processing and packaging a photographic film, comprising:

a feeder for successively feeding a plurality of resin components from storage; and a feed path interconnecting said feeder and a position for supplying said resin components;

said feed path comprising:

a conveyor feeder for horizontally feeding said resin components along a linear horizontal section comprising a belt conveyor; and an air blower feeder for feeding said resin components under air pressure along a bent section.

2. A mechanism according to claim 1, wherein said air blower feeder comprises:

a pipe having said bent section and a linear vertical section extending vertically downwardly from said bent section; and an air tube for supplying air into said pipe for feeding said resin components with an air blow through said bent section.

3. A mechanism according to claim 2, further comprising a detector associated with said linear vertical section, for detecting whether a predetermined number of resin components are present in said linear vertical section.

4. A mechanism according to claim 2, wherein each of said resin components comprises a tubular case with one end closed.

5. A method of feeding a resin component along a feed path having a linear horizontal section, a bent section, and a linear vertical section in an apparatus for processing and packaging a photographic film, comprising the steps of:

horizontally feeding with a feeder a resin component through said linear horizontal section to a conveyor;

feeding the resin component with an air blow through said bent section; and feeding the resin component from said bent section to fall by gravity through said linear vertical section.

6. A method according to claim 5, further comprising the steps of:

detecting whether a predetermined number of resin components are present in said linear vertical section; and stopping horizontally feeding the resin component with said feeder if said predetermined number of resin components are present in said linear vertical section.

7. A method according to claim 5, wherein each of said resin components comprises a tubular case with one end closed.

* * * * *